United States Patent
Sato et al.

(10) Patent No.: US 8,434,662 B2
(45) Date of Patent: May 7, 2013

(54) JOINING METHOD AND FRICTION STIR WELDING METHOD

(75) Inventors: Hayato Sato, Inazawa (JP); Hisashi Hori, Shizuoka (JP)

(73) Assignee: Nippon Light Metal Co., Ltd., Tokyo (JP)

(*) Notice: Subject to any disclaimer, the term of this patent is extended or adjusted under 35 U.S.C. 154(b) by 0 days.

(21) Appl. No.: 13/604,177

(22) Filed: Sep. 5, 2012

(65) Prior Publication Data

US 2012/0325896 A1    Dec. 27, 2012

Related U.S. Application Data

(62) Division of application No. 12/443,787, filed as application No. PCT/JP2007/055346 on Mar. 16, 2007, now Pat. No. 8,281,977.

(30) Foreign Application Priority Data

| Oct. 2, 2006 | (JP) | 2006-271243 |
| Oct. 2, 2006 | (JP) | 2006-271244 |
| Oct. 2, 2006 | (JP) | 2006-271245 |
| Oct. 2, 2006 | (JP) | 2006-271246 |
| Oct. 2, 2006 | (JP) | 2006-271247 |
| Oct. 2, 2006 | (JP) | 2006-271248 |
| Oct. 2, 2006 | (JP) | 2006-271249 |

(51) Int. Cl.
*B23K 20/12* (2006.01)

(52) U.S. Cl.
USPC .......... 228/112.1; 228/2.1

(58) Field of Classification Search .......... 228/2.1, 228/112.1
See application file for complete search history.

(56) References Cited

U.S. PATENT DOCUMENTS

| 6,050,474 A | 4/2000 | Aota et al. |
| 6,311,889 B1 | 11/2001 | Ezumi et al. |
| 6,715,664 B2 * | 4/2004 | Yamashita .......... 228/112.1 |

(Continued)

FOREIGN PATENT DOCUMENTS

| JP | 11-179568 A | 7/1999 |
| JP | 11-320127 A | 11/1999 |

(Continued)

OTHER PUBLICATIONS

International Search Report dated Jun. 19, 2007 WITH Eng Translation (Thirteen (13) pages).

(Continued)

*Primary Examiner* — Nicholas P D'Aniello
(74) *Attorney, Agent, or Firm* — Crowell & Moring LLP

(57) ABSTRACT

A method of welding that realizes enhancements of airtightness and watertightness at a weld area and a method of welding and method of friction stir welding that attain an enhancement of welding operation efficiency/speed. There is provided a method of welding including the first primary welding step of carrying out a friction stir welding on the abutting portion (J1) of metal members (1,1) from the surface (12) side of metal member (1) and the second primary welding step of carrying out a friction stir welding on the abutting portion (J1) from the reverse face (13) side of the member (1), wherein in the second primary welding step, the friction stir welding is performed while penetrating a stirring pin (B2) of rotation tool (B) in plasticized region (W1) formed in the first primary welding step.

14 Claims, 23 Drawing Sheets

U.S. PATENT DOCUMENTS

| | | |
|---|---|---|
| 7,614,539 B2 | 11/2009 | Sankaran et al. |
| 2002/0153130 A1 | 10/2002 | Okamoto et al. |
| 2006/0054252 A1 | 3/2006 | Sankaran et al. |

FOREIGN PATENT DOCUMENTS

| | | |
|---|---|---|
| JP | 11-342481 A | 12/1999 |
| JP | 2000-301361 A | 10/2000 |
| JP | 2002-1551 A | 1/2002 |
| JP | 2002-1552 A | 1/2002 |
| JP | 2002-248582 A | 9/2002 |
| JP | 2002-248584 A | 9/2002 |
| JP | 2003-48064 A | 2/2003 |
| JP | 2003-117668 A | 4/2003 |
| JP | 2003-164980 A | 6/2003 |
| JP | 2003-181653 A | 7/2003 |
| JP | 2003-326374 A | 11/2003 |
| JP | 2004-34139 A | 2/2004 |
| JP | 2004-154798 A | 6/2004 |
| JP | 2004-522591 A | 7/2004 |
| JP | 2004-358535 A | 12/2004 |
| JP | 2005-66669 A | 3/2005 |
| JP | 2005-131666 A | 5/2005 |
| JP | 2005-177844 A | 7/2005 |
| JP | 2006-75905 A | 3/2006 |
| JP | 2006-150454 A | 6/2006 |
| KR | 2001-0049449 A | 6/2001 |
| WO | WO 02/092273 A1 | 11/2002 |

OTHER PUBLICATIONS

Hui-Jie Liu et al., "Two-sided friction stir welding of 5—mm—thick aluminum alloy plate", Main Topics, Abstracts & Key Words, Transactions of the China Welding Institution, 2004, p. 11, vol. 25, No. 5.
Japanese Office Action dated Feb. 18, 2011 (Six (6) pages).
Japanese Office Action dated Sep. 13, 2011 (Three (3) pages).
Japanese Office Action dated Sep. 13, 2011 (Two (2) pages).
Korean Office Action dated Oct. 26, 2011 (Seven (7) pages).
Japanese Office Action dated Feb. 21, 2012 (Three (3) pages).
Machine Translation of JP 11-320127 which originally published Nov. 1999.
Machine Translation of JP 2005-177844 A, which originally published Jan. 7, 2005.
Japanese-language Office Action (2011-243681) dated Mar. 12, 2013 (Four (4) pages).
Japanese-language Office Action (2011-243682) dated Mar. 12, 2013 (Four (4) pages).

* cited by examiner

FIG.1
(a) 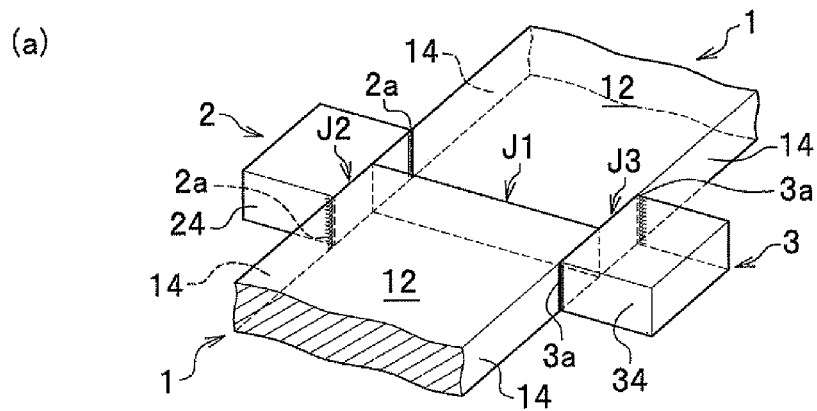
(b) 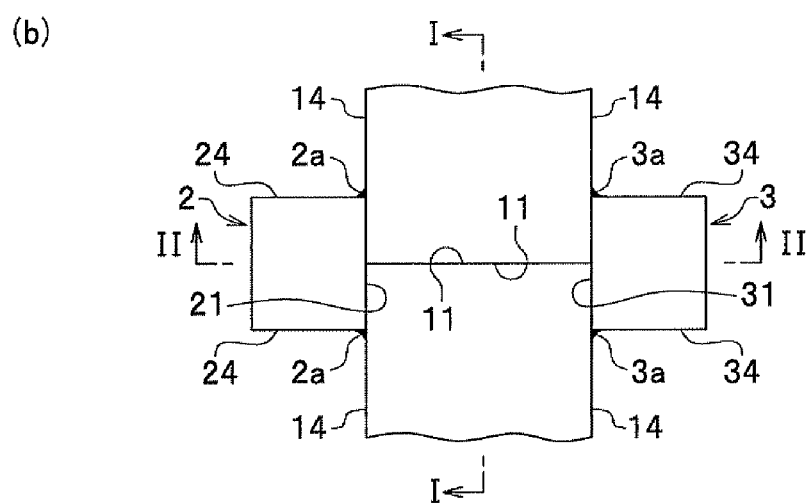
(c) 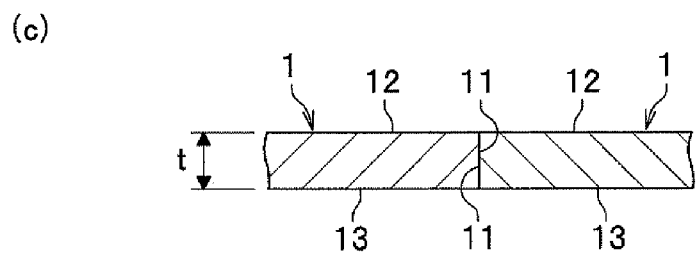
(d) 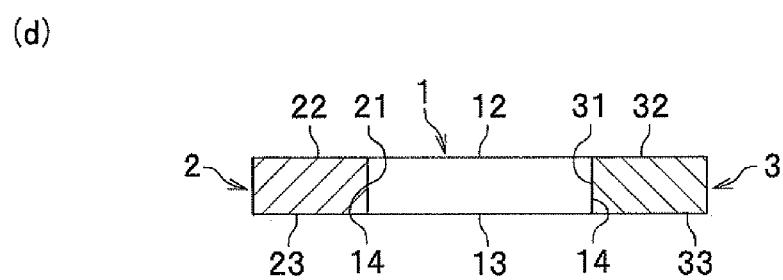

FIG.3
(a)
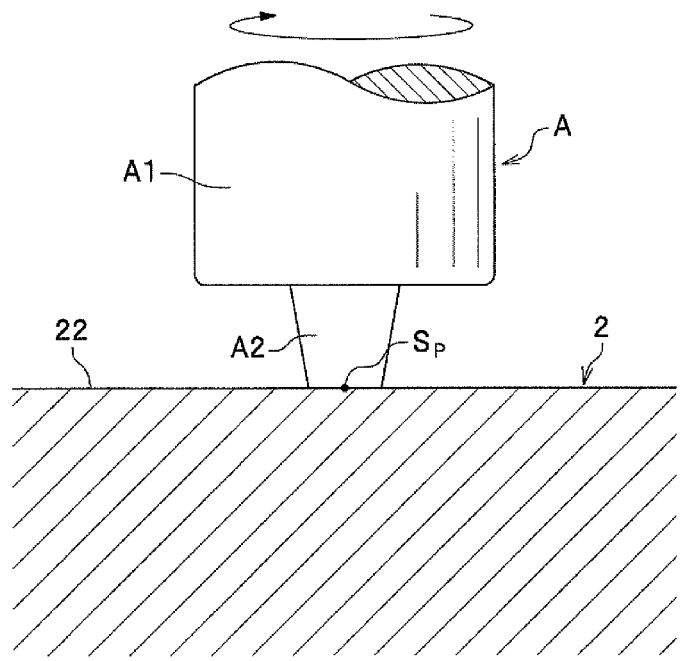
(b)
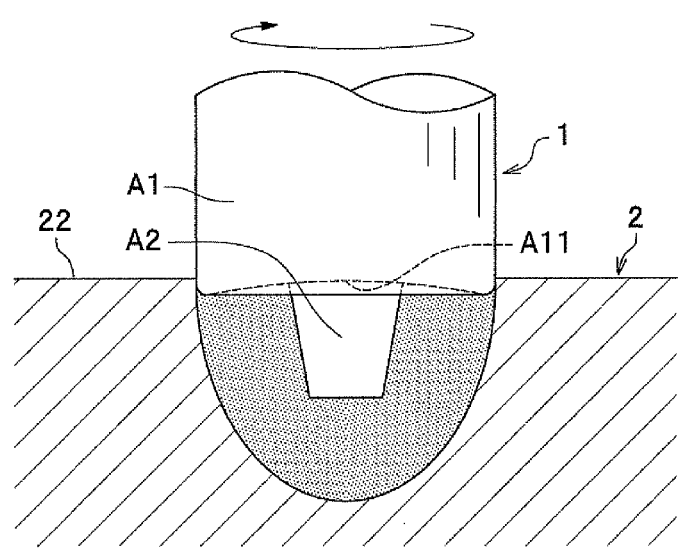

FIG.5
(a)
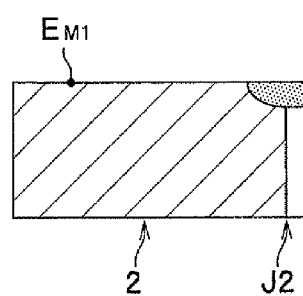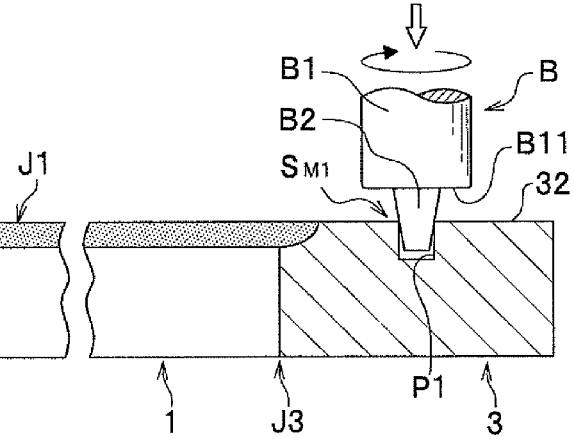
(b)
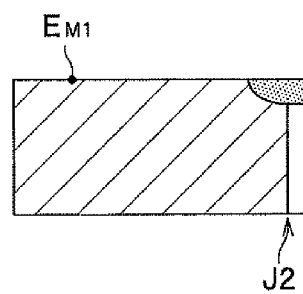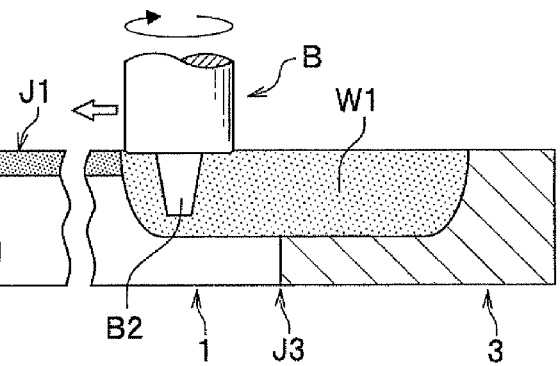
(c)
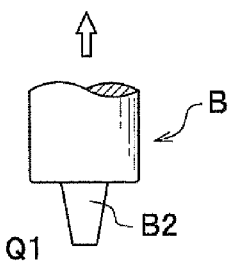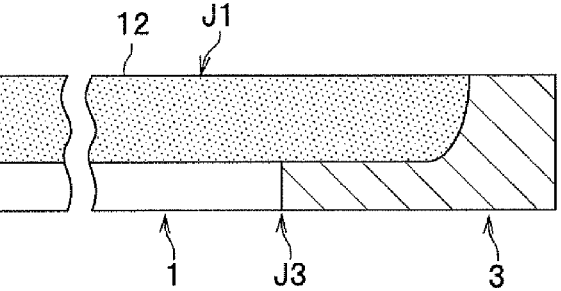

FIG.6
(a)
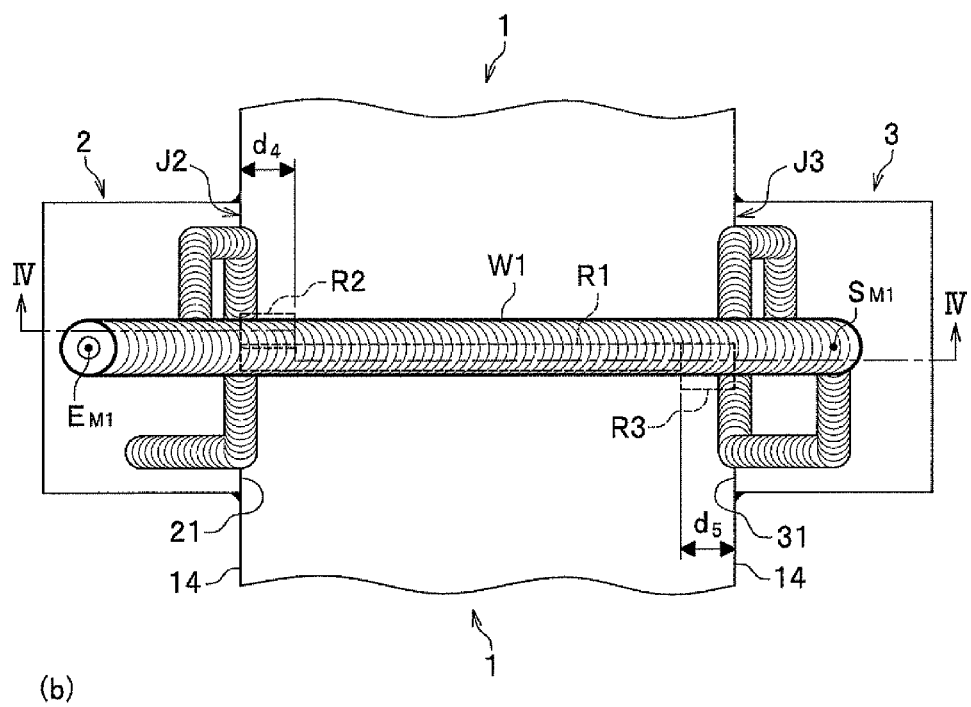
(b)
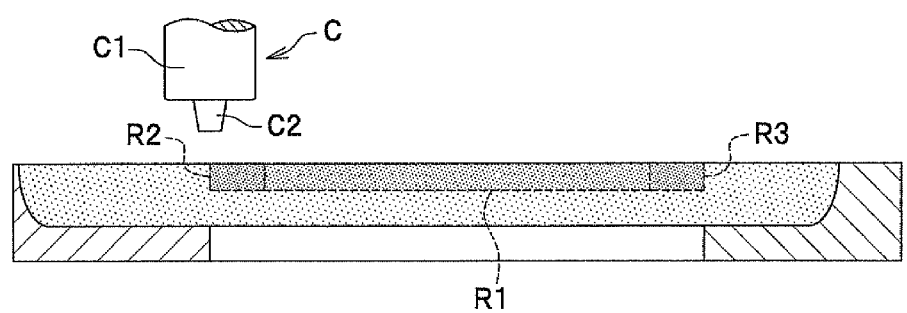

FIG.10
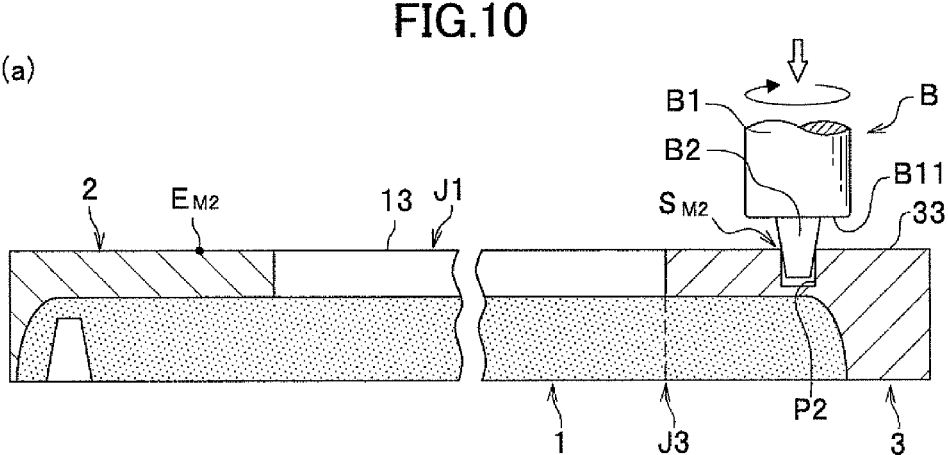
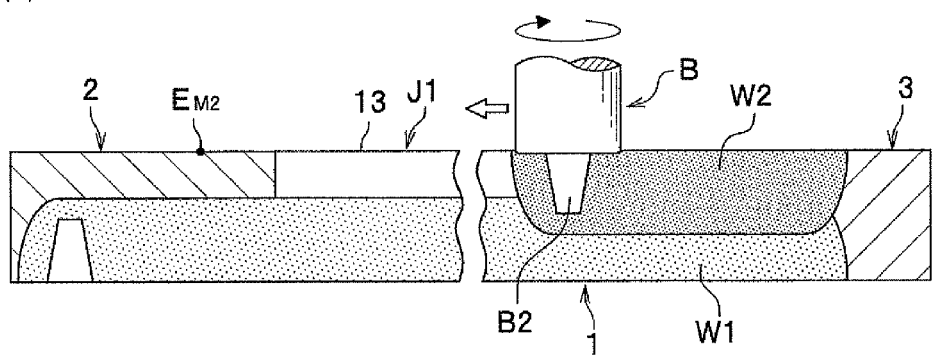
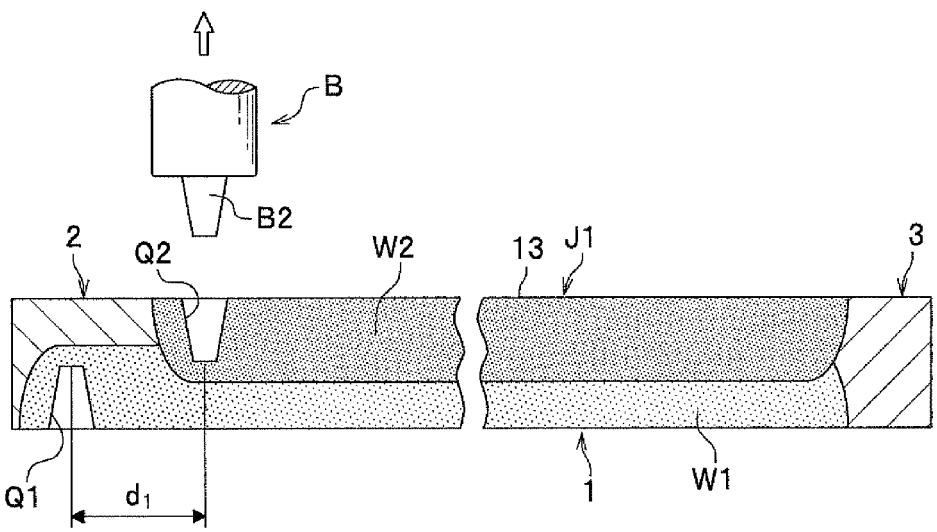

FIG.11
(a)
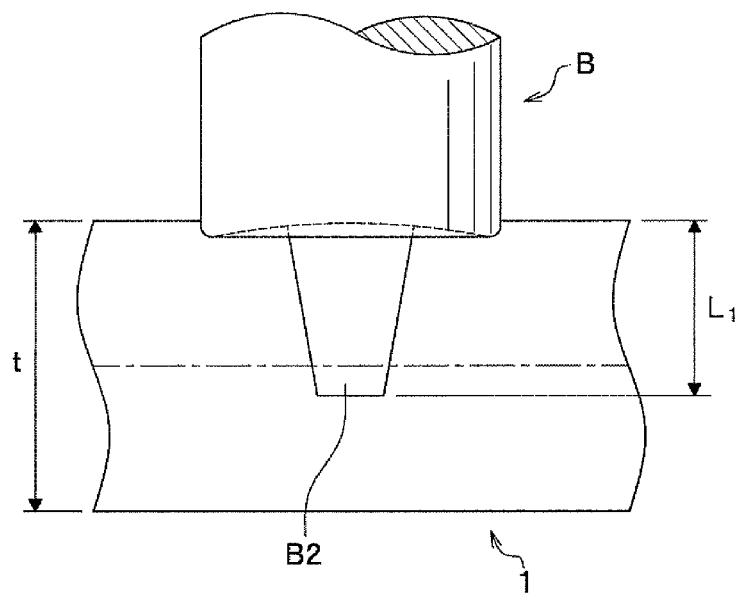
(b)
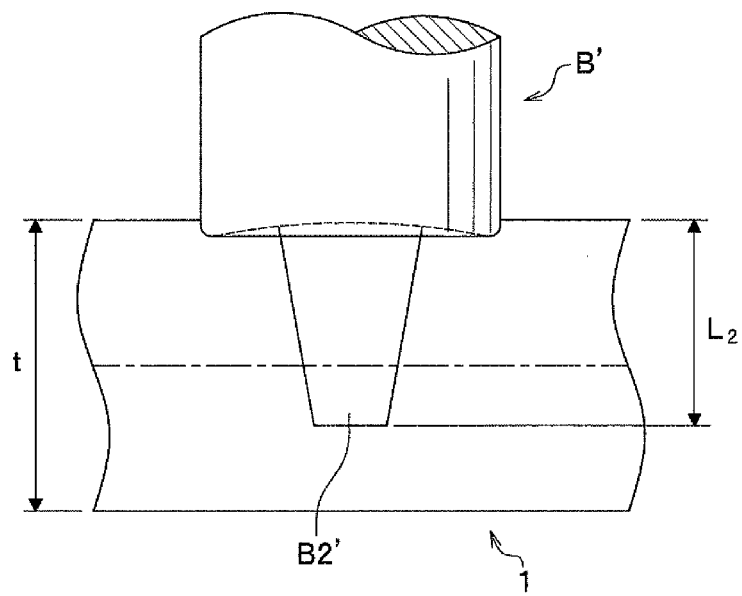

FIG.15
(a)
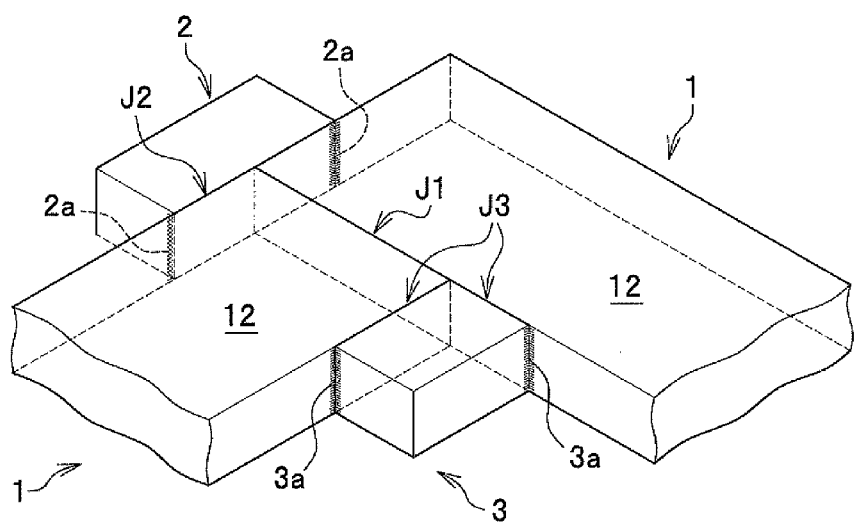
(b)
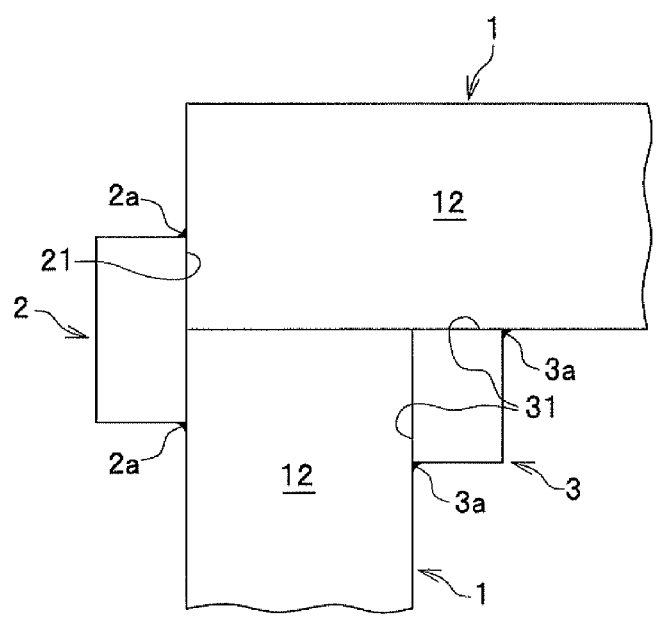

FIG.16
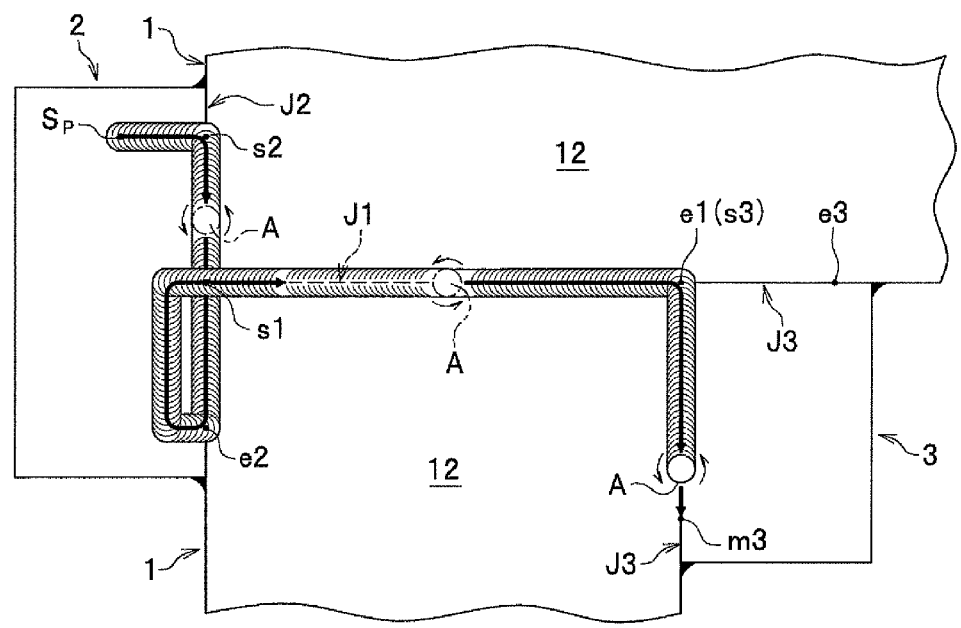
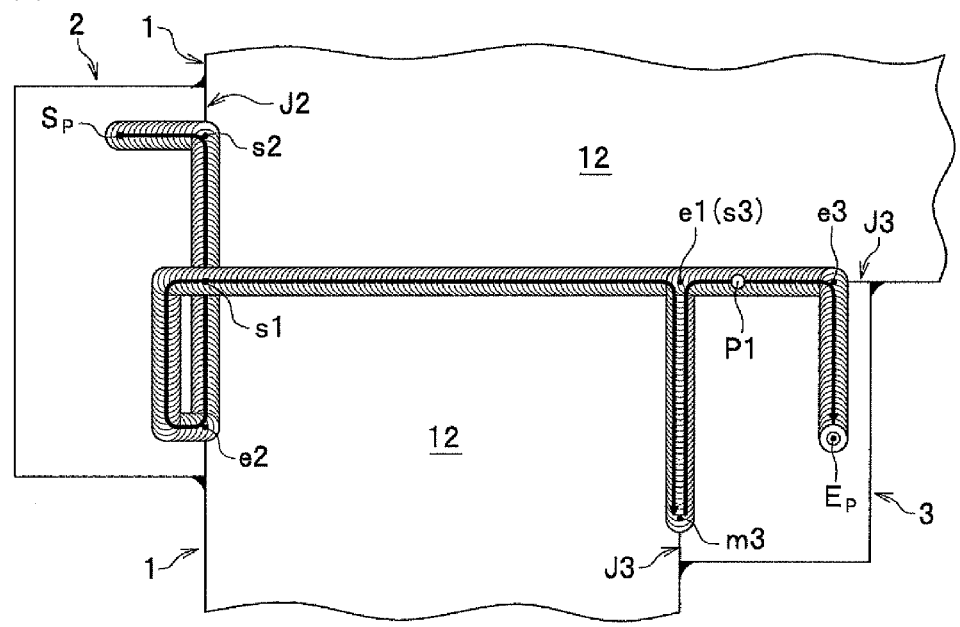

FIG.19
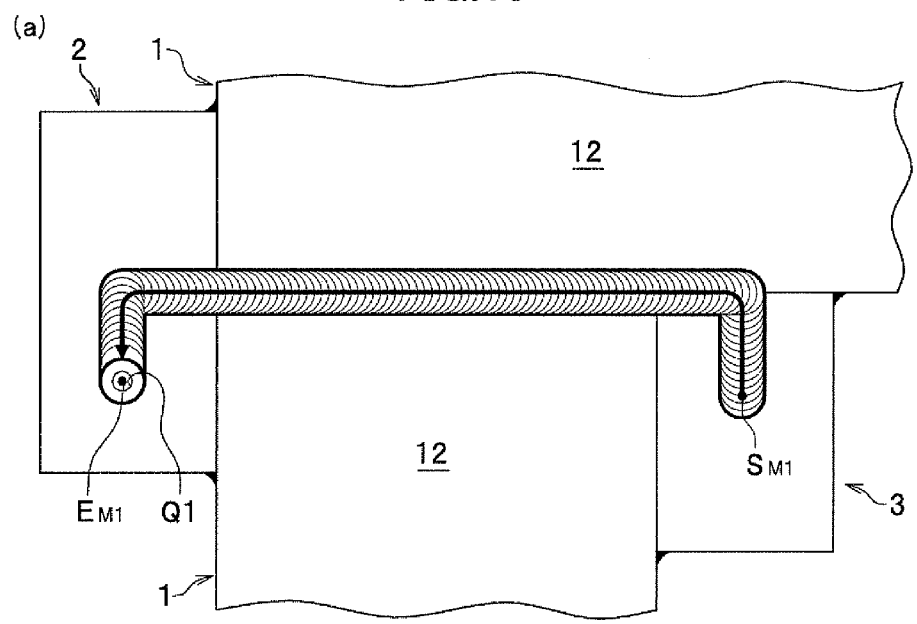
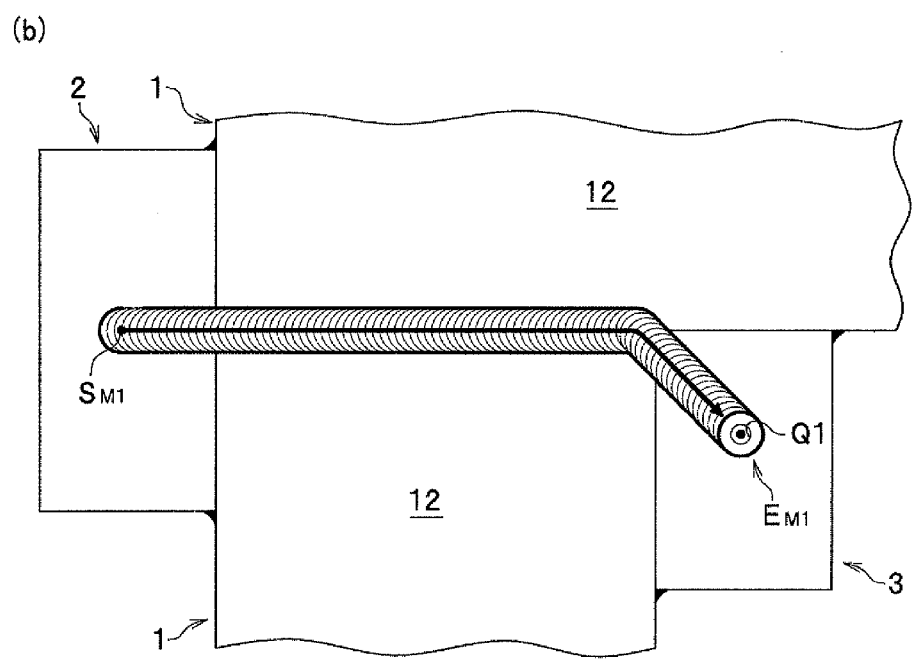

FIG.20
(a)
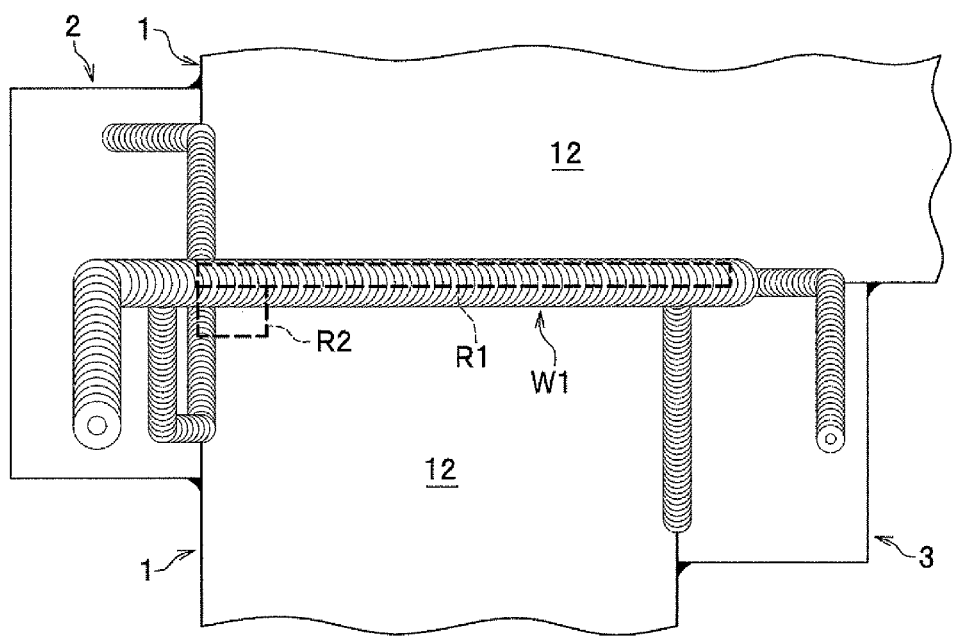
(b)
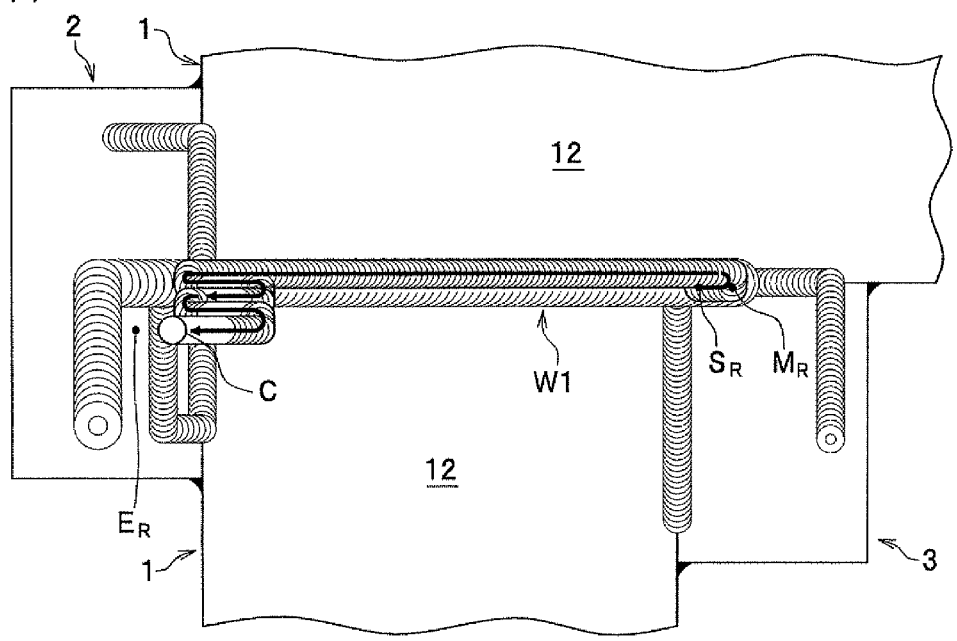

JOINING METHOD AND FRICTION STIR WELDING METHOD

CROSS REFERENCE TO RELATED APPLICATIONS

This application is a divisional of U.S. application Ser. No. 12/443,787 filed Mar. 31, 2009 which is a national stage of PCT/JP2007/055346 filed Mar. 16, 2007, and claims priority of Japanese patent application nos. 2006-271243, 2006-271244, 2006-271245, 2006-271246, 2006-271247, 2006-271248, and 2006-271249, filed Oct. 2, 2006, respectively.

TECHNICAL FIELD

The present invention relates to a joining method of metal members using friction stir welding, and a friction stir welding method.

BACKGROUND ART

As a method for joining metal members to each other, friction stir welding (FSW) is known (refer to Documents 1 to 9 (Japanese Published Unexamined Patent Applications published by the Japan Patent Office) listed below). According to friction stir welding, a rotating tool is moved along a butting portion between metal members while the rotating tool is rotated, and by plasticizing and fluidizing the metal of the butting portion by frictional heat of the rotating tool and the metal members, the metal members are joined in solid phase. The rotating tool is generally formed by providing a stirring pin (probe) in a projecting manner on a lower end surface of a shoulder having a columnar shape.

Document:
1. Japanese Published Unexamined Patent Application No. H11-342481
2. Japanese Published Unexamined Patent Application No. 2004-358535
3. Japanese Published Unexamined Patent Application No. 2005-131666
4. Japanese Published Unexamined Patent Application No. 2003-164980
5. Japanese Published Unexamined Patent Application No. 2002-248582
6. Japanese Published Unexamined Patent Application No. 2002-1551
7. Japanese Published Unexamined Patent Application No. 2005-66669
8. Japanese Published Unexamined Patent Application No. 2004-154798
9. Japanese Published Unexamined Patent Application No. 2003-326374

When the thicknesses of the metal members to be joined are larger than the length of the stirring pin of the rotating tool, after friction stir welding is performed from the surface side of the metal members, friction stir welding may be performed from the back surface side (for example, refer to Documents 1 to 3). By increasing the length of the stirring pin, the metal members can be joined by performing friction stir welding from only the surface side, however, the load on a drive means of the friction stir welding machine increases, so that if the existing friction stir welding machine cannot cope with this, the friction stir welding machine must be altered or a large-sized friction stir welding machine must be introduced.

When a butting portion between the metal members is friction stir welded, as described in Document 2, a so-called tunnel-like defect may occur along the traveling direction of the rotating tool. There are some cases where the tunnel-like defect does not affect the quality of the joined portion, however, when high airtightness and water-tightness are required, the tunnel-like defect is divided to be discontinuous. Document 2 discloses a technique for joining metal members by forming a depression portion on a butting portion between the metal members by butting the metal members having step portions on their end surfaces and performing friction stir welding abutting portion between a connecting plate fitted in the depression portion and the metal members, and a technique is also disclosed in which the tunnel-like defect is divided to be discontinuous by moving the rotating tool across the butting portion after friction stir welding the butting portion between the metal members.

Documents 4 and 5 disclose a technique for preliminarily joining a butting portion between metal members to be joined before they are primarily welded by friction stir welding, a technique for disposing tab members (splint member) on both sides of the butting portion between the metal members and providing a start position or an end position of friction stir welding for primary welding on the tab members, and a technique for joining the tab members to the metal members before the butting portion between the metal members is primarily welded, etc.

Document 6 discloses a technique for preliminarily joining a butting portion between metal members to be joined by friction stir welding before the butting portion is primarily welded by friction stir welding, and Document 7 discloses a technique for providing a start position or an end position of friction stir welding for primary welding on tab members disposed on both sides of the butting portion between the metal members, and a technique for joining the tab members to the metal members by friction stir welding before the butting portion between the metal members is primarily welded, etc.

Document 7 and Document 8, etc., disclose a technique for providing a start position or an end position of friction stir welding on a tab member disposed lateral to the butting portion between metal members to be joined.

Document 9 discloses a friction stir welding method in which a pilot bore is made at a start position of friction stir welding and friction stir welding is started from this pilot bore.

Friction stir welding conditions such as the rotating speed and feed rate (movement speed) of the rotating tool are appropriately set according to the materials and thicknesses of the metal members to be friction stir welded, and various friction stir welding conditions are disclosed in Documents 2, 3, 5, 6, and 9, and in all of these documents, the rotating speed of the rotating tool is maintained constant and the rotating tool is moved at a constant feed rate from the time when the rotating tool is inserted (pressed) into the start position to the time when the rotating tool is withdrawn from the end position.

DISCLOSURE OF THE INVENTION

Problem to be Solved by the Invention

In the joining methods of Documents 1 to 3, fine joining defects may remain at the boundary between a region plasticized by friction stir welding from the surface side (hereinafter, may be referred to as "surface plasticized region") and a region plasticized by friction stir welding from the back surface side (hereinafter, may be referred to as "back plasticized region"). If such joining defects are continued, this may deteriorate the airtightness and water-tightness of the joined portion and this is undesirable. In Documents 1 to 3, the surface plasticized region and the back plasticized region are made to contact each other or slightly overlap at the central portion in the thickness direction of the metal members to join the metal members entirely in the thickness direction, so that the joining strength does not become insufficient.

From this point of view, an object of the present invention is to provide a joining method capable of improving the airtightness and water-tightness of a joined portion, and further provide a joining method and a friction stir welding method which can improve joining efficiency and speed.

Means for Solving the Problems

A joining method according to Claim 1 for solving the above-described problem includes: a first primary welding process in which a butting portion between metal members is friction stir welded from the surface side of the metal members; and a second primary welding process in which the butting portion is friction stir welded from the back surface side of the metal members, wherein a sum of a length of a stirring pin of a rotating tool to be used in the first primary welding process and a length of a stirring pin of the rotating tool to be used in the second primary welding process is set to not less than the thickness of the metal members at the butting portion.

In other words, according to the joining method of the present invention, in the second primary welding process, friction stir welding is performed while the stirring pin of the rotating tool is inserted into a plasticized region formed through the first primary welding process.

Accordingly, a deep portion of the plasticized region (surface plasticized region) formed through the first primary welding process is friction stir welded again by the stirring pin of the rotating tool in the second primary welding process, so that even when joining defects, etc., are formed at the deep portion of the surface plasticized region, the joining defects, etc., can be corrected, and eventually, the airtightness and water-tightness of the joined portion can be improved.

The plasticization reaches a position deeper than the tip end of the stirring pin, so that even when the stirring pin of the rotating tool to be used for the friction stir welding from the back surface side is short and does not reach the surface plasticized region as in the conventional technique described above, the surface plasticized region and the back plasticized region can be made to contact each other or slightly overlap at the central portion in the thickness direction of the metal members, however, joining defects, etc., formed at the deep portion of the surface plasticized region cannot be reliably corrected. On the other hand, in the present invention, the stirring pin is inserted into the surface plasticized region and the region is directly friction stir welded in the second primary welding process, so that the joining defects formed in the surface plasticized region can be sufficiently reliably corrected.

In the present invention, the length of a stirring pin of a rotating tool to be used in the first primary welding process is set to not less than ½ of the thickness of the metal members at the butting portion, and the length of a stirring pin of a rotating tool to be used in the second primary welding process is set to not less than ½ of the thickness of the metal members at the butting portion. By thus setting, the surface plasticized region and the back plasticized region overlap at the central portion in the thickness direction of the metal members, and the difference in sectional area between the surface plasticized region and the back plasticized region is reduced, so that the joined portion becomes uniform in quality. It is a matter of course that the lengths of the stirring pins of the rotating tools are less than the thickness.

By setting the length of the stirring pin of the rotating tool to be used in the second primary welding process to be equal to the length of the stirring pin of the rotating tool to be used in the first primary welding process, the surface plasticized region and the back plasticized region become equal to each other, so that the joined portion becomes more uniform in quality, and in addition, the same rotating tool can be used in the first primary welding process and the second primary welding process, so that the working efficiency can be improved.

The length $L_1$ of the stirring pin of the rotating tool to be used in the first primary welding process and the length $L_2$ of the stirring pin of the rotating tool to be used in the second primary welding process are set so as to satisfy the relation of $1.01 \leq (L_1+L_2)/t \leq 1.10$ where t is the thickness of the metal members at the butting portion. When $(L_1+L_2)/t$ is set to not less than 1.01, even if the metal members have a dimensional tolerance, etc., the stirring pin can be reliably inserted into the surface plasticized region in the second primary welding process. If $(L_1+L_2)/t$ is more than 1.10, the rotating tools become excessively large and the load on the friction stir welding machine increases, so that preferably, $(L_1+L_2)/t$ is set to not more than 1.10.

In the present invention, the length of the stirring pin of the rotating tool to be used in the first primary welding process is set to not more than ¾ of the thickness of the metal members at the butting portion, and the length of the stirring pin of the rotating tool to be used in the second primary welding process is set to not more than ¾ of the thickness of the metal members at the butting portion. Accordingly, a backing material becomes unnecessary when friction stir welding, so that the working efficiency can be improved.

When the stirring pin is withdrawn upward at the end position of friction stir welding in the first primary welding process, a pull-out hole in substantially the same shape as the stirring pin is inevitably formed, and if the movement route of the stirring pin of the rotating tool used in the second primary welding process and the pull-out hole overlap, plasticized and fluidized metal may flow into the pull-out hole and cause joining defects. Therefore, when the pull-out hole formed through the first primary welding process remains as it is, the friction stir welding route in the second primary welding process is preferably set so as to avoid the pull-out hole, and along this route, the stirring pin of the rotating tool to be used in the second primary welding process is moved.

Even when the stirring pin of the rotating tool to be used in the second primary welding process does not pass through the pull-out hole of the first primary welding process, if the spacing distance between these is small, plasticized and fluidized metal may be extruded into the pull-out hole and cause joining defects, so that, more preferably, the shortest distance between the end position of friction stir welding of the first primary welding process and a movement locus of the stirring pin of the rotating tool used in the second primary welding process is set to not less than the outer diameter of the shoulder of a rotating tool to be used in the second primary welding process.

Before executing the first primary welding process, a preliminary joining process may be executed to preliminarily join the butting portion between the metal members. The preliminary joining means is not especially limited, and it can be performed by welding or friction stir welding, however, when the preliminary joining process is performed by friction stir welding, preferably, the butting portion is friction stir welded from the surface side of the metal members by using a preliminary joining rotating tool smaller than the rotating tool to be used in the first primary welding process. Accordingly, when the surface side of the metal members is friction stir welded in the first primary welding process, separation hardly occurs in the butting portion, so that joining with high accuracy is possible. When the butting portion is cooled with water when executing the first primary welding process, the cooling water enters between the metal members and may produce an oxide film on the joining surfaces, however, by closing the gap on the surface side of the metal members by executing the preliminary joining process, the cooling water hardly enters between the metal members, so that the quality of the joined portion can be improved.

Before executing the second primary welding process, the preliminary joining process may be executed. In this case, preferably, the butting portion is friction stir welded from the back surface side of the metal members by using a preliminary joining rotating tool smaller than the rotating tool to be used in the second primary welding process.

The preliminary joining and joining of tab members to the metal members to be performed before the primary welding are only preparatory joining for the primary welding, so that it is demanded to improve the efficiency and speed of these, however, the techniques of Documents 4 to 7 described above cannot improve the efficiency and speed of these preparatory joining operations.

For example, as in the case of Documents 4 and 5, when the preliminary joining of the metal members and joining of tab members to the metal members are performed by welding, manual operations increase, so that this deteriorates the working efficiency and is not suitable in the case where many portions are to be welded or in the case of mass production.

As in Documents 6 and 7, when the preparatory joining such as the preliminary joining and joining of tab members is performed by friction stir welding, a friction stir welding machine is used, and this makes the efficiency and speed higher than in the case of manual welding, however, it takes time to insert and extract a rotating tool, and if the number of insertions and withdrawals of the rotating tool increases, this hinders improvement in efficiency and speed of the preparatory joining operations.

To solve this problem, the joining method of Claim 11 is preferably adopted. The joining method of Claim 11 includes: a preparation process in which a first tab member is disposed on one end side of a butting portion between metal members and a contact surface of the first tab member is brought into contact with the lateral sides of both metal members, and a second tab member is disposed on the other end side of the butting portion and a contact surface of the second tab member is brought into contact with the lateral sides of both metal members; a first tab member joining process in which a butting portion between the first tab member and both metal members is friction stir welded; a preliminary joining process in which the butting portion between the metal members is friction stir welded; a second tab member joining process in which a butting portion between the second tab member and both metal members is friction stir welded; and a primary welding process in which a butting portion between the metal members which was preliminarily joined is friction stir welded, wherein the friction stir welding is not finished at an end point of the first tab member joining process but continued to a start point of the preliminary joining process, and directly shifted to the preliminary joining process.

Accordingly, the withdrawing operation of the rotating tool at the endpoint of the first tab member joining process becomes unnecessary, and further, the inserting operation of the rotating tool at the start point of the preliminary joining process becomes unnecessary, so that the preparatory joining operations can be improved in efficiency and speed.

When the friction stir welding is continued to the start point of the preliminary joining process without withdrawing the rotating tool, it is allowed that the friction stir welding is not finished at the start point of the preliminary joining process but continued to an endpoint of the preliminary joining process. In this case, all withdrawing operations of the rotating tool during the preliminary joining process become unnecessary, so that the preparatory joining operations can be further improved in efficiency and speed.

When the friction stir welding is continued to the end point of the preliminary joining process without withdrawing the rotating tool, it is allowed that the friction stir welding is not finished at the end point of the preliminary joining process but continued to a start point of the second tab member joining process, and directly shifted to the second tab member joining process. In this case, the withdrawing operation of the rotating tool at the end point of the preliminary joining process becomes unnecessary, and further, the inserting operation of the rotating tool at the start point of the second tab member joining process becomes unnecessary, so that the preparatory joining operations can be further improved in efficiency and speed.

When the friction stir welding is continued to the start point of the second tab member joining process without withdrawing the rotating tool, it is allowed that the friction stir welding is not finished at an end point of the second tab member joining process but continued from the start point to the end point of the second tab member joining process. Accordingly, the withdrawing operation of the rotating tool at the endpoint of the second tab member joining process becomes unnecessary, so that the preparatory joining operations can be further improved in efficiency and speed.

Even when the rotating tool is withdrawn in the first tab member joining process, by continuing the friction stir welding to the start point of the second tab member joining process without finishing it at the end point of the preliminary joining process, and directly shifting it to the second tab member joining process, the withdrawing operation of the rotating tool at the end point of the preliminary joining process becomes unnecessary, and in addition, the inserting operation of the rotating tool at the start point of the second tab member joining process becomes unnecessary, so that the preparatory joining operations can be further improved in efficiency and speed.

When the rotating tool is rotated clockwise, fine joining defects may occur on the left in the traveling direction of the rotating tool. Therefore, when the rotating tool to be used in the first tab member joining process is rotated clockwise, the positions of the start point and the endpoint of the first tab member joining process are set so that the metal members are positioned on the right in the traveling direction of the rotating tool. Accordingly, joining defects hardly occur on the metal member side, so that a high-quality joined body can be obtained.

When the rotating tool is rotated counterclockwise, fine joining defects may occur on the right in the traveling direction of the rotating tool. Therefore, when the rotating tool to be used in the first tab member joining process is rotated counterclockwise, the positions of the start point and the end point of the first tab member joining process are set so that the metal members are positioned on the left in the traveling direction of the rotating tool.

Further, a friction stir welding route from the endpoint of the first tab member joining process to the start point of the preliminary joining process is set on the first tab member, and a movement locus of the rotating tool of the movement from the end point of the first tab member joining process to the start point of the preliminary joining process is formed on the first tab member. Accordingly, in the process from the end point of the first tab member joining process to the start point of the preliminary joining process, joining defects hardly occur in the metal members, so that a high-quality joined body can be obtained.

The spacing distance between the friction stir welding route in the first tab member joining process and the friction stir welding route from the end point of the first tab member joining process to the start point of the preliminary joining process is preferably secured not less than the outer diameter of the shoulder of the rotating tool. In other words, preferably, the spacing distance between the movement locus formed when the rotating tool is moved from the start point to the end point of the first tab material joining process and the movement locus formed when the rotating tool is moved from the end point of the first tab member joining process to the start point of the preliminary joining process is secured not less than the outer diameter of the shoulder of the rotating tool. Accordingly, even if joining defects occur on the metal member side of the rotating tool in the process from the end point of the first tab member joining process to the start point of the preliminary joining process, the joining defects hardly reach the metal members, so that a high-quality joined body can be obtained.

When the rotating tool to be used in the second tab member joining process is rotated clockwise, preferably, the metal members are positioned on the right in the traveling direction of the rotating tool, however, depending on the positional relation between the metal members and the second tab member, the metal members may be positioned on the left in the traveling direction. In this case, a turning point is provided in the friction stir welding route from the start point to the end point of the second tab member joining process, and the positions of the start point, turning point, and end point of the second tab member joining process are set so that the metal members are positioned on the right in the traveling direction of the rotating tool at least in the friction stir welding route from the turning point to the end point. Accordingly, even when the metal members are positioned on the left in the traveling direction of the rotating tool until reaching the turning point and joining defects occur on the metal member side, in the subsequent friction stir welding from the turning point to the end point, the metal members are positioned on the right in the traveling direction of the rotating tool, so that the joining defects are corrected, and a high-quality joined body can be obtained.

When the rotating tool to be used in the second tab member joining process is rotated counterclockwise, preferably, the metal members are positioned on the left in the traveling direction of the rotating tool, however, depending on the positional relation between the metal members and the second tab member, the metal members may be positioned on the right in the traveling direction. In this case, a turning point is provided in the friction stir welding route from the start point to the endpoint of the second tab member joining process, and the positions of the start point, turning point, and endpoint of the second tab member joining process are set so that the metal members are positioned on the left in the traveling direction of the rotating tool at least in the friction stir welding route from the turning point to the end point.

In addition, a friction stir welding route from the end point of the preliminary joining process to the start point of the second tab member joining process is set on the second tab member, and a movement locus of the rotating tool of the movement from the endpoint of the preliminary joining process to the start point of the second tab member joining process is formed on the second tab member. Accordingly, in the process from the end point of the preliminary joining process to the start point of the second tab member joining process, joining defects hardly occur in the metal members, so that a high-quality joined body can be obtained.

Preferably, the spacing distance between the friction stir welding route from the end point of the preliminary joining process to the start point of the second tab member joining process and the friction stir welding route in the second tab member joining process is secured not less than the outer diameter of the shoulder of the rotating tool. In other words, the spacing distance between the movement locus formed when the rotating tool is moved from the end point of the preliminary joining process to the start point of the second tab member joining process and the movement locus formed when the rotating tool is moved from the start point to the end point of the second tab member joining process is secured not less than the outer diameter of the shoulder of the rotating tool. Accordingly, in the process from the end point of the preliminary joining process to the start point of the second tab member joining process, even if joining defects occur on the metal member side of the rotating tool, the joining defects hardly reach the metal members, so that a high-quality joined body can be obtained.

In the present invention, after a pilot bore is formed at the start position of the friction stir welding in the primary welding process, the friction stir welding is started from the pilot bore. In other words, at a position at which the stirring pin will be inserted, the pilot bore is formed. Accordingly, the load (pressure) of insertion of the stirring pin of the primary welding rotating tool to be used in the primary welding process can be reduced, so that the load on the friction stir welding machine can be reduced, and further, the insertion speed of the primary welding rotating tool can be increased, so that the operation time required for the primary welding can be shortened.

When the pilot bore is formed, the maximum bore diameter of the pilot bore is set to be smaller than the maximum outer diameter of the stirring pin of the primary welding rotating tool to be used in the primary welding process, and the stirring pin is press-fitted into the pilot bore while being rotated. Accordingly, the stirring pin comes into contact with the bore wall of the pilot bore and generates frictional heat before the shoulder of the primary welding rotating tool comes into contact with the surfaces of the metal members, etc., so that the time until plasticization and fluidization can be shortened.

When the pilot bore is formed, it is formed in the butting portion between the first tab member and the metal members, or the butting portion between the second tab member and the metal members. Accordingly, a part of the metal plasticized and fluidized when the stirring pin of the primary welding rotating tool is press-fitted into the pilot bore flows into a fine gap between the tab member and the metal members, and thereafter, the escape of the metal plasticized and fluidized into the gap is reduced, so that joining defects due to insufficient thickness hardly occur.

When the stirring pin of the primary welding rotating tool is press-fitted into the pilot bore formed in the butting portion between the tab member and the metal members, a force to separate the tab member and the metal members acts, and a gap may be created between the tab member and the metal members, and therefore, when a pilot bore is formed in the butting portion between the first tab member and the metal members, before the primary welding rotating tool is inserted into the pilot bore, inner corner portions formed by the metal members and the first tab member are preliminarily joined by welding, and similarly, when a pilot bore is formed in the butting portion between the second tab member and the metal members, inner corner portions formed by the metal members and the second tab member are preliminarily joined by welding.

In the present invention, a pull-out hole formed when the stirring pin of the preliminary joining rotating tool used in the second tab member joining process was withdrawn is used as the pilot bore, or the pull-out hole is expanded in diameter and used as the pilot bore. Accordingly, boring of the pilot bore can be omitted or simplified, so that the operation time can be shortened.

In the joining method disclosed in Document 6, a rotating tool to be used for the primary welding is used for preliminary joining, so that the joining strength obtained by the preliminary joining may become excessive. Particularly, when the metal members to be joined are thick in thickness, the rotating tool to be used for the primary welding becomes large in size, when a rotating tool is used for the preliminary joining, not only does the rotating tool wear faster, but also a great load is placed on the friction stir welding machine in spite of preparatory joining for the primary welding. Further, in Document 6, the feed rate (movement speed) of the rotating tool in the case of preliminary joining must be set equal to the feed rate in the primary welding, so that the time required for the preliminary joining cannot be shortened.

To solve this problem, the joining method according to an embodiment of the present invention includes a preliminary joining process in which a butting portion between metal members is friction stir welded; and a primary welding process in which the butting portion between the preliminarily joined metal members is primarily welded, wherein the preliminary joining process is executed by using a preliminary joining rotating tool smaller than a primary welding rotating tool to be used in the primary welding process.

Accordingly, preliminary joining can be performed with a load smaller than in the primary welding, so that the load on the friction stir welding machine at the time of preliminary joining can be reduced, and further, the movement speed (feed rate) of the preliminary joining rotating tool can be higher than the movement speed of the primary welding rotating tool, so that the operation time and cost for the preliminary joining can be reduced.

It is allowed that friction stir welding is performed from the surface side of the metal members in the preliminary joining process, and friction stir welding is performed from the back surface side of the metal members in the primary welding process, however, it is also allowed that friction stir welding is performed from the surface side of the metal members in both of the preliminary joining process and the primary welding process.

In the above-described preliminary joining process, friction stir welding may be applied intermittently to the butting portion, or friction stir welding may be performed continuously across the entire length of the butting portion.

In the case where water cooling is applied when performing the primary welding process, in the preliminary joining process, friction stir welding is performed continuously across the entire length of the butting portion between the metal members from the surface side of the metal members, and in the primary welding process, friction stir welding is applied to the preliminarily joined butting portion from the surface side of the metal members. When the preliminary joining is performed intermittently, cooling water may enter between the metal members and form an oxide film on the joined surface, however, by performing the preliminary joining continuously, cooling water hardly enters between the metal members, so that the quality of the joined portion can be improved.

In the present invention, a pilot bore is formed at the start position of the friction stir welding in the primary welding process, and the friction stir welding is started from the pilot bore. In other words, a pilot bore is formed at a position to which the stirring pin of the primary welding rotating tool will be inserted. Accordingly, the load (pressure) of insertion of the stirring pin of the primary welding rotating tool can be reduced, so that the load on the friction stir welding machine can be reduced, and further, the insertion speed of the primary welding rotating tool can be increased, so that the operation time required for the primary welding can be shortened.

When the pilot bore is formed, the maximum bore diameter of the pilot bore is set to be smaller than the maximum outer diameter of the stirring pin of the primary welding rotating tool, and the stirring pin is press-fitted into the pilot bore while being rotated. Accordingly, the stirring pin comes into contact with the bore wall of the pilot bore and generates frictional heat before the shoulder of the primary welding rotating tool comes into contact with the surfaces of the metal members, etc., so that the time until plasticization and fluidization can be shortened.

In the present invention, a pull-out hole formed when the stirring pin of the preliminary joining rotating tool was withdrawn is used as the pilot bore, or the pull-out hole is expanded in diameter and used as the pilot bore. Accordingly, boring of the pilot bore can be omitted or simplified, so that the operation time can be shortened.

When the primary welding rotating tool is rotated clockwise, a tunnel-like defect, etc., may occur on the left in the traveling direction of the primary welding rotating tool, and when the rotating tool is rotated counterclockwise, a tunnel-like defect may occur on the right in the traveling direction, and to divide such a tunnel-like defect, a repairing process in which a plasticized region formed through the primary welding process is friction stir welded, may be executed. In the repairing process, when the primary welding rotating tool is rotated clockwise, the plasticized region positioned on the left in the traveling direction of the primary welding rotating tool is friction stir welded, and when the primary welding rotating tool is rotated counterclockwise, the plasticized region positioned on the right in the traveling direction of the primary welding rotating tool is friction stir welded.

In the repairing process, friction stir welding is performed continuously along the friction stir welding route of the primary welding process. Accordingly, even when a tunnel-like defect is formed continuously along the friction stir welding route of the primary welding process, it can be reliably divided, so that joining defects hardly occur.

When executing the repairing process, a repairing rotating tool smaller than the primary welding rotating tool is used. Accordingly, the plasticized region can be prevented from excessively spreading.

When a start position or an end position of friction stir welding is provided on a tab member disposed lateral to a butting portion between metal members to be joined, along with the movement of the rotating tool, an oxide film on the contact surface between the metal members and the tab member is involved in the plasticized region formed on the metal members, so that joining defects may occur.

To solve this problem, the joining method according to an embodiment of the present invention includes: a primary welding process in which a butting portion between metal members is friction stir welded; and a repairing process in which a plasticized region formed on the metal members through the primary welding process is friction stir welded, wherein in the primary welding process, a start position or an end position of friction stir welding is provided on a tab member disposed lateral to the butting portion between the metal members, and in the repairing process, at least plasticized region adjacent to the tab member is friction stir welded.

Accordingly, even when the oxide film on the contact surface between the metal members and the tab member is involved in the plasticized region formed on the metal members, the oxide film can be divided by friction stir welding in the repairing process, so that joining defects hardly occur.

In the primary welding process, when the start position of friction stir welding is provided on the tab member disposed lateral to the butting portion between the metal members, in the repairing process, the plasticized region on the left in the traveling direction of the primary welding rotating tool is friction stir welded when the primary welding rotating tool is rotated clockwise, and the plasticized region on the right in the traveling direction of the primary welding rotating tool is friction stir welded when the primary welding rotating tool is rotated counterclockwise.

In the primary welding process, when an end position of friction stir welding is provided on the tab member disposed lateral to the butting portion between the metal members, in the repairing process, the plasticized region on the right in the traveling direction of the primary welding rotating tool is friction stir welded when the primary welding rotating tool is rotated clockwise, and the plasticized region on the left in the traveling direction of the primary welding rotating tool is friction stir welded when the primary welding rotating tool is rotated counterclockwise.

In the present invention, preferably, the repairing process is executed by using a repairing rotating tool smaller than the primary welding rotating tool. Accordingly, the plasticized region can be prevented from excessively spreading.

The friction stir welding route disclosed in Document 2 is set for friction stir welding the entire boundary surface between the bottom surface of the depression portion formed on the butting portion and the connecting plate without gaps, and is set not only for the purpose of dividing a tunnel-like defect. When the friction stir welding is performed mainly for dividing a tunnel-like defect, when the friction stir welding route as disclosed in Document 2 is set, not only does the movement distance of the rotating tool become excessively long, but the number of switches of the direction of the rotating tool also increases. In other words, when the friction stir welding is performed only for dividing a tunnel-like defect, if the friction stir welding route of Document 2 is diverted as it is, the rotating tool is moved wastefully, and the yield may be deteriorated.

To solve the above-described problem, the joining method according to an embodiment of the present invention includes: a primary welding process in which a butting portion between metal members is friction stir welded; and a traverse repairing process in which a plasticized region formed on the metal members is friction stir welded by moving a rotating tool so that the rotating tool traverses the plasticized region a plurality of times, wherein a friction stir welding route in the traverse repairing process is set so that a plurality of re-plasticized regions formed in the plasticized region through the traverse repairing process are spaced from each other on the friction stir welding route in the primary welding process.

According to the present invention, friction stir welding is performed so as to traverse the plasticized region formed through the primary welding process, so that even when a tunnel-like defect is formed along the plasticized region, this tunnel-like defect can be divided. As in the present invention, by spacing the plurality of re-plasticized regions on the friction stir welding route of the primary welding process from each other, in comparison with the case where the re-plasticized regions are formed in the entire plasticized region formed through the primary welding process, the number of traverses and the number of switches of the direction of the rotating tool become smaller, and as a result, the total extension of the friction stir welding route in the traverse repairing process becomes shorter, so that wasteful movements of the rotating tool are prevented, and eventually, the tunnel-like defect can be efficiently divided.

In the present invention, preferably, re-plasticized regions adjacent to each other are spaced from each other by a distance not less than the width of the re-plasticized regions. Accordingly, wasteful movements of the rotating tool are further prevented, and a tunnel-like defect can be more efficiently divided.

When, in the friction stir welding route in the traverse repairing process, a plurality of traverse routes traversing the plasticized region and transfer routes connecting end portions on the same side of the traverse routes adjacent to each other are provided, preferably, the transfer routes are made parallel to the friction stir welding route of the primary welding process. Accordingly, in comparison with the case where the transfer routes are inclined with respect to the friction stir welding route of the primary welding process, the transfer route distance becomes shorter, so that wasteful movements of the rotating tool are further prevented, and a tunnel-like defect can be more efficiently divided.

When the transfer routes are made parallel to the friction stir welding route of the primary welding process, preferably, the position of the transfer route is set so that a plasticized region formed by moving the rotating tool along the transfer route comes into contact with the lateral edge of the plasticized region formed through the primary welding process. Accordingly, the lengths of the traverse routes can be set to the extent that the outer diameter of the shoulder of the rotating tool is added to the width of the plasticized region formed through the primary welding process, so that wasteful movements of the rotating tool are further prevented, and a tunnel-like defect can be more efficiently divided.

In the present invention, it is desirable that the traverse repairing process is executed by using a rotating tool smaller than the rotating tool to be used in the primary welding process. Accordingly, plasticized regions (re-plasticized regions) formed through the traverse repairing process can be prevented from excessively spreading.

Joining defects due to the rotating tool used in the primary welding process are mainly formed in the range to $\frac{1}{3}$ from the upper end of the stirring pin, so that the length of a stirring pin of a rotating tool to be used in the traverse repairing process is preferably set to not less than $\frac{1}{3}$ of the length of the stirring pin of the rotating tool used in the primary welding process, and if it is longer than $\frac{1}{2}$, the plasticized region may excessively spread, so that the length of the stirring pin is preferably set to not more than $\frac{1}{2}$.

In the friction stir welding method of Document 9, the stirring pin is formed to be columnar, and the maximum bore diameter of the pilot bore is set to be smaller than the outer diameter of the stirring pin, however, in this case, the lower end surface of the stirring pin comes into contact with the surfaces of the metal members, and this causes a high press-fitting resistance at the press-fitting initial stage.

To solve this problem, according to an embodiment of the present invention, a friction stir welding method in which a pilot bore is formed at a start position of friction stir welding, and friction stir welding is started from the pilot bore, wherein a stirring pin of a rotating tool is formed into a circular truncated cone shape, a maximum bore diameter of the pilot bore is set to be larger than a minimum outer diameter of the stirring pin, and the maximum bore diameter of the pilot bore is set to be smaller than a maximum outer diameter of the stirring pin, and the stirring pin is press-fitted into the pilot bore while being rotated.

According to this friction stir welding method, a tip end portion of the stirring pin in a circular truncated cone shape enters the pilot bore, and a peripheral surface (lateral side) of the stirring pin entering the pilot bore comes into contact with a bore wall of the pilot bore, so that the metal is plasticized and fluidized from the bore wall side. In this state, the stirring pin is press-fitted while the peripheral surface of the stirring pin pushes away the plasticized and fluidized metal, so that a press-fitting resistance at the press-fitting initial stage can be reduced.

When the maximum bore diameter of the pilot bore is less than 50% of the maximum outer diameter of the stirring pin, the reduction degree of the press-fitting resistance may lower, and if the maximum bore diameter of the pilot bore is more than 90% of the maximum outer diameter of the stirring pin, the frictional heat production by the stirring pin is reduced and the plasticized and fluidized region becomes smaller, and the heat input is reduced, so that the load when the rotating tool moves increases, and defects easily occur. Therefore, in the present invention, preferably, the maximum bore diameter of the pilot bore is set to 50% to 90% of the maximum outer diameter of the stirring pin.

If the depth of the pilot bore is excessively great, the time for boring the pilot bore becomes long, so that preferably, the depth of the pilot bore is set to be smaller than the length of the stirring pin, however, if the depth of the pilot bore is less than 70% of the length of the stirring pin, the reduction degree of the press-fitting resistance may lower, and if the depth of the pilot bore is more than 90% of the length of the stirring pin, the frictional heat production by the stirring pin is reduced and the region plasticized and fluidized becomes smaller, and the heat input is reduced, so that the load when the rotating tool moves increases and defects easily occur. Therefore, in the present invention, preferably, the depth of the pilot bore is set to 70% to 90% of the length of the stirring pin.

If the capacity of the pilot bore is excessively high, the plasticized and fluidized region may become smaller and the press-fitting resistance when the stirring pin is press-fitted may increase, so that the capacity of the pilot bore is preferably set to be smaller than the volume of the stirring pin, however, if the capacity of the pilot bore is less than 40% of the volume of the stirring pin, the reduction degree of the press-fitting resistance may lower, and if the capacity of the pilot bore is more than 80% of the volume of the stirring pin, the frictional heat production by the stirring pin is reduced and the plasticized and fluidized region becomes smaller, and the heat input is reduced, so that the load when the rotating tool moves increases and defects easily occur. Therefore, in the present invention, the capacity of the pilot bore is preferably set to 40% to 80% of the volume of the stirring pin.

When the stirring pin is inserted into the start position of friction stir welding, the metal in a normal temperature state must be plasticized and fluidized, so that the insertion operation takes time.

To solve this problem, in the friction stir welding method according to an embodiment of the present invention, the rotating speed of the rotating tool when the stirring pin of the rotating tool is inserted into a start position of friction stir welding is set to be higher than the rotating speed of the rotating tool when the rotating tool is moved toward an end position of friction stir welding from the start position.

Accordingly, in comparison with the case where the rotating speed of the rotating tool when the stirring pin is inserted into the start position of friction stir welding (rotating speed for insertion) is set to be equal to the rotating speed of the rotating tool when the rotating tool is moved from the start position to the end position of friction stir welding (rotating speed for movement), the time until the metal is plasticized and fluidized becomes shorter, so that the stirring pin inserting operation at the start position of friction stir welding can be quickly performed.

If the rotating speed for insertion becomes greater than 3.0 times the rotating speed for movement, the heat input into the metal increases and the metal temperature excessively rises, so that the rotating speed for insertion is preferably not more than 3.0 times. If the rotating speed for insertion is less than 1.5 times the rotating speed for movement of the rotating tool, the operation time shortening effect becomes smaller, so that the rotating speed for insertion is preferably not less than 1.5 times.

When the stirring pin is withdrawn from the end position of friction stir welding, the plasticized and fluidized metal clings to the stirring pin, so that the stirring pin withdrawal resistance (pulling resistance) is great, and the stirring pin withdrawing operation takes time.

To solve this problem, in the friction stir welding method according to an embodiment of the present invention, the rotating speed of the rotating tool when the stirring pin of the rotating tool reaching the end position of friction stir welding is withdrawn from the end position is set to be higher than the rotating speed of the rotating tool when the rotating tool is moved from the start position to the end position of friction stir welding.

Accordingly, in comparison with the case where the rotating speed of the rotating tool when the stirring pin is withdrawn from the end position of friction stir welding (rotating speed for withdrawal) is equal to the rotating speed for movement, the withdrawal resistance of the stirring pin becomes smaller, so that the stirring pin withdrawing operation at the end position of friction stir welding can be quickly performed.

If the rotating speed for withdrawal becomes more than 3.0 times the rotating speed for movement of the rotating tool, the heat input into the metal increases and the temperature of the metal excessively rises, so that the rotating speed for withdrawal is preferably not more than 3.0 times. If the rotating speed for withdrawal is less than 1.5 times the rotating speed for movement, the operation time shortening effect becomes smaller, so that the rotating speed for withdrawal is preferably not less than 1.5 times.

Effects of the Invention

According to the joining method of the present invention, airtightness and water-tightness of the joined portion can be improved. Further, according to the joining method and the friction stir welding method of the present invention, joining operations can be improved in efficiency and speed.

BRIEF DESCRIPTION OF THE DRAWINGS

FIG. 1(a) to FIG. 1(d) are drawings for describing arrangement of metal members, a first tab member, and a second tab member of a first embodiment, and FIG. 1(a) is a perspective view, FIG. 1(b) is a plan view, FIG. 1(c) is a sectional view along the I-I line of FIG. 1(b), and FIG. 1(d) is a sectional view along the II-II line of FIG. 1(b);

FIG. 3(a) and FIG. 3(b) are schematic side views for describing a situation of insertion of the preliminary joining rotating tool to a start position;

FIG. 5(a) is a sectional view along the III-III line of FIG. 4, and FIG. 5(b) and FIG. 5(c) are sectional views for describing a first primary welding process of the first embodiment;

FIG. 6(a) and FIG. 6(b) are views for describing a region to be friction stir welded in a first repairing process of the first embodiment, and FIG. 6(a) is a plan view and FIG. 6(b) is a sectional view along IV-IV line of FIG. 6(a);

FIG. 10(a) to FIG. 10(c) are sectional views for describing a second primary welding process of the first embodiment;

FIG. 11(a) is a side view showing a primary welding rotating tool to be used in the first primary welding process, and FIG. 11(b) is a side view showing a primary welding rotating tool to be used in the second primary welding process;

FIG. 15(a) and FIG. 15(b) are views for describing arrangement of metal members, a first tab member, and a second tab member of a second embodiment, and FIG. 15(a) is a perspective view and FIG. 15(b) is a plan view;

FIG. 16(a) and FIG. 16(b) are views for describing a first preparatory process of the second embodiment;

FIG. 19(a) and FIG. 19(b) are plan views for describing a modified example of the first primary welding process of the second embodiment;

FIG. 20(a) and FIG. 20(b) are plan views for describing a first repairing process of the second embodiment;

Description of the Reference Numerals

Figure 2:
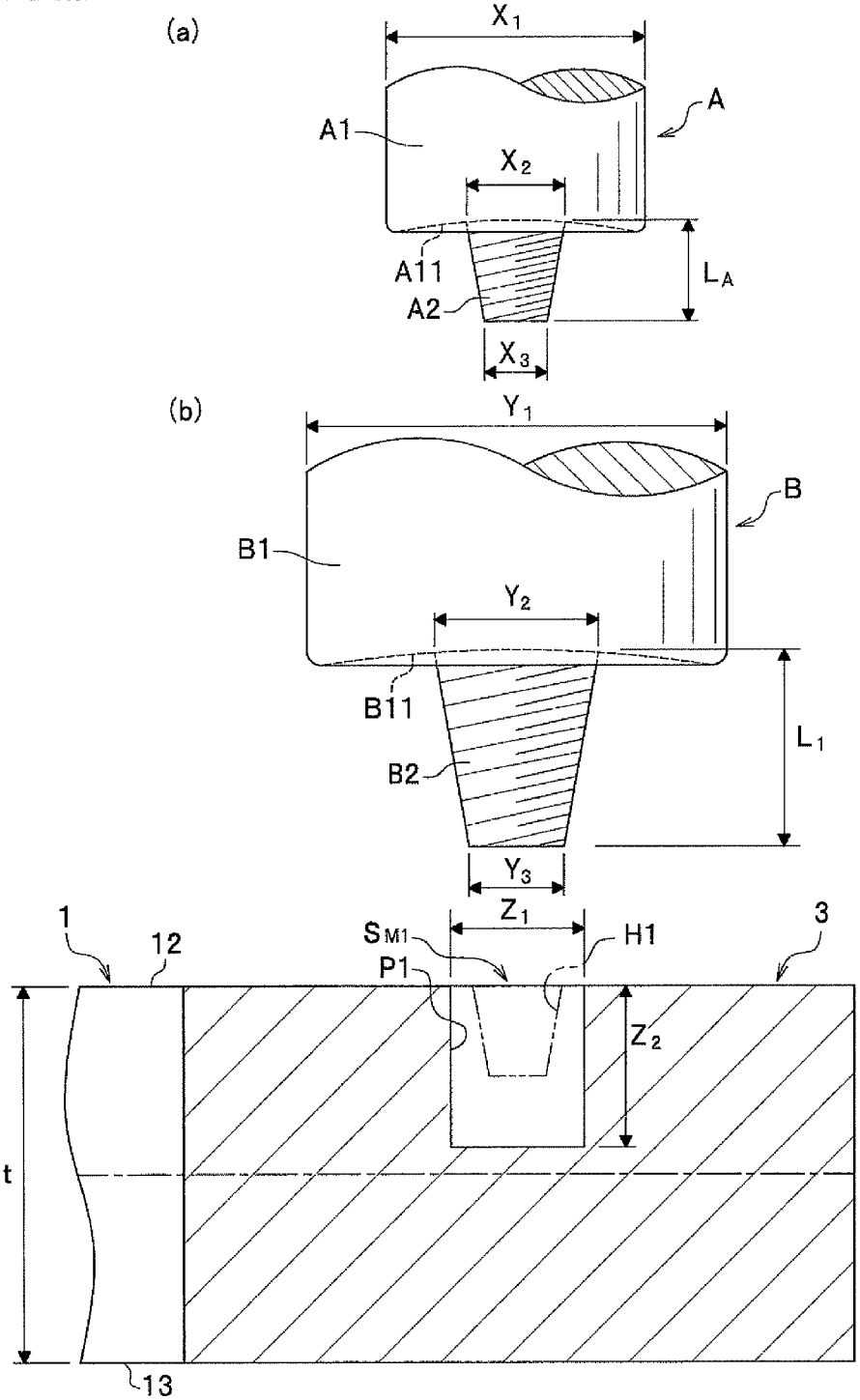
FIG. 2(a) is a side view for describing a preliminary joining rotating tool.
FIG. 2(b) is a side view for describing a primary welding rotating tool.

| | |
|---|---|
| 1 | metal member |
| 2 | first tab member |
| 3 | second tab member |
| J1 to J3 | butting portion |
| A | preliminary joining rotating tool |
| A1 | shoulder |
| A2 | stirring pin |
| B | primary welding rotating tool |
| B1 | shoulder |
| B2 | stirring pin |
| C | repairing rotating tool |
| D | traversing rotating tool |
| P1 | pilot bore |
| W1, W2 | plasticized region |
| W3 | re-plasticized region |

BEST MODE FOR CARRYING OUT THE INVENTION

As a best mode for carrying out the present invention, a method for joining metal members to each other by using friction stir welding, in which after a butting portion between metal members is subjected to friction stir welding as preliminary joining, the preliminarily joined butting portion is subjected to friction stir welding as primary welding, is illustrated.

First Embodiment

In a first embodiment, as shown in FIG. 1(a) to FIG. 1(d), linear joining of metal members 1, 1 is illustrated.

First, metal members 1, 1 to be joined will be described in detail, and a first tab member 2 and a second tab member 3 to be used when joining these metal members 1, 1 will also be described in detail.

The metal member 1 is made of metal materials which can be friction stir welded such as aluminum, an aluminum alloy, copper, a copper alloy, titanium, a titanium alloy, magnesium, and a magnesium alloy, etc. In the present invention, one metal member 1 and the other metal member 1 are made of metal materials having the same composition. The shapes and dimensions of the metal members 1, 1 are not specifically limited, however, preferably, at least, their thicknesses at the butting portion J1 are equal.

A first tab member 2 and a second tab member 3 are disposed so as to sandwich the butting portion J1 between the metal members 1, 1, and are disposed along the metal members 1, 1 and cover seams (boundaries) between the metal members 1, 1 on the lateral sides 14 of the metal members 1. The materials of the first tab member 2 and the second tab member 3 are not specifically limited, however, in the present embodiment, they are made of metal materials having the same composition as that of the metal members 1. The shapes and dimensions of the first tab member 2 and the second tab member 3 are not specifically limited, however, in the present invention, their thicknesses are set to be equal to the thickness of the metal members 1 at the butting portion J1.

Next, a rotating tool A to be used for preliminary joining (hereinafter, referred to as "preliminary joining rotating tool A") and a rotating tool B to be used for primary welding (hereinafter, referred to as "primary welding rotating tool B") will be described in detail with reference to FIG. 2(a) and FIG. 2(b).

The preliminary joining rotating tool A shown in FIG. 2(a) is made of a metal material such as tool steel harder than the metal members 1, and includes a shoulder A1 in a columnar shape and a stirring pin (probe) A2 provided so as to project from the lower end surface A11 of the shoulder A1. The dimensions and shape of the preliminary joining rotating tool A are set according to the materials and thicknesses of the metal members 1, and at least, they are made smaller than the primary welding rotating tool B (see FIG. 2(b)) to be used in a first primary welding process described later. Accordingly, preliminary joining can be performed with a load smaller than in the primary welding, so that the load on a friction stir welding machine during preliminary joining can be reduced, and further, the movement speed (feed rate) of the preliminary joining rotating tool A can be set to be higher than that of the primary welding rotating tool B, so that the operation time and cost for the preliminary joining can be reduced.

The lower end surface A11 of the shoulder A1 is a portion which performs a role of preventing plasticized and fluidized metal from scattering around, and is shaped into a depressed surface in the present embodiment. The outer diameter $X_1$ of the shoulder A1 is not specifically limited, however, in the present embodiment, it is smaller than the outer diameter $Y_1$ of the shoulder B1 of the primary welding rotating tool B.

The stirring pin A2 is hung down from the center of the lower end surface A11 of the shoulder A1, and is shaped into a circular truncated cone shape in the present embodiment. On the peripheral surface of the stirring pin A2, a stir wing carved spirally is formed. The outer diameter of the stirring pin A2 is not specifically limited, however, in the present embodiment, the maximum outer diameter (upper end diameter) $X_2$ is smaller than the maximum outer diameter (upper end diameter) $Y_2$ of the stirring pin B2 of the primary welding rotating tool B, and the minimum outer diameter (lower end diameter) $X_3$ is smaller than the minimum outer diameter (lower end diameter) $Y_3$ of the stirring pin B2. The length $L_A$ of the stirring pin A2 is preferably set to 3% to 15% of the thickness t (see FIG. 2(b)) of the metal members 1 at the butting portion J1 (see FIG. 1(a)), and at least, preferably, it is set to be smaller than the length $L_1$ of the stirring pin B2 of the primary welding rotating tool B.

The primary welding rotating tool B shown in FIG. 2(b) is made of a metal material such as tool steel harder than the metal members 1, and includes a shoulder B1 in a columnar shape and a stirring pin (probe) B2 provided so as to project from the lower end surface B11 of the shoulder B1.

The lower end surface B11 of the shoulder B1 is shaped into a depressed surface as in the case of the preliminary joining rotating tool A. The stirring pin B2 is hung down from the center of the lower end surface B11 of the shoulder B1 and is shaped into a circular truncated cone shape toward the end in the present embodiment. On the peripheral surface of the stirring pin B2, a stir wing carved spirally is formed. The length $L_1$ of the stirring pin B2 is preferably set to not less than ½ and not more than ¾ of the thickness t of the metal members 1 at the butting portion J1 (see FIG. 1(a)), and more preferably set so as to satisfy the relation of $1.01 \leq L_1/t \leq 1.10$.

Hereinafter, a joining method of the present embodiment will be described in detail. The joining method of the present embodiment includes: (1) a preparation process, (2) a first preparatory process, (3) a first primary welding process, (4) a first repairing process, (5) a first traverse repairing process, (6) a second preparatory process, (7) a second primary welding process, (8) a second repairing process, and (9) a second traverse repairing process. The first preparatory process, the first primary welding process, the first repairing process, and the first traverse repairing process are executed from the surface 12 side of the metal members 1, and the second preparatory process, the second primary welding process, the second repairing process, and the second traverse repairing process are executed from the back surface 13 side of the metal members 1.

(1) Preparation Process

The preparation process will be described with reference to FIG. 1(a) to FIG. 1(d). The preparation process is for preparing metal members 1, 1 to be joined and splint members (the first tab member 2 and the second tab member 3) on which a start position and an end position of friction stir welding are provided, and in the present embodiment, includes a butting process in which the metal members 1, 1 to be joined are butted against each other, a tab member disposing process in which the first tab member 2 and the second tab member 3 are disposed on both sides of the butting portion J1 between the metal members 1, 1, and a welding process in which the first tab member 2 and the second tab member 3 are preliminarily joined to the metal members 1, 1 by welding.

In the butting process, as shown in FIG. 1(c), with the lateral side 11 of one metal member 1, the lateral side 11 of the other metal member 1 is brought into contact, and the surface 12 of one metal member 1 and the surface 12 of the other metal member 1 are made flush with each other, and further, the back surface 13 of one metal member 1 and the back surface 13 of the other metal member 1 are made flush with each other.

In the tab member disposing process, as shown in FIG. 1(b), the first tab member 2 is disposed on one end side of the butting portion J1 between the metal members 1, 1 and its contact surface 21 is brought into contact with the lateral sides 14, 14 of the metal members 1, 1, and the second tab member 3 is disposed on the other end side of the butting portion J1 and its contact surface 31 is brought into contact with the lateral sides 14, 14 of the metal members 1, 1. At this time, as shown in FIG. 1(d), the surface 22 of the first tab member 2 and the surface 32 of the second tab 3 are made flush with the surfaces 12 of the metal members 1, and the back surface 23 of the first tab member 2 and the back surface 33 of the second tab member 3 are made flush with the back surfaces 13 of the metal members 1.

In the welding process, as shown in FIG. 1(a) and FIG. 1(b), inner corner portions 2a, 2a formed by the metal members 1 and the first tab member 2 (that is, the corner portions 2a, 2a formed by the lateral sides 14 of the metal members 1 and the lateral sides 24 of the first tab member 2) are welded to join the metal members 1 and the first tab member 2, and inner corner portions 3a, 3a formed by the metal members 1 and the second tab member 3 (that is, corner portions 3a, 3a formed by the lateral sides 14 of the metal members 1 and the lateral sides 34 of the second tab member 3) are welded to join the metal members 1 and the second tab member 3. The entire lengths of the inner corner portions 2a and 3a may be continuously welded, or may be intermittently welded.

After the preparation process is finished, the metal members 1, 1, the first tab member 2, and the second tab member 3 are placed on a platform of a friction stir welding machine not shown, and locked so as not to move by using a jig such as a clamp not shown. When the welding process is omitted, the butting process and the tab member disposing process are executed on the platform of the friction stir welding machine not shown.

(2) First Preparatory Process

The first preparatory process is performed previous to the first primary welding process, and in the present embodiment, includes a first tab member joining process in which the butting portion J2 between the metal members 1, 1 and the first tab member 2 is joined, a preliminary joining process in which the butting portion J1 between the metal members 1, 1 is preliminarily joined, a second tab member joining process in which a butting portion J3 between the metal members 1, 1 and the second tab member 3 is joined, and a pilot bore forming process in which a pilot bore is formed at a start position of friction stir welding of the first primary welding process.

Figure 4:
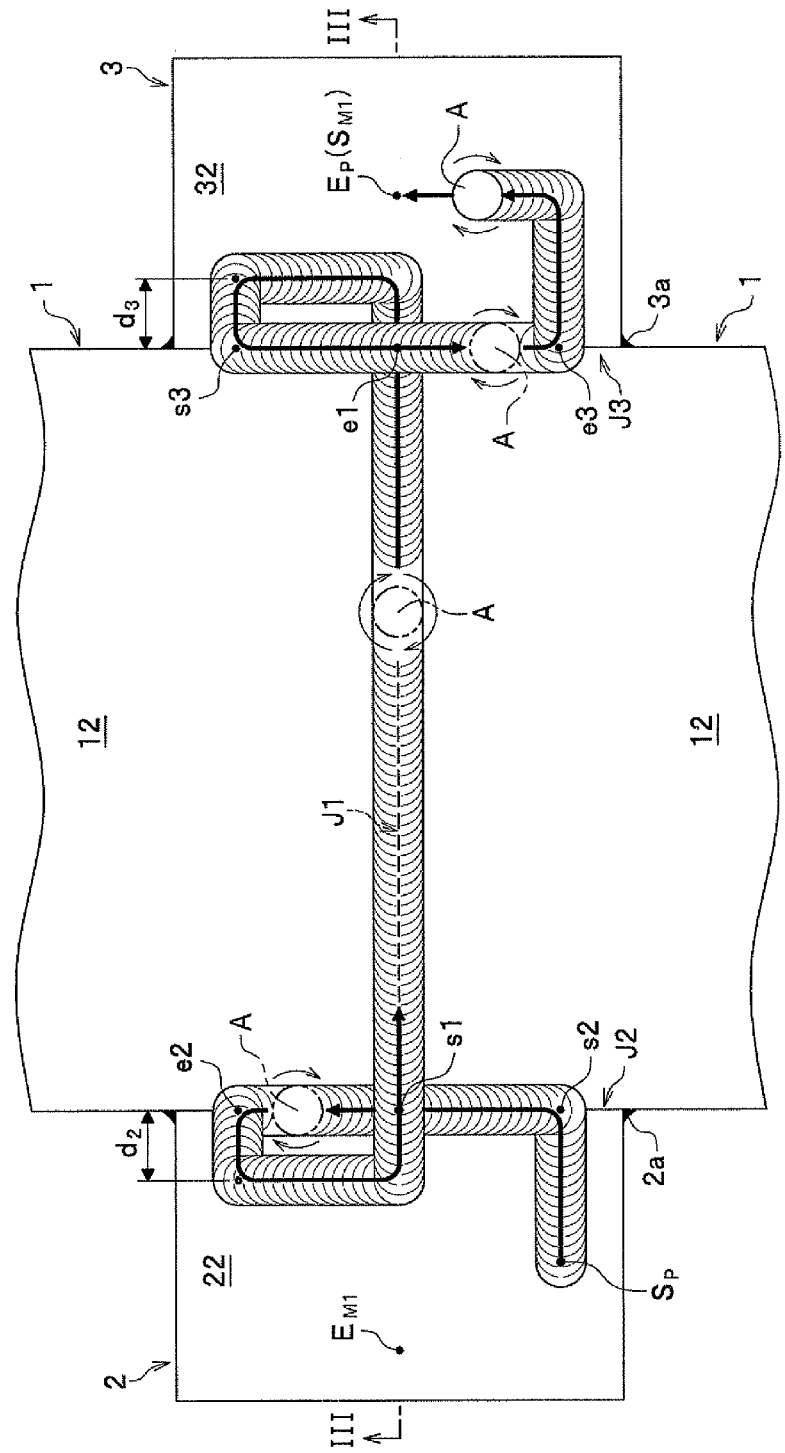
FIG. 4 is a plan view for describing a first tab member joining process, a preliminary joining process, and a second tab member joining process of the first embodiment.

In the first preparatory process of the present embodiment, as shown in FIG. 4, by moving one preliminary joining rotating tool A to form a one-stroke movement locus (bead), the butting portions J1, J2, and J3 are successively friction stir welded. In other words, the stirring pin A2 (see FIG. 2(a)) of the preliminary joining rotating tool A inserted into the start position $S_P$ of friction stir welding is moved to the end position $E_P$ without being withdrawn midway, whereby the first tab member joining process, the preliminary joining process, and the second tab member joining process are successively executed. In the present embodiment, the start position $S_P$ of friction stir welding is provided on the first tab member 2, and the end position $E_P$ is provided on the second tab member 3, however, this is not intended to limit the positions of the start position $S_P$ and the end position $E_P$.

Friction stir welding steps in the first preparatory process of the present embodiment will be described with reference to FIG. 3(a) to FIG. 3(b) and FIG. 4.

First, as shown in FIG. 3(a), the preliminary joining rotating tool A is positioned just above the start position $S_P$ provided on an appropriate location on the first tab member 2, and then, the preliminary joining rotating tool A is moved down while being rotated clockwise and the stirring pin A2 is pressed against the start position $S_P$. The rotating speed of the preliminary joining rotating tool A is set according to the dimensions and shape of the stirring pin A2 and the materials and the thicknesses of the metal members 1 to be friction stir welded, etc., and in many cases, the rotating speed is set within a range of 500 to 2000 (rpm).

When the stirring pin A2 comes into contact with the surface 22 of the first tab member 2, the metal around the stirring pin A2 is plasticized and fluidized due to frictional heat, and as shown in FIG. 3(b), the stirring pin A2 is inserted into the first tab member 2. The insertion speed (moving-down speed) of the preliminary joining rotating tool A is set according to the dimensions and shape of the stirring pin A2 and the material and thickness etc., of the member on which the start position $S_P$ is provided, and in many cases, the insertion speed is set within a range of 30 to 60 (mm/min).

When the entirety of the stirring pin A2 gets into the first tab member 2 and the entire lower end surface A11 of the shoulder A1 comes into contact with the surface 22 of the first tab member 2, as shown in FIG. 4, the preliminary joining rotating tool A is relatively moved to the start point s2 of the first tab member joining process while being rotated.

The movement speed (feed rate) of the preliminary joining rotating tool A is set according to the dimensions and shape of the stirring pin A2 and the materials and thicknesses of the metal members 1 to be friction stir welded, etc., and in many cases, the movement speed is set within a range of 100 to 1000 (mm/min). The rotating speed of the preliminary joining rotating tool A for the traveling is set to be equal to or lower than the rotating speed for the inserting. When the preliminary joining rotating tool A is moved, the axis line of the shoulder A1 may be inclined slightly to the back side of the traveling direction with respect to the vertical line, however, when it is not inclined but set vertically, the traveling direction of the preliminary joining rotating tool A can be easily changed, and complicated movements thereof are possible. When the preliminary joining rotating tool A is moved, the metal around the stirring pin A2 is sequentially plasticized and fluidized, and at a position apart from the stirring pin A2, the plasticized and fluidized metal hardens again.

When friction stir welding is performed continuously to the start point s2 of the first tab member joining process by relatively moving the preliminary joining rotating tool A, the preliminary joining rotating tool A is not withdrawn at the start point s2 but directly shifted to the first tab member joining process.

In the first tab member joining process, the butting portion J2 between the first tab member 2 and the metal members 1, 1 is friction stir welded. In detail, a friction stir welding route is set on the seam (boundary) between the metal members 1, 1 and the first tab member 2, and by relatively moving the preliminary joining rotating tool A along this route, the butting portion J2 is friction stir welded. In the present embodiment, friction stir welding is performed continuously from the start point s2 to the end point e2 of the first tab member joining process without withdrawing the preliminary joining rotating tool A midway.

When the preliminary joining rotating tool A is rotated clockwise, fine joining defects may occur on the left in the traveling direction of the preliminary joining rotating tool A, and therefore preferably, the positions of the start point s2 and the end point e2 of the first tab member joining process are set so that the metal members 1, 1 are positioned on the right in the traveling direction of the preliminary joining rotating tool A. Accordingly, joining defects hardly occur on the metal member 1 side, so that a high-quality joined body can be obtained.

Incidentally, when the preliminary joining rotating tool A is rotated counterclockwise, fine joining defects may occur on the right in the traveling direction of the preliminary joining rotating tool A, and therefore preferably, the positions of the start point and end point of the first tab member joining process are set so that the metal members 1, 1 are positioned on the left in the traveling direction of the preliminary joining rotating tool A. In detail, the start point is provided at the position of the end point e2 set in the case where the preliminary joining rotating tool A is rotated clockwise, and the end point is provided at the position of the start point s2 set in the case where the preliminary joining rotating tool A is rotated clockwise although these are not shown.

When the stirring pin A2 of the preliminary joining rotating tool A gets into the butting portion J2, a force to separate the metal members 1 and the first tab member 2 from each other acts, however, the inner corner portions 2a formed by the metal members 1 and the first tab member 2 are preliminarily joined by welding, so that separation does not occur between the metal members 1 and the first tab member 2.

When the preliminary joining rotating tool A reaches the endpoint e2 of the first tab member joining process, friction stir welding is not finished at the endpoint e2 but continued to the start point s1 of the preliminary joining process, and directly shifted to the preliminary joining process. In other words, friction stir welding is continued from the end point e2 of the first tab member joining process to the start point s1 of the preliminary joining process without withdrawing the preliminary joining rotating tool A, and further, the process is shifted to the preliminary joining process without withdrawing the preliminary joining rotating tool A at the start point s1. Accordingly, the operation for withdrawing the preliminary joining rotating tool A at the endpoint e2 of the first tab member joining process becomes unnecessary, and the operation for inserting the preliminary joining rotating tool A at the start point s1 of the preliminary joining process becomes unnecessary, so that the preparatory joining operation can be improved in efficiency and speed.

In the present embodiment, a friction stir welding route from the end point e2 of the first tab member joining process to the start point s1 of the preliminary joining process is set on the first tab member 2, and a movement locus of the traveling of the preliminary joining rotating tool A from the end point e2 of the first tab member joining process to the start point s1 of the preliminary joining process is formed on the first tab member 2. Accordingly, in the process from the end point e2 of the first tab member joining process to the start point s1 of the preliminary joining process, joining defects hardly occur in the metal members 1, 1, so that a high-quality joined body can be obtained.

A spacing distance $d_2$ between the friction stir welding route in the first tab member joining process and a portion parallel to the friction stir welding route in the first tab member joining process of the friction stir welding route from the end point e2 of the first tab member joining process to the start point s1 of the preliminary joining process is secured not less than the outer diameter $X_1$ (see FIG. 2(a)) of the shoulder A1 of the preliminary joining rotating tool A. In other words, the spacing distance $d_2$ between the movement locus formed when the preliminary joining rotating tool A is moved from the start point s2 to the end point e2 of the first tab member joining process and the movement locus formed when the preliminary joining rotating tool A is moved from the end point e2 of the first tab member joining process to the start point s1 of the preliminary joining process is secured not less than the outer diameter $X_1$ of the shoulder A1 of the preliminary joining rotating tool A. Accordingly, in the process from the end point e2 of the first tab member joining process to the start point s1 of the preliminary joining process, even if joining defects occur on the metal member 1 side of the preliminary joining rotating tool A, the joining defects hardly reach the metal members 1, so that a high-quality joined body can be obtained.

In the preliminary joining process, the butting portion J1 (see FIG. 1(a)) of the metal members 1, 1 is friction stir welded. In detail, a friction stir welding route is set on the seam (boundary) between the metal members 1, 1, and by relatively moving the preliminary joining rotating tool A along this route, friction stir welding is performed continuously across the entire length of the butting portion J1. In the present embodiment, the friction stir welding is continuously performed from the start point s1 to the end point e1 of the preliminary joining process without withdrawing the preliminary joining rotating tool A midway. Accordingly, the withdrawing operation of the preliminary joining rotating tool A during the preliminary joining process is no longer necessary, so that the preparatory joining operation can be further improved in efficiency and speed.

When the preliminary joining rotating tool A reaches the end point e1 of the preliminary joining process, the friction stir welding is not finished at the endpoint e1 but continued to the start point s3 of the second tab member joining process, and is directly shifted to the second tab member joining process. In other words, the friction stir welding is continued from the end point e1 of the preliminary joining process to the start point s3 of the second tab member joining process without withdrawing the preliminary joining rotating tool A, and further, shifted to the second tab member joining process without withdrawing the preliminary joining rotating tool A at the start point s3. Accordingly, the operation for withdrawing the preliminary joining rotating tool A at the end point e1 of the preliminary joining process becomes unnecessary, and the operation for inserting the preliminary joining rotating tool A at the start point s3 of the second tab member joining process becomes unnecessary, so that the preparatory joining operation can be further improved in efficiency and speed.

In the present embodiment, the friction stir welding route from the end point e1 of the preliminary joining process to the start point s3 of the second tab member joining process is set on the second tab member 3, and the movement locus of the traveling of the preliminary joining rotating tool A from the end point e1 of the preliminary joining process to the start point s3 of the second tab member joining process is formed on the second tab member 3. Accordingly, in the process from the end point e1 of the preliminary joining process to the start point s3 of the second tab member joining process, joining defects hardly occur in the metal members 1, so that a high-quality joined body can be obtained.

The spacing distance $d_3$ between a portion parallel to the friction stir welding route of the second tab member joining process described later in the friction stir welding route from the end point e1 of the preliminary joining process to the start point s3 of the second tab member joining process and the friction stir welding route of the second tab member joining process is secured not less than the outer diameter $X_1$ (see FIG. 2(a)) of the shoulder A1 of the preliminary joining rotating tool A. In other words, the spacing distance $d_3$ between the movement locus formed when the preliminary joining rotating tool A is moved from the end point e1 of the preliminary joining process to the start point s3 of the second tab member joining process and the movement locus formed when the preliminary joining rotating tool A is moved from the start point s3 to the end point e3 of the second tab member joining process is secured not less than the outer diameter $X_1$ of the shoulder A1 of the preliminary joining rotating tool A. Accordingly, in the process from the end point e1 of the preliminary joining process to the start point s3 of the second tab member joining process, even when joining defects occur on the metal member 1 side of the preliminary joining rotating tool A, the joining defects hardly reach the metal members 1, so that a high-quality joined body can be obtained.

In the second tab member joining process, the butting portion J3 between the metal members 1, 1 and the second tab member 3 is friction stir welded. In detail, a friction stir welding route is set on the seam (boundary) between the metal members 1, 1 and the second tab member 3, and by relatively moving the preliminary joining rotating tool A along this route, the butting portion J3 is friction stir welded. In the present embodiment, friction stir welding is continued from the start point s3 to the end point e3 of the second tab member joining process without withdrawing the preliminary joining rotating tool A midway.

The preliminary joining rotating tool A is rotated clockwise, therefore, the positions of the start point s3 and the endpoint e3 of the second tab member joining process are set so that the metal members 1, 1 are positioned on the right in the traveling direction of the preliminary joining rotating tool A. Accordingly, joining defects hardly occur on the metal member 1 side, so that a high-quality joined body can be obtained. Incidentally, when the preliminary joining rotating tool A is rotated counterclockwise, preferably, the positions of the start point and the end point of the second tab member joining process are set so that the metal members 1, 1 are positioned on the left in the traveling direction of the preliminary joining rotating tool A. In detail, the start point is provided at the position of the endpoint e3 set when the preliminary joining rotating tool A is rotated clockwise, and the end point is set at the position of the start point s3 set when the preliminary joining rotating tool A is rotated clockwise although these are not shown.

When the stirring pin A2 (see FIG. 2(a)) of the preliminary joining rotating tool A gets into the butting portion J3, a force to separate the metal members 1 and the second tab member 3 from each other acts, however, the inner corner portions 3a between the metal members 1 and the second tab member 3 are preliminarily joined by welding, so that separation does not occur between the metal members 1 and the second tab member 3.

When the preliminary joining rotating tool A reaches the end point e3 of the second tab member joining process, friction stir welding is not finished at the end point e3 but continued to the end position $E_P$ provided on the second tab member 3. In the present embodiment, the end position $E_P$ is provided on the extension of the seam (boundary) between the metal members 1, 1 appearing on the surface 12 side of the metal members 1. Incidentally, the end position $E_P$ is the start position $S_{M1}$ of the friction stir welding in the first primary welding process described later.

When the preliminary joining rotating tool A reaches the end position $E_P$, the preliminary joining rotating tool A is moved up while being rotated to withdraw the stirring pin A2 (see FIG. 2(a)) from the end position E.

The withdrawal speed (moving-up speed) of the preliminary joining rotating tool A is set according to the dimensions and shape of the stirring pin A2 and the material and thickness, etc., of the member on which the end position $E_P$ is provided, etc., and in many cases, the withdrawal speed is set in the range of 30 to 60 (mm/min). The rotating speed of the preliminary joining rotating tool A for the withdrawing is set to be equal to or higher than the rotating speed for the traveling.

Subsequently, the pilot bore forming process is executed. The pilot bore forming process is a process for forming a pilot bore P1 at the start position $S_{M1}$ of friction stir welding of the first primary welding process as shown in FIG. 2(b). In other words, the pilot bore forming process is a process for forming a pilot bore P1 at a position to which the stirring pin B2 of the primary welding rotating tool B will be inserted.

The pilot bore P1 is formed for reducing the insertion resistance (press-fitting resistance) of the stirring pin B2 of the primary welding rotating tool B, and in the present embodiment, it is formed by expanding the diameter of a pull-out hole H1 formed when the stirring pin A2 (see FIG. 2(a)) of the preliminary joining rotating tool A is withdrawn by means of drilling not shown, etc. By using the pull-out hole H1, the process to form the pilot bore P1 can be simplified, so that the operation time can be shortened. The form of the pilot bore P1 is not specifically limited, and in the present embodiment, it is formed into a cylindrical shape. In the present embodiment, the pilot bore P1 is formed in the second tab member 3, however, the position of the pilot bore P1 is not specifically limited, and it may be formed in the first tab member 2 or may be formed in the butting portion J2 or J3, however, preferably, it is formed on the extension of the seam (boundary) between the metal members 1, 1 appearing on the surface 12 side of the metal members 1 as described in the present embodiment.

The maximum bore diameter $Z_1$ of the pilot bore P1 is smaller than the maximum outer diameter (upper end diameter) $Y_2$ of the stirring pin B2 of the primary welding rotating tool B, however, preferably, it is set to 50% to 90% of the maximum outer diameter $Y_2$ of the stirring pin B2. If the maximum bore diameter $Z_1$ of the pilot bore P1 is less than 50% of the maximum outer diameter $Y_2$ of the stirring pin B2, the reduction degree of the press-fitting resistance of the stirring pin B2 may become lower, and if the maximum bore diameter $Z_1$ of the pilot bore P1 is more than 90% of the maximum outer diameter $Y_2$ of the stirring pin B2, frictional heat production by the stirring pin B2 is reduced and the plasticized and fluidized region becomes smaller, and the heat input is reduced, therefore, the load for moving the primary welding rotating tool B increases and defects easily occur.

If the depth $Z_2$ of the pilot bore P1 is excessively great, the time required for machining the pilot bore P1 becomes longer, so that preferably, the depth $Z_2$ of the pilot bore P1 is set to be smaller than the length $L_1$ of the stirring pin B2, however, if the depth $Z_2$ of the pilot bore P1 is less than 70% of the length $L_1$ of the stirring pin B2, the reduction degree of the press-fitting resistance may become lower, and if the depth $Z_2$ of the pilot bore P1 is more than 90% of the length $L_1$ of the stirring pin B2, frictional heat production by the stirring pin B2 is reduced and the plasticized and fluidized region becomes smaller, and the heat input is reduced, therefore, the load for moving the primary welding rotating tool B increases and defects easily occur. Accordingly, the depth $Z_2$ of the pilot bore P1 is preferably set to 70% to 90% of the length $L_1$ of the stirring pin B2.

If the capacity of the pilot bore P1 is excessively large, the plasticized and fluidized region may become smaller and the press-fitting resistance when the stirring pin B2 is press-fitted may increase, therefore, preferably, the capacity of the pilot bore P1 is set to be smaller than the volume of the stirring pin B2, however, if the capacity of the pilot bore P1 is less than 40% of the volume of the stirring pin B2, the reduction degree of the press-fitting resistance may become lower, and if the capacity of the pilot bore P1 is more than 80% of the volume of the stirring pin B2, the frictional heat production by the stirring pin B2 is reduced and the plasticized and fluidized region becomes smaller, and the heat input is reduced, therefore, the load for moving the primary welding rotating tool B increases and defects easily occur. Accordingly, the capacity of the pilot bore P1 is preferably set to 40% to 80% of the volume of the stirring pin B2.

In the present embodiment, the case where the pilot bore P1 is formed by expanding the diameter of the pull-out hole H1 of the stirring pin A2 (see FIG. 2(a)) of the preliminary joining rotating tool A is illustrated, however, when the maximum outer diameter $X_2$ of the stirring pin A2 is larger than the minimum outer diameter $Y_3$ of the stirring pin B2 of the primary welding rotating tool B and the maximum outer diameter $X_2$ of the stirring pin A2 is smaller than the maximum outer diameter $Y_2$ of the stirring pin B2 ($Y_3 < X_2 < Y_2$), the pull-out hole H1 of the stirring pin A2 can be used as the pilot bore P1 as it is.

(3) First Primary Welding Process

The first primary welding process is a process for primarily welding the butting portion J1 between the metal members 1, 1. In the first primary welding process of the present embodiment, by using the primary welding rotating tool B shown in FIG. 2(b), the preliminarily joined butting portion J1 is friction stir welded from the surface 12 side of the metal members 1.

In the first primary welding process, as shown in FIG. 5(a) to FIG. 5(c), the stirring pin B2 of the primary welding rotating tool B is inserted (press-fitted) into the pilot bore P1 formed at the start position $S_{M1}$, and the inserted stirring pin B2 is moved to the end position $E_{M1}$ without being withdrawn midway. In other words, in the first primary welding process, friction stir welding is started from the pilot bore P1, and is performed continuously to the end position $E_{M1}$. In the present embodiment, the start position $S_{M1}$ of friction stir welding is provided on the second tab member 3 and the end position $E_{M1}$ is provided on the first tab member 2, however, this is not intended to limit the positions of the start position $S_{M1}$ and the end position $E_{M1}$.

The first primary welding process will be described in detail with reference to FIG. 5(a) to FIG. 5(c).

First, as shown in FIG. 5(a), the primary welding rotating tool B is positioned just above the pilot bore P1 (start position $S_{M1}$), and subsequently, the primary welding rotating tool B is moved down while being rotated clockwise to insert the tip end of the stirring pin B2 into the pilot bore P1. When the stirring pin B2 is inserted into the pilot bore P1, the peripheral surface (lateral side) of the stirring pin B2 comes into contact with the bore wall of the pilot bore P1 and plasticizes and fluidizes the metal from the bore wall. In this state, the stirring pin B2 is press-fitted while pushing-away the plasticized and fluidized metal by the peripheral surface of the stirring pin B2, so that the press-fitting resistance at the press-fitting initial stage can be reduced, and the stirring pin B2 comes into contact with the bore wall of the pilot bore P1 and produces frictional heat before the shoulder B1 of the primary welding rotating tool B comes into contact with the surface 32 of the second tab member 3, so that the time until plasticization and fluidization can be shortened. In other words, the load on the friction stir welding machine can be reduced, and in addition, the operation time required for this welding can be shortened.

The rotating speed of the primary welding rotating tool B when inserting the stirring pin B2 of the primary welding rotating tool B to the start position $S_{M1}$ of friction stir welding (rotating speed for insertion) is set according to the dimensions and shape of the stirring pin B2 and the materials and thicknesses of the metal members 1 to be friction stir welded, etc., and in many cases, the rotating speed is set in the range of 70 to 700 (rpm), however, the rotating speed is preferably set to be higher than the rotating speed (rotating speed for movement) of the primary welding rotating tool B when moving the primary welding rotating tool B from the start position $S_{M1}$ to the end position $E_{M1}$ of friction stir welding. Accordingly, in comparison with the case where the rotating speed for insertion is set equal to the rotating speed for movement, the time required for plasticizing and fluidizing the metal becomes shorter, so that the operation for inserting the stirring pin B2 to the start position $S_{M1}$ can be quickly performed.

If the rotating speed for insertion of the primary welding rotating tool B is higher than 3.0 times the rotating speed for movement, the heat input into the metal increases and the temperature of the metal excessively increases, and if the rotating speed for insertion is lower than 1.5 times the rotating speed for movement, the operation time shortening effect becomes smaller, so that the rotating speed for insertion of the primary welding rotating tool B is preferably set to 1.5 times to 3.0 times as high as the rotating speed for movement.

The insertion speed (moving-down speed) of the primary welding rotating tool B is set according to the dimensions and shape of the stirring pin B2 and the material and thickness of the member on which the start position $S_{M1}$ is provided, etc., and in many cases, the insertion speed is set in the range of 5 to 60 (mm/min).

When the entire stirring pin B2 gets into the second tab member 3 and the entire lower end surface B11 of the shoulder B1 comes into contact with the surface 32 of the second tab member 3, as shown in FIG. 5(b), the primary welding rotating tool B is relatively moved toward one end of the butting portion J1 between the metal members 1, 1 while performing friction stir welding, and is further made to pass across the butting portion J3 and enter the butting portion J1. By moving the primary welding rotating tool B, the metal around the stirring pin B2 is successively plasticized and fluidized, and at a position apart from the stirring pin B2, the plasticized and fluidized metal hardens again and forms a plasticized region W1 (hereinafter, referred to as "surface plasticized region W1").

The movement speed (feed rate) of the primary welding rotating tool B is set according to the dimensions and shape of the stirring pin B2 and the materials and thicknesses of the metal members 1 to be friction stir welded, etc., and in many cases, the movement speed is set in the range of 30 to 300 (mm/min). When moving the primary welding rotating tool B, the axis line of the shoulder B1 may be inclined slightly to the back side of the traveling direction with respect to the vertical line, however, when the axis line is not inclined but set vertically, the traveling direction of the primary welding rotating tool B can be easily changed, and complicated movements thereof are possible.

When there is a possibility that the heat input into the metal members 1 becomes excessive, preferably, cooling is performed by supplying water to the surrounding of the primary welding rotating tool B from the surface 12 side. If cooling water enters between the metal members 1, 1, it may form an oxide film on the joined surface (lateral side 11), however, in the present embodiment, the gap between the metal members 1, 1 is closed by executing the preliminary joining process, so that cooling water hardly enters between the metal members 1, 1, and therefore, there is no possibility that the quality of the joined portion is deteriorated.

At the butting portion J1 between the metal members 1, 1, a friction stir welding route is set on the seam between the metal members 1, 1 (the movement locus in the preliminary joining process), and by relatively moving the primary welding rotating tool B along this route, friction stir welding is performed continuously from one end to the other end of the butting portion J1. After the primary welding rotating tool B is relatively moved to the other end of the butting portion J1, it is made to pass across the butting portion J2 while performing friction stir welding, and then relatively moved toward the end position $E_{M1}$.

In the present embodiment, the start position $S_{M1}$ of friction stir welding is set on the extension of the seam (boundary) between the metal members 1, 1 appearing on the surface 12 side of the metal members 1, therefore, the friction stir welding route in the first primary welding process can be set straight. By forming the friction stir welding route straight, the movement distance of the primary welding rotating tool B can be minimized, so that the first primary welding process can be efficiently performed, and further, a wear volume of the primary welding rotating tool B can be reduced.

When the primary welding rotating tool B reaches the end position $E_{M1}$, as shown in FIG. 5(c), the primary welding rotating tool B is moved up while being rotated to withdraw the stirring pin B2 from the end position $E_{M1}$ (see FIG. 5(b)). When the stirring pin B2 is withdrawn upward from the end position $E_{M1}$, a pull-out hole Q1 having substantially the same shape as the stirring pin B2 is inevitably formed, however, this is left as it is in the present embodiment.

Preferably, the rotating speed of the primary welding rotating tool B when withdrawing the stirring pin B2 of the primary welding rotating tool B from the end position $E_{M1}$ (rotating speed for withdrawal) is set to be higher than the rotating speed for movement. Accordingly, in comparison with the case where the rotating speed for withdrawal is set equal to the rotating speed for movement, the withdrawal resistance of the stirring pin B2 becomes smaller, so that the operation for withdrawing the stirring pin B2 from the end position $E_{M1}$ can be quickly performed.

If the rotating speed for withdrawal of the primary welding rotating tool B is higher than 3.0 times the rotating speed for movement, the heat input into the metal increases and the temperature of the metal excessively rises, and if the rotating speed for withdrawal is lower than 1.5 times the rotating speed for movement, the operation time shortening effect becomes smaller, so that the rotating speed for withdrawal of the primary welding rotating tool B is preferably set to 1.5 to 3.0 times as high as the rotating speed for movement.

The withdrawal speed (moving-up speed) of the primary welding rotating tool B is set according to the dimensions and shape of the stirring pin B2 and the material and thickness of the member on which the start position $S_{M1}$ is provided, etc., and in many cases, the withdrawal speed is set in the range of 5 to 60 (mm/min).

(4) First Repairing Process

The first repairing process is for friction stir welding a surface plasticized region W1 formed on the metal members 1 by the first primary welding process, and is performed for repairing joining defects which may be included in the surface plasticized region W1.

In the first repairing process of the present embodiment, as shown in FIG. 6(a) and FIG. 6(b), in the surface plasticized region W1, at least a first repairing region R1, a second repairing region R2, and a third repairing region R3 are friction stir welded.

The friction stir welding on the first repairing region R1 is performed for dividing a tunnel-like defect which may be formed along the traveling direction of the primary welding rotating tool B. When the primary welding rotating tool B is rotated clockwise, a tunnel-like defect may occur on the left in the traveling direction, and when the primary welding rotating tool B is rotated counterclockwise, a tunnel-like defect may occur on the right in the traveling direction, and therefore, in the present embodiment in which the primary welding rotating tool B is rotated clockwise, the first repairing region R1 is preferably set so as to include at least an upper portion of the surface plasticized region W1 positioned on the left in the traveling direction in a plan view.

The friction stir welding on the second repairing region R2 is performed for dividing an oxide film (oxide film formed on the contact surface 21 between the lateral sides 14 of the metal members 1 and the first tab member 2) involved in the surface plasticized region W1 when the primary welding rotating tool B passes across the butting portion J2. In the case where the end position $B_{M1}$ of the friction stir welding of the primary welding process is provided on the first tab member 2 as in the present embodiment, when the primary welding rotating tool B is rotated clockwise, the oxide film is likely to be involved in the upper portion of the surface plasticized region W1 on the right in the traveling direction, and when the primary welding rotating tool B is rotated counterclockwise, the oxide film is likely to be involved in the upper portion of the surface plasticized region W1 on the left in the traveling direction, so that in the present embodiment in which the primary welding rotating tool B is rotated clockwise, the second repairing region R2 is preferably set so as to include at least the upper portion of the surface plasticized region W1 positioned on the right in the traveling direction in a plan view in the surface plasticized region W1 adjacent to the first tab member 2. The distance $d_4$ from the seam between the metal members 1 and the first tab member 2 to the edge on the metal member 1 side of the second repairing region R2 is preferably set to be larger than the maximum outer diameter $Y_2$ of the stirring pin B2 of the primary welding rotating tool B.

The friction stir welding on the third repairing region R3 is performed for dividing an oxide film (oxide film formed on the contact surface 31 between the lateral sides 14 of the metal members 1 and the second tab member 3) involved in the surface plasticized region W1 when the primary welding rotating tool B passes across the butting portion J3. In the case where the start position $S_{M1}$ of the friction stir welding of the primary welding process is provided on the second tab member 3 as in the present embodiment, when the primary welding rotating tool B is rotated clockwise, the oxide film is likely to be involved in the upper portion of the surface plasticized region W1 on the left in the traveling direction, and when the primary welding rotating tool B is rotated counterclockwise, the oxide film is likely to be involved in the upper portion of the surface plasticized region W1 on the right in the traveling direction, so that in the present embodiment in which the primary welding rotating tool B is rotated clockwise, the third repairing region R3 is preferably set so as to include at least the upper portion of the surface plasticized region W1 positioned on the left in the traveling direction in a plan view in the surface plasticized region W1 adjacent to the second tab member 3. The distance $d_5$ from the seam between the metal members 1 and the second tab member 3 to the edge on the metal member 1 side of the third repairing region R3 is preferably set to be larger than the maximum outer diameter $Y_2$ of the stirring pin B2 of the primary welding rotating tool B.

In the first repairing process of the present embodiment, friction stir welding is performed by using a repairing rotating tool C smaller than the primary welding rotating tool B. Accordingly, the plasticized region can be prevented from excessively spreading.

Similar to the preliminary joining rotating tool A, the repairing rotating tool C is made of a metal material such as tool steel harder than the metal members 1, and as shown in FIG. 6(b), includes a shoulder C1 in a columnar shape and a stirring pin (probe) C2 provided so as to project from the lower end surface of the shoulder C1.

The stirring pin C2 is hung down from the lower end surface of the shoulder C1, and in the present embodiment, formed into a circular truncated cone shape. On the peripheral surface of the stirring pin C2, a stir wing carved spirally is formed. In many cases, joining defects due to the primary welding rotating tool B shown in FIG. 2(b) are formed in the range to ⅓ from the upper end of the stirring pin B2, so that the length of the stirring pin C2 of the repairing rotating tool C is preferably set to not less than ⅓ of the length $L_1$ (see FIG. 2(b)) of the stirring pin B2 of the primary welding rotating tool B, and if the length is more than ½, the plasticized region may excessively spread, so that the length is preferably set to not more than ½. The maximum outer diameter (upper end diameter) and the minimum outer diameter (lower end diameter) of the stirring pin C2 are not specifically limited, however, in the present embodiment, they are smaller than the maximum outer diameter (upper end diameter) $Y_2$ and the minimum outer diameter (lower end diameter) $Y_3$ of the stirring pin B2 of the primary welding rotating tool B, respectively.

Figure 7:
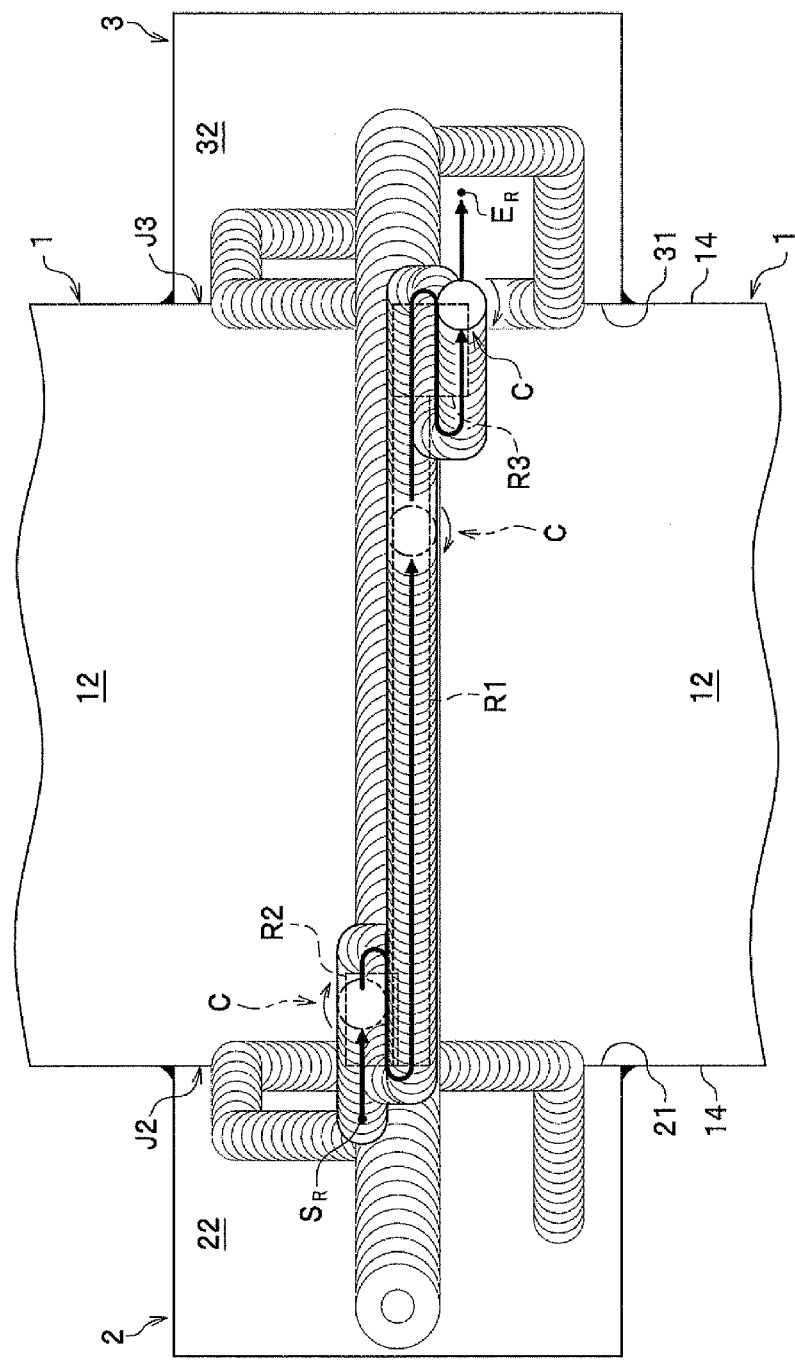
FIG. 7 is a plan view for describing the first repairing process of the first embodiment.

In the first repairing process, each time the friction stir welding on one repairing region is finished, the repairing rotating tool C may be withdrawn, or a different repairing rotating tool C may be used for each repairing region, however, in the present embodiment, as shown in FIG. 7, one repairing rotating tool C is moved so as to form a one-stroke movement locus (bead) to continuously apply friction stir welding to the first repairing region R1, the second repairing region R2, and the third repairing region R3. In other words, in the first repairing process of the present embodiment, the stirring pin C2 (see FIG. 6(b)) of the repairing rotating tool C inserted into the start position $S_R$ of friction stir welding is moved to the end position $E_R$ without being withdrawn midway. In the present embodiment, a case where the start position $S_R$ of the friction stir welding is provided on the first tab member 2, the end position $E_R$ is provided on the second tab member 3, and the second repairing region R2, the first repairing region R1, and the third repairing region R3 are friction stir welded in this order, is illustrated, however, this is not intended to limit the positions of the start position $S_R$ and the end position $E_R$ and the friction stir welding order.

Friction stir welding steps in the first repairing process will be described in detail with reference to FIG. 7. First, the stirring pin C2 (see FIG. 6(b)) of the repairing rotating tool C is inserted (press-fitted) to the start position $S_R$ provided on an appropriate location on the first tab member 2 and friction stir welding is started, and the second repairing region R2 is friction stir welded.

The rotating speed and the insertion speed (moving-down speed) when inserting the repairing rotating tool C into a start position $S_R$ are set according to the dimensions and shape of the stirring pin C2 and the materials and thicknesses of the metal members 1 to be friction stir welded, etc., and in many cases, the rotating speed is set in the range of 300 to 2000 (rpm), and the insertion speed is set in the range of 30 to (mm/min).

The movement speed (feed rate) of the repairing rotating tool C is set according to the dimensions and shape of the stirring pin C2 and the materials and thicknesses of the metal members 1 to be friction stir welded, etc., and in many cases, the movement speed is set in the range of 100 to 1000 (mm/min). The rotating speed for movement of the repairing rotating tool C is set to be equal to or lower then the rotating speed for insertion.

When the second repairing region R2 is friction stir welded, even if the oxide film on the contact surface 21 between the lateral sides 14 of the metal members 1 and the first tab member 2 is involved in the surface plasticized region W1 (see FIG. 6(b)), this oxide film can be divided, therefore, joining defects hardly occur in the surface plasticized region W1 adjacent to the first tab member 2. When the second repairing region R2 is larger than the region which can be friction stir welded by the repairing rotating tool C, the repairing rotating tool C is turned around several times while shifting the friction stir welding route.

When the friction stir welding on the second repairing region R2 is finished, the repairing rotating tool C is directly moved to the first repairing region R1 without being withdrawn to perform friction stir welding continuously along the friction stir welding route in the first primary welding process described above. Accordingly, even when a tunnel-like defect is formed continuously along the friction stir welding route in the primary welding process, this tunnel-like defect can be reliably divided, so that joining defects hardly occur.

When the friction stir welding on the first repairing region R1 is finished, the repairing rotating tool C is directly moved to the third repairing region R without being withdrawn, and the third repairing region R3 is friction stir welded. Accordingly, even when an oxide film on the contact surface 31 between the lateral sides 14 of the metal members 1 and the second tab member 3 is involved in the surface plasticized region W1 (see FIG. 6(b)), this oxide film can be divided, so that joining defects hardly occur in the surface plasticized region W1 adjacent to the second tab member 3. When the third repairing region R3 is larger than the region which can be friction stir welded by the repairing rotating tool C, the repairing rotating tool C is turned around several times while shifting the friction stir welding route.

When the friction stir welding on the third repairing region R3 is finished, the repairing rotating tool C is moved to the end position $E_R$, and the stirring pin C2 (see FIG. 6(b)) is withdrawn from the end position $E_R$ by moving-up the repairing rotating tool C while rotating it.

The rotating speed and the withdrawal speed (moving-up speed) when the repairing rotating tool C is withdrawn from the end position $E_R$ are set according to the dimensions and shape of the stirring pin C2 and the materials and thicknesses of the metal materials 1 to be friction stir welded, and in many cases, the rotating speed is set in the range of 300 to 2000 (rpm) and the withdrawal speed is set in the range of 30 to 60 (mm/min). The rotating speed for withdrawal of the repairing rotating tool C is set to be equal to or higher than the rotating speed for movement.

(5) First Traverse Repairing Process

The first traverse repairing process is also for friction stir welding the surface plasticized region W1 formed on the metal members 1 by the first primary welding process, and is executed for dividing a tunnel-like defect which is likely to be included in the surface plasticized region W1.

Figure 8:
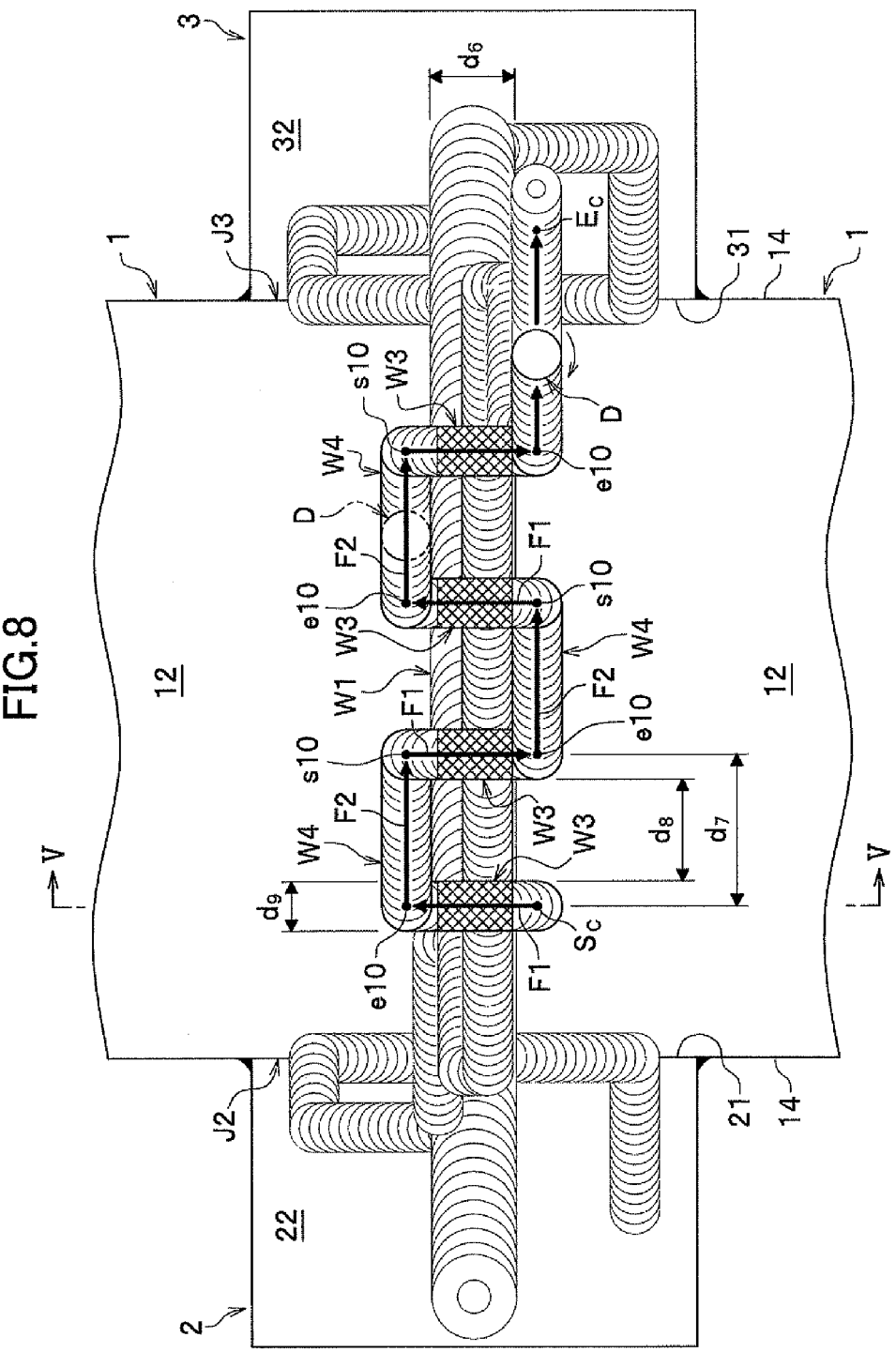
FIG. 8 is a plan view for describing a first traverse repairing process of the first embodiment.

In the first traverse repairing process of the present embodiment, as shown in FIG. 8, by moving the traversing rotating tool D so as to traverse the surface plasticized region W1 a plurality of times, the surface plasticized region W1 is friction stir welded. That is, in the first traverse repairing process, a friction stir welding route is set so as to traverse the surface plasticized region W1 a plurality of times. Accordingly, even when a tunnel-like defect is formed along the surface plasticized region W1, the tunnel-like defect can be divided with satisfactory reliability.

The friction stir welding route in the first traverse repairing process is set so that a plurality of plasticized regions (hereinafter, referred to as "re-plasticized regions") W3, W3 . . . formed in the surface plasticized region W1 are spaced from each other on the friction stir welding route (that is, the center line of the surface plasticized region W1) in the first primary welding process.

In the friction stir welding route in the first traverse repairing process, a plurality of traverse routes F1 which traverse the surface plasticized region W1 and transfer routes F2 which connect end portions on the same side of traverse routes F1, F1 adjacent to each other, are provided. In other words, the friction stir welding route in the first traverse repairing process includes at least a first traverse route F1 set so as to start from the lateral of the surface plasticized region W1 toward the opposite side across the surface plasticized region W1, a transfer route F2 set so as to start from an end point e10 of the traverse route F1 and disposed along the friction stir welding route (seam between the metal members 1, 1) in the first primary welding process, and a second traverse route F1 set so as to start from an end point s10 of the transfer route F2 toward the opposite side across the surface plasticized region W1.

The traverse route F1 is a friction stir welding route set so as to traverse the surface plasticized region W1, and in the present embodiment, crosses the friction stir welding route of the first primary welding process at right angles. The start point s10 and the end point e10 of the traverse route F1 are positioned lateral to the surface plasticized region W1, and are opposed to each other across the surface plasticized region W1.

Figure 9:
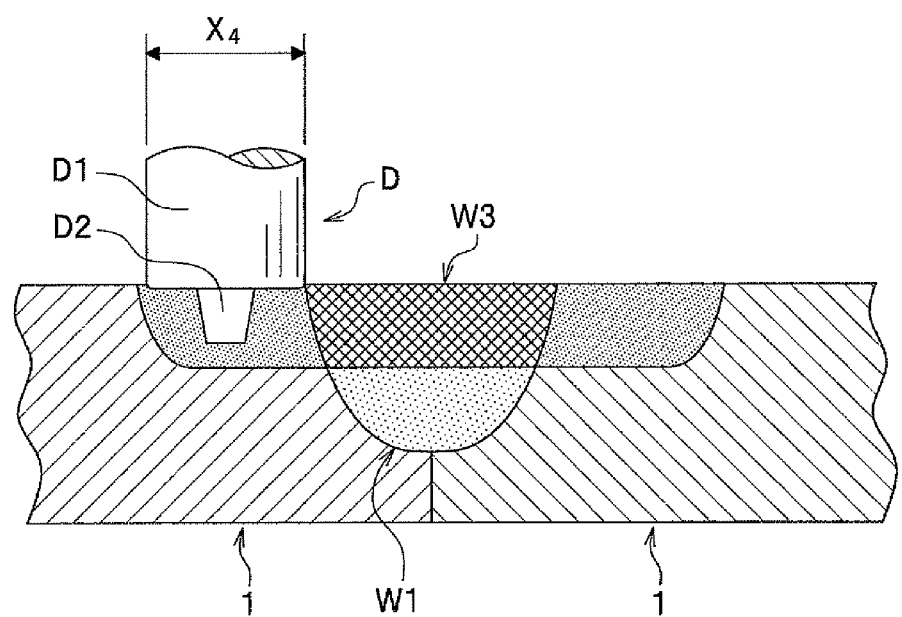
FIG. 9 is a sectional view along V-V line of FIG. 8.

The positions of the start point s10 and the endpoint e10 of the traverse route F1 are preferably set so that the entirety of the traversing rotating tool D comes out from the surface plasticized region W1, however, if they are excessively apart from the surface plasticized region W1, the movement distance of the traversing rotating tool D increases, so that in the present embodiment, the distance from the start point s10 to the lateral edge of the surface plasticized region W1 and the distance from the lateral edge of the surface plasticized region W1 to the end point e10 become equal to the half of the outer diameter $X_4$ (see FIG. 9) of the shoulder D2 of the traversing rotating tool D. In other words, the length of the traverse route F1 (distance from the start point s10 to the end point e10) becomes equal to a value obtained by adding the outer diameter $X_4$ of the shoulder D2 to the width $d_6$ of the surface plasticized region W1. Incidentally, the width $d_9$ of the plasticized region formed by the traversing rotating tool D becomes substantially equal to the outer diameter $X_4$ of the shoulder D2, therefore, the length of the traverse route F1 is substantially equal to the value obtained by adding the width $d_9$ of the plasticized region formed by the traversing rotating tool D to the width $d_6$ of the surface plasticized region W1.

The spacing distance $d_7$ between the traverse routes F1, F1 adjacent to each other is set to a size so that the re-plasticized regions W3, W3 ... are spaced from each other on the friction stir welding route of the first primary welding process (center line of the surface plasticized region W1). The spacing distance $d_8$ between the re-plasticized regions W3, W3 adjacent to each other is secured preferably not less than the width $d_9$ of the re-plasticized regions W3, more preferably, not less than two times the width $d_9$.

The transfer route F2 is a friction stir welding route from the end point e10 of one traverse route F1 to the start point s10 of another traverse route F1 positioned closer to the friction stir welding end position $E_C$ side than the one traverse route F1, and in the present embodiment, provided on the right or left of the surface plasticized region W1 and parallel to the friction stir welding route of the first primary welding process.

The transfer route F2 is preferably set at a position at which a plasticized region W4 formed by moving the traversing rotating tool D along the transfer route F2 comes into contact with the lateral edge of the surface plasticized region W1. In the present embodiment, as described above, the distance between the end point e10 of the traverse route F1 which is the start point of the transfer route F2 and the lateral edge of the surface plasticized region W1 and the distance between the start point s10 of the traverse route F1 which is the end point of the traverse route F2 and the lateral edge of the surface plasticized region W1 are equal to the half of the width $d_9$ of the plasticized region formed by the traversing rotating tool D, so that the plasticized region W4 inevitably comes into contact with the lateral edge of the surface plasticized region W1.

Friction stir welding steps in the first traverse repairing process will be described in detail.

In the present embodiment, the repairing rotating tool C (see FIG. 6(a) and FIG. 6(b)) is used as the traversing rotating tool D, and detailed description thereof is omitted. The rotating speed, the insertion speed, the movement speed, and the withdrawal speed of the traversing rotating tool D are the same as those of the repairing rotating tool C, so that detailed description of these is omitted.

In the present embodiment, by moving one traversing rotating tool D zigzag so as to form a one-stroke movement locus (bead), friction stir welding is performed continuously from the start position $S_C$ to the end position $E_C$ of friction stir welding. In other words, the stirring pin D2 (see FIG. 9) of the traversing rotating tool D inserted into the start position $S_C$ of friction stir welding is moved to the end position $E_C$ without being withdrawn midway. It is also allowed that the traversing rotating tool D is withdrawn each time that it traverses the surface plasticized region W1. In the present embodiment, the case where the start position $S_C$ of friction stir welding is provided on the metal member 1 and the end position $E_C$ is provided on the second tab member 3 is illustrated, however, this is not intended to limit the positions of the start position $S_C$ and the end position $E_C$.

Friction stir welding steps in the first traverse repairing process will be described in detail.

In the first traverse repairing process, first, the stirring pin D2 (see FIG. 9) of the traversing rotating tool D is inserted (press-fitted) to the start position $S_C$ provided at an appropriate position on the metal member 1 and friction stir welding is started, and friction stir welding is performed continuously along the first traverse route F1.

When the traversing rotating tool D is moved along the traverse route F1, the metal on the upper portion of the surface plasticized region W1 is friction stir welded again (see FIG. 9), so that a tunnel-like defect which cannot be completely divided by the first repairing process and a tunnel-like defect formed out of the friction stir welding route of the first repairing process can be divided with satisfactory reliability.

When the traversing rotating tool D reaches the end point e10 of the first traverse route F1, the traveling direction of the traversing rotating tool D is changed to a direction along the friction stir welding route of the primary welding process, and the traversing rotating tool D is moved along the transfer route F2. In other words, the traversing rotating tool D is not withdrawn at the endpoint e10 but moved continuously along the transfer route F2 to continuously friction stir weld the metal lateral to the surface plasticized region W1. In the present embodiment, the transfer route F2 is parallel to the friction stir welding route of the first primary welding process, so that the distance of the transfer route F2 is shorter than in the case where the transfer route F2 is inclined.

When the traversing rotating tool D reaches the start point s10 of the second traverse route F1, the traveling direction of the traversing rotating tool D is changed to a direction crossing the surface plasticized region W1, and the traversing rotating tool D is moved continuously along the second traverse route F1 without being withdrawn to continuously friction stir weld the surface plasticized region W1.

After repeating the above-described steps, when the traversing rotating tool D reaches the end point e10 of the last traverse route F1, the traversing rotating tool D is moved to the end position $E_C$, and the stirring pin D2 (see FIG. 9) is withdrawn from the end position $E_C$ by moving-up the traversing rotating tool D while rotating it.

Thus, by spacing the plurality of re-plasticized regions W3, W3 ... from each other on the friction stir welding route of the first primary welding process, in comparison with the case where the re-plasticized regions are formed in the entire surface plasticized region W1, the number of traverses and the number of direction changes of the traversing rotating tool D become smaller, and as a result, the total extension of the friction stir welding route of the first traverse repairing process becomes shorter, therefore, wasteful movements of the traversing rotating tool D can be prevented, and eventually, a tunnel-like defect can be efficiently divided. Particularly, in the present embodiment, the spacing distance $d_8$ between the re-plasticized regions W3, W3 adjacent to each other is set to not less than the width $d_9$ of the re-plasticized regions W3, therefore, wasteful movements of the traversing rotating tool D can be further prevented.

A rotating tool different from the repairing rotating tool C may be used as the traversing rotating tool D, however, even in this case, it is preferably smaller than the primary welding rotating tool B shown in FIG. 2(a) and FIG. 2(b). A tunnel-like defect caused by the primary welding rotating tool B is formed in the range to ⅓ from the upper end of the stirring pin in many cases, so that the length of the stirring pin of the traversing rotating tool D is preferably set to not less than ⅓ of the length $L_1$ of the stirring pin B2 (see FIG. 2(a) and FIG. 2(b)) of the primary welding rotating tool B, and if it is larger than ½, the plasticized region may excessively spread, so that the length is preferably set to not more than ½.

When the first traverse repairing process is finished, burrs formed during friction stir welding in the first preparatory process, the first primary welding process, the first repairing process, and the first traverse repairing process are removed, and further, as shown in FIG. 10(a), the metal members 1, 1 are turned over so that the back surfaces 13 thereof turn up.

(6) Second Preparatory Process

The second preparatory process is performed previous to the second primary welding process, and in the present embodiment, includes a pilot bore forming process in which a pilot bore P2 is formed at the start position $S_{M2}$ of friction stir welding of the second primary welding process. The above-described first tab member joining process, the preliminary joining process, and the second tab member joining process may be included in the second preparatory process.

(7) Second Primary Welding Process

The second primary welding process is for primarily welding the butting portion J1 between the metal members 1, 1. In the second primary welding process of the present embodiment, as shown in FIG. 10(a) and FIG. 10(b), the butting portion J1 is friction stir welded from the back surface 13 side of the metal members 1 by using the primary welding rotating tool B used in the first primary welding process.

In the second primary welding process, the stirring pin B2 of the primary welding rotating tool B is inserted (press-fitted) into the pilot bore P2 (start position $S_{M2}$) disposed in the second tab member 3, and the inserted stirring pin B2 is moved to the end position $E_{M2}$ provided on the first tab member 2 without being withdrawn midway. In other words, in the second primary welding process, friction stir welding is started from the pilot bore P2 and continued to the end position $E_{M2}$.

The second primary welding process will be described in detail with reference to FIG. 10(a) to FIG. 10(c).

First, as shown in FIG. 10(a), the primary welding rotating tool B is positioned just above the pilot bore P2, and then, the primary welding rotating tool B is moved down while being rotated clockwise to insert the tip end of the stirring pin B2 into the pilot bore P2. The rotating speed for insertion of the primary welding rotating tool B is preferably set to be higher than the rotating speed for movement of the primary welding rotating tool B as in the case of the first primary welding process described above.

When the entire stirring pin B2 gets into the second tab member 3 and the entire lower end surface B11 of the shoulder B1 comes into contact with the surface of the second tab member 3, as shown in FIG. 10(b), the primary welding rotating tool B is relatively moved toward one end of the butting portion J1 between the metal members 1, 1 while friction stir welding. When the primary welding rotating tool B is moved, the metal around the stirring pin B2 is successively plasticized and fluidized, and at a position apart from the stirring pin B2, the plasticized and fluidized metal hardens again and forms a plasticized region W2 (hereinafter, referred to as "back plasticized region W2"). In the present embodiment, the same primary welding rotating tool B is used in the first primary welding process and the second primary welding process, so that the cross section area of the back plasticized region W2 becomes equal to that of the surface plasticized region W1. As in the case of the first primary welding process, when the primary welding rotating tool B is moved, the axis line of the shoulder B1 may be inclined slightly to the back side of the traveling direction with respect to the vertical line, however, when the axis line is not inclined but set vertically, the traveling direction of the primary welding rotating tool B can be easily changed, and complicated movements thereof are possible. When the heat input into the metal members 1 may become excessive, preferably, the surrounding of the primary welding rotating tool B is cooled by supplying water from the back surface 13 side.

When the primary welding rotating tool B reaches one end of the butting portion J1 between the metal members 1, 1, it is relatively moved along the seam between the metal members 1, 1 to continuously perform friction stir welding to the other end of the butting portion J1, and further, the primary welding rotating tool B is relatively moved to the end position $E_{M2}$ while friction stir welding.

When the butting portion J1 is friction stir welded, friction stir welding is performed while inserting the stirring pin B2 of the primary welding rotating tool B into the surface plasticized region W1 formed through the first primary welding process. Accordingly, the deep portion of the surface plasticized region W1 formed through the first primary welding process is friction stir welded again by the stirring pin B2, so that even when joining defects are formed continuously in the deep portion of the surface plasticized region W1, the joining defects can be divided so as to become discontinuous, and eventually, airtightness and water-tightness of the joined portion can be improved. In the present embodiment, the length $L_1$ of the stirring pin B2 of the primary welding rotating tool B is set so as to satisfy the relation of $1.01 \leq 2 L_1/t \leq 1.10$ (see FIG. 2(b)), so that simply by moving the primary welding rotating tool B along the seam between the metal members 1, 1, the stirring pin B2 gets into the surface plasticized region W1 reliably.

When the primary welding rotating tool B reaches the end position $E_{M2}$, the stirring pin B2 is withdrawn from the end position $E_{M2}$ by moving up the primary welding rotating tool B while rotating it (see FIG. 10(c)). The rotating speed for withdrawal of the primary welding rotating tool B is preferably set to be higher than the rotating speed for movement as in the case of the first primary welding process.

When the pull-out hole Q1 left in the first primary welding process and the movement route of the primary welding rotating tool B in the second primary welding process overlap each other, the plasticized and fluidized metal may flow into the pull-out hole Q1 and cause joining defects, so that preferably, the end position $E_{M2}$ of friction stir welding (pull-out hole Q2) of the second primary welding process is provided apart from the pull-out hole Q1, and the friction stir welding route of the second primary welding process is set so as to avoid the pull-out hole Q1, and the stirring pin B2 of the primary welding rotating tool B is moved along this route.

Even when the stirring pin B2 of the primary welding rotating tool B to be used in the second primary welding process does not pass through the pull-out hole Q1 of the first primary welding process, if the spacing distance between these is small, the plasticized and fluidized metal may be pushed out to the pull-out hole Q1 and cause joining defects, so that more preferably, the shortest distance $d_1$ in a plan view between the end position $E_{M1}$ of friction stir welding of the first primary welding process and the movement locus of the primary welding rotating tool B of the second primary welding process (end position $E_{M2}$ in the present embodiment) is preferably set to not less than the outer diameter of the shoulder B1 of the primary welding rotating tool B.

As described in the present embodiment, by performing the second primary welding process by using the primary welding rotating tool B used in the first primary welding process, the operation efficiency is improved and the cost can be reduced, and further, the cross section area of the surface plasticized region W1 and the cross section area of the back plasticized region W2 become equal to each other, so that the quality of the joined portion becomes uniform, however, the primary welding rotating tool is allowed to be different between the first primary welding process and the second primary welding process.

When the primary welding rotating tool to be used is different between the first primary welding process and the second primary welding process, for example, as shown in FIG. 11(a) and FIG. 11(b), preferably, the sum of the length $L_1$ of the stirring pin B2 of the primary welding rotating tool B to be used in the first primary welding process and the length $L_2$ of the stirring pin B2' of the primary welding rotating tool B' to be used in the second primary welding process is set to not less than the thickness t of the metal members 1 at the butting portion J1. As a matter of course, each of the lengths $L_1$, $L_2$ of the stirring pins B2, B2' is less than the thickness t. Accordingly, the deep portion of the surface plasticized region W1 formed through the first primary welding process is friction stir welded again by the stirring pin B2' of the primary welding rotating tool B' used in the second primary welding process, so that even if joining defects are formed continuously at the deep portion of the surface plasticized region W1, the joining defects can be divided to be discontinuous, and eventually, airtightness and water-tightness at the joined portion can be improved.

More preferably, as shown in FIG. 11(a) and FIG. 11(b), each of the lengths $L_1$, $L_2$ of the stirring pins B2, B2' of the primary welding rotating tool B and B' is preferably set to not less than ½ of the thickness t of the metal members 1 at the butting portion J1 and not more than ¾ of the thickness t. By setting each of the lengths $L_1$, $L_2$ of the stirring pins B2, B2' to not less than ½ of the thickness t, the surface plasticized region W1 and the back plasticized region W2 overlap at the central portion in the thickness direction of the metal members 1, and the difference in cross section area between the surface plasticized region W1 and the back plasticized region W2 becomes smaller, so that the quality at the joined portion becomes uniform, and by setting each of the lengths $L_1$, $L_2$ of the stirring pins B2, B2' to not more than ¾ of the thickness t, a backing material becomes unnecessary when performing friction stir welding, so that the operation efficiency can be improved.

Still more preferably, the length $L_1$, $L_2$ of the stirring pins B2, B2' are set so as to satisfy the relation of $1.01 \leq (L_1+L_2)/t \leq 1.10$. By setting $(L_1+L_2)/t$ to not less than 1.01, even if the metal members 1 have dimensional tolerances, etc., the stirring pin B2' can be reliably made to get into the surface plasticized region W1 in the second primary welding process. When $(L_1+L_2)/t$ is set to be larger than 1.10, the rotating tools become excessively large and the load on the friction stir welding machine increases, however, by setting $(L_1+L_2)/t$ to not more than 1.10, the load on the friction stir welding machine becomes smaller.

(8) Second Repairing Process

The second repairing process is for friction stir welding the back plasticized region W2 formed on the metal members 1 through the second primary welding process, and is performed for repairing joining defects which are likely to be included in the back plasticized region W2. The second repairing process is the same as the first repairing process described above except that the friction stir welding is performed from the back surface 13 side of the metal members 1, so that detailed description of the second repairing process is omitted.

(9) Second Traverse Repairing Process

The second traverse repairing process is for friction stir welding a back plasticized region W2 formed on the metal members 1 through the second primary welding process, and is executed for dividing a tunnel-like defect which is likely to be included in the back plasticized region W2. The second traverse repairing process is the same as the first traverse repairing process described above except that the friction stir welding is performed from the back surface 13 side of the metal members 1, so that detailed description of the second traverse repairing process is omitted.

After the second traverse repairing process is finished, burrs formed during friction stir welding in the second preparatory process, the second primary welding process, the second repairing process, and the second traverse repairing process are removed, and further, the first tab member 2 and the second tab member 3 are cut off.

By performing the above-described processes (1) to (9), even when very thick metal members 1, 1 whose thicknesses are more than 40 (mm) are joined, airtightness and watertightness at the joined portion can be improved.

Modified Example

The steps, etc., of the first embodiment described above may be changed as appropriate.

Figure 12:
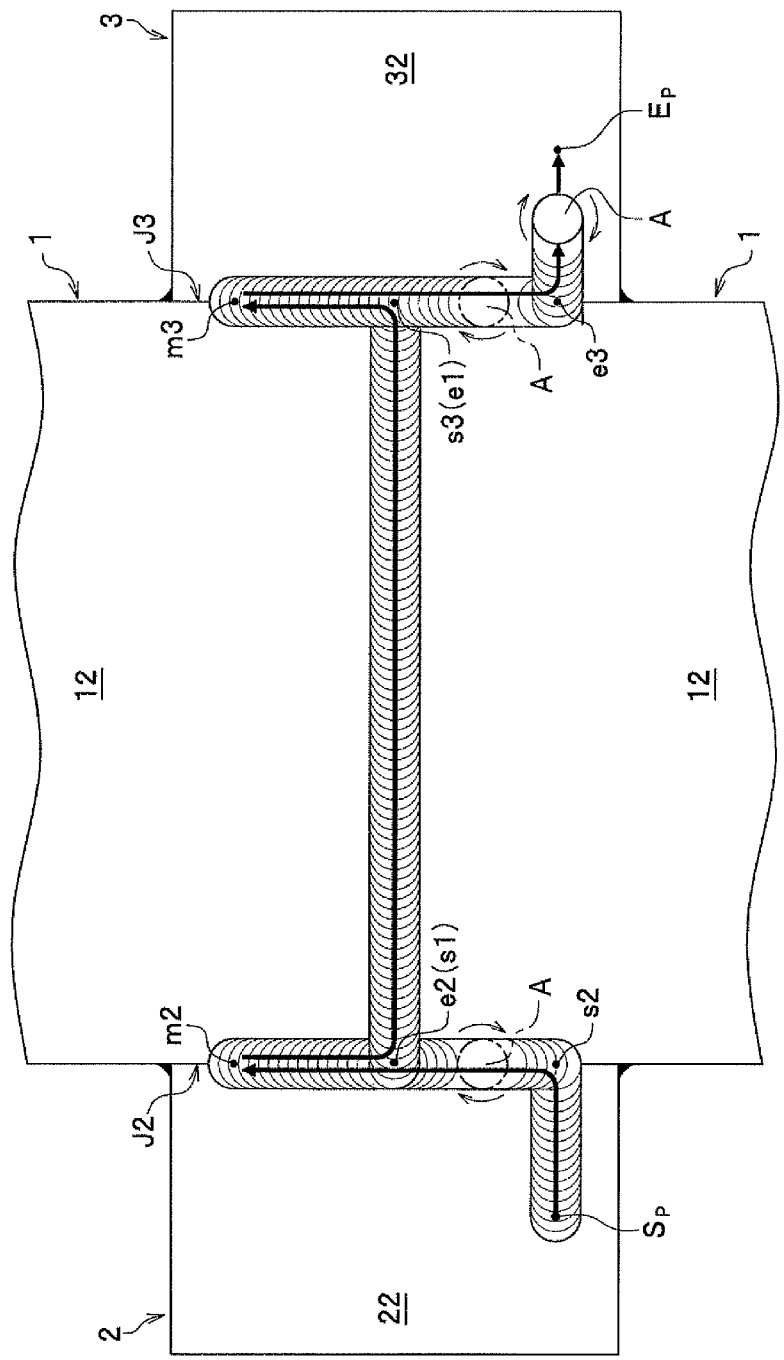
FIG. 12 is a plan view for describing a modified example of the first tab member joining process and the second tab member joining process of the first embodiment.

For example, in the first tab member joining process, the positions of the start point s2 and the end point e2 of the first tab member joining process are set so that the metal members 1, 1 are positioned on the right in the traveling direction of the preliminary joining rotating tool A which is rotated clockwise (see FIG. 4), however, without limiting to this, it is also allowed that the position of the end point e2 shown in FIG. 4 is set as a turning point and the position of the start point s1 of the preliminary joining process shown in FIG. 4 is set as the end point of the first tab member joining process. In other words, as shown in FIG. 12, it is also allowed that the start point s2 and the turning point m2 are provided on the seam between the metal members 1 and the first tab member 2, the start point s1 of the preliminary joining process between the start point s2 and the turning point m2 is set as the end point e2, and after the preliminary joining rotating tool is moved from the start point s2 to the turning point m2, the preliminary joining rotating tool is moved from the turning point m2 to the end point e2 to friction stir weld the butting portion J2.

Accordingly, it is not necessary to set the friction stir welding route from the end point e2 of the first tab member joining process to the start point s1 of the preliminary joining process on the first tab member 2, so that the movement distance of the preliminary joining rotating tool A can be minimized. In other words, the first tab member joining process can be efficiently performed, and the wear volume of the preliminary joining rotating tool A can be reduced.

When the preliminary joining rotating tool A is rotated clockwise, preferably, the positions of the start point s2, the turning point m2, and the end point e2 of the first tab member joining process are set so that the metal members 1, 1 are positioned on the right in the traveling direction of the preliminary joining rotating tool A at least in the friction stir welding route from the start point s2 to the turning point m2. Incidentally, when the preliminary joining rotating tool A is rotated counterclockwise, preferably, the positions of the start point, the turning point, and the end point of the first tab member joining process are set so that the metal members 1, 1 are positioned on the left in the traveling direction of the preliminary joining rotating tool A at least in the friction stir welding route from the start point to the turning point although these are not shown.

In the second tab member joining process, the positions of the start point s3 and the end point e3 of the second tab member joining process are also set so that the metal members 1, 1 are positioned on the right in the traveling direction of the preliminary joining rotating tool A which is rotated clockwise (see FIG. 4), however, without limiting to this, it is also allowed that the end point s1 of the preliminary joining process shown in FIG. 4 is set as the start point and the position of the start point s3 of the second tab member joining process shown in FIG. 4 is set as the turning point. In other words, as shown in FIG. 12, it is allowed that the turning point m3 and the end point e3 are provided on the seam between the metal members 1 and the second tab member 3, the end point e1 of the preliminary joining process between the turning point m3 and the end point e3 is set as the start point s3, and by moving the preliminary joining rotating tool A from the turning point m3 to the end point e3 after moving the preliminary joining rotating tool A from the start point s3 to the turning point m3, the butting portion J3 is friction stir welded.

Accordingly, it is not necessary to set the friction stir welding route from the end point e1 of the preliminary joining process to the start point s3 of the second tab member joining process on the second tab member 3, so that the movement distance of the preliminary joining rotating tool A can be minimized. In other words, the second tab member joining process can be efficiently performed, and the wear volume of the preliminary joining rotating tool A can be reduced.

When the preliminary joining rotating tool A is rotated clockwise, preferably, the positions of the start point s3, the turning point m3, and the end point e3 of the second tab member joining process are set so that the metal members 1, 1 are positioned on the right in the traveling direction of the preliminary joining rotating tool A at least in the friction stir welding route from the turning point m3 to the end point e3. Incidentally, when the preliminary joining rotating tool A is rotated counterclockwise, preferably, the start point, the turning point, and the end point of the second tab member joining process are set so that the metal members 1, 1 are positioned on the left in the traveling direction of the preliminary joining rotating tool A at least in the friction stir welding route from the turning point to the end point although these are not shown.

In the repairing process described above, the first repairing region R1, the second repairing region R2, and the third repairing region R3 are friction stir welded (see FIG. 7), however, it is also allowed that only the second repairing region R2 and the third repairing region R3 are friction stir welded.

Figure 13:
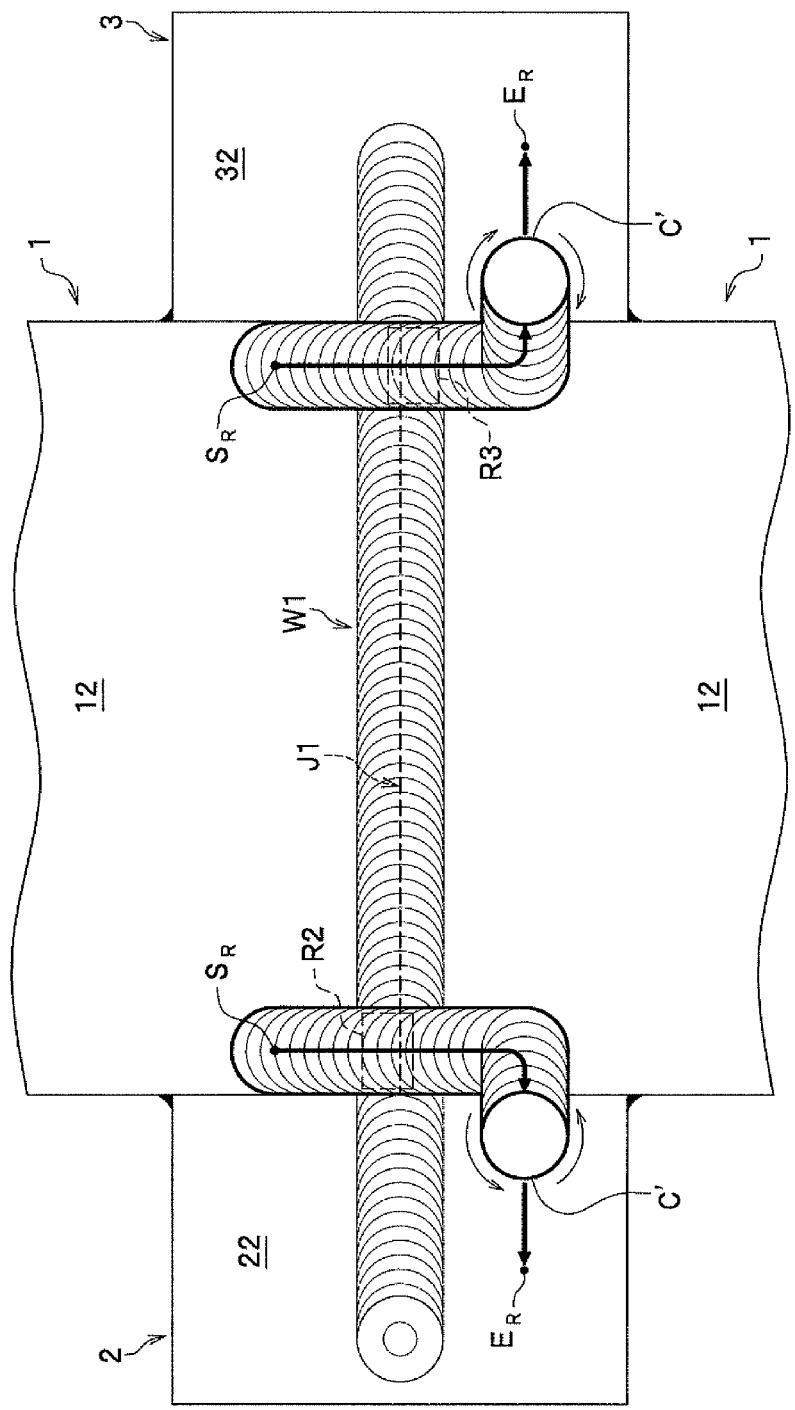
FIG. 13 is a plan view for describing a modified example of the repairing process of the first embodiment.

In this case, as shown in FIG. 13, on each of both end portions of the butting portion J1, a repairing rotating tool C' is moved so as to traverse the plasticized region (second repairing region R2 or third repairing region R3) formed through the primary welding process. In other words, at one end portion of the butting portion J1, the second repairing region R2 is friction stir welded by moving the repairing rotating tool C' along the butting portion J2, and at the other end portion of the butting portion J1, the third repairing region R3 is friction stir welded by moving the repairing rotating tool along the butting portion J3. In detail, the start position $S_R$ of friction stir welding is provided on one metal member 1, and by moving the repairing rotating tool toward the other metal member 1, the lateral edge portion of the metal members 1 is friction stir welded. Even in this case, oxide films involved by the primary welding rotating tool B (see FIG. 2(b)) when it passes across the butting portions J2 and J3 are divided, so that a joined body with very few joining defects can be obtained.

In the case of friction stir welding along the butting portion J2, when the repairing rotating tool C' is rotated clockwise, the friction stir welding route is set so that the first tab member 2 is positioned on the left in the traveling direction, and when the repairing rotating tool is rotated counterclockwise as shown in the figure, the friction stir welding route is set so that the first tab member 2 is positioned on the right in the traveling direction. Similarly, in the case of friction stir welding along the butting portion J3, when the repairing rotating tool C' is rotated clockwise as shown in the figure, the friction stir welding route is set so that the second tab member 3 is positioned on the left in the traveling direction, and when the repairing rotating tool is rotated counterclockwise, the friction stir welding route is set so that the second tab member 3 is positioned on the right in the traveling direction. In either case, the end position $E_R$ of friction stir welding is provided on the first tab member 2 or the second tab member 3 so as to prevent pull-out holes of the stirring pin of the repairing rotating tool C' from remaining in the metal members 1, 1.

Figure 14:
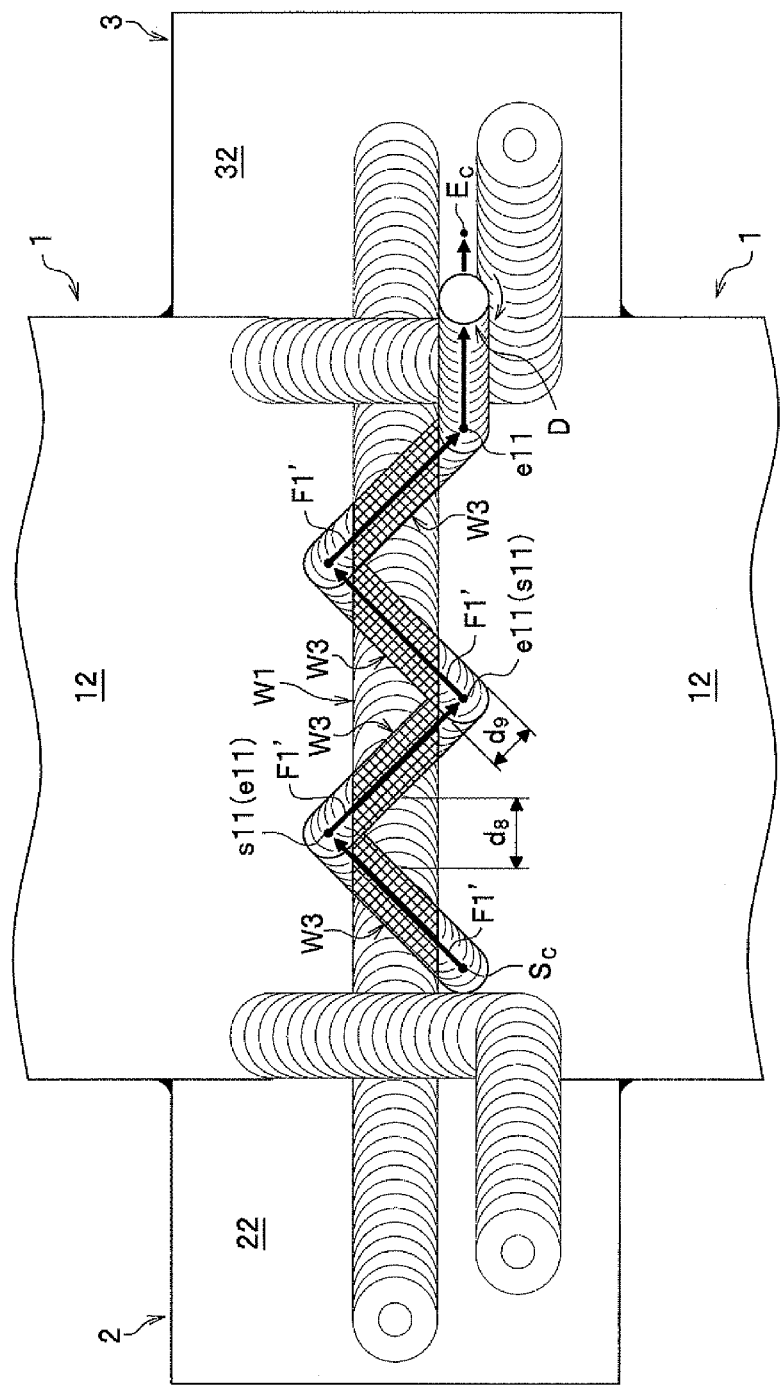
FIG. 14 is a plan view for describing a modified example of the traverse repairing process of the first embodiment.

In the above-described traverse repairing process, the case where the traverse routes F1 as a part of the friction stir welding route are made cross the friction stir welding route of the primary welding process at right angles is illustrated (see FIG. 8), however, diagonal crossing like the traverse routes F1' shown in FIG. 14 is also allowed.

The friction stir welding route of the traverse repairing process shown in FIG. 14 is also set so that the plurality of re-plasticized regions W3, W3 . . . are spaced from each other on the friction stir welding route (center line of the plasticized region W1) of the primary welding process, however, the transfer routes F2 shown in FIG. 8 are omitted and a plurality of traverse routes F1', F1' . . . are formed continuously. Preferably, the spacing distance $d_8$ between re-plasticized regions W3, W3 adjacent to each other on the center line of the plasticized region W1 is secured not less than the width $d_9$ of the re-plasticized regions W3, and more preferably, not less than 2 times the width $d_9$.

The traverse routes F1' are also set so as to traverse the plasticized region W1 formed through the primary welding process. The start point (which is the end point of the previous traverse route F1') s11 and the end point (which is the start point of the next traverse route F1') e11 of the traverse route F1' are positioned lateral to the plasticized region W1, and are opposed to each other across the plasticized region W1.

Preferably, the start point s11 and the end point e11 of the traverse route F1' are set at the positions so that the entirety of the traversing rotating tool D comes out from the plasticized region W1, however, if they are set at positions excessively apart from the plasticized region W1, the movement distance of the traversing rotating tool D increases, therefore, in the present embodiment, they are set so that the distance from the start point s11 to the lateral edge of the plasticized region W1 and the distance from the lateral edge of the plasticized region W1 to the end point e11 are equal to the half of the outer diameter of the shoulder of the traversing rotating tool D.

In the first traverse repairing process of the modified example, first, the stirring pin of the traversing rotating tool D is inserted (press-fitted) to the start position $S_C$ provided at an appropriate location on the metal members 1 and friction stir welding is started, and friction stir welding is performed continuously along the first traverse route F1'.

When the traversing rotating tool D reaches the end point e11 of the first traverse route F1', the traveling direction of the traversing rotating tool D is changed and the traversing rotating tool is moved along the second traverse route F1'. In other words, the traversing rotating tool D is not withdrawn at the end point e11 but moved continuously along the second traverse route F1' to continuously friction stir weld the plasticized region W1.

After repeating these steps, when the traversing rotating tool D reaches the end point e11 of the last traverse route F1', the traversing rotating tool D is moved to the end position $E_C$, and the stirring pin is withdrawn from the end position $E_C$ by moving up the traversing rotating tool D while rotating it.

As in the case of the traverse repairing process shown in FIG. 14, by continuing the plurality of traverse routes F1', F1' ... crossing diagonally the plasticized region W1 zigzag, the number of direction changes of the traversing rotating tool D can be made smaller than in the case where transfer routes are provided (see FIG. 8), therefore, wasteful movements of the traversing rotating tool D can be further prevented, and a tunnel-like defect can be more effectively divided.

Second Embodiment

In the above-described first embodiment, the case where the metal members 1, 1 are joined straight is illustrated, however, the above-described method can be applied even when the metal members 1, 1 are joined in an L shape or a T shape. Hereinafter, the case where the metal members 1, 1 are joined in an L shape will be illustrated.

Similar to the joining method of the first embodiment, the joining method of the second embodiment also includes: (1) a preparation process, (2) a first preparatory process, (3) a first primary welding process, (4) a first repairing process, (5) a first traverse repairing process, (6) a second preparatory process, (7) a second primary welding process, (8) a second repairing process, and (9) a second traverse repairing process. The first preparatory process, the first primary welding process, the first repairing process, and the first traverse repairing process are executed from the surface side of the metal members 1, and the second preparatory process, the second primary welding process, the second repairing process, and the second traverse repairing process are executed from the back surface side of the metal members 1.

(1) Preparation Process

The preparation process will be described with reference to FIG. 15(a) and FIG. 15(b). The preparation process of the present embodiment includes a butting process in which metal members 1, 1 to be joined are butted against each other, a tab member disposing process in which a first tab member 2 and a second tab member 3 are disposed on both sides of the butting portion J1 of the metal members 1, 1, and a welding process in which the first tab member 2 and the second tab member 3 are preliminarily joined to the metal members 1, 1 by welding.

In the butting process, metal members 1, 1 to be joined are disposed in an L shape, and with the lateral side of one metal member 1, the lateral side of the other metal member 1 is brought into close contact.

In the tab member disposing process, the first tab member 2 is disposed on one end side (outer side) of the butting portion J1 between the metal members 1, 1 and the contact surface 21 (see FIG. 15(b)) of the first tab member 2 is brought into contact with the outer lateral sides of the metal members 1, 1, and the second tab member 3 is disposed on the other end side of the butting portion J1 and the contact surfaces 31, 31 (see FIG. 15(b)) of the second tab member 3 are brought into contact with the inner lateral sides of the metal members 1, 1. When the metal members 1, 1 are fitted in an L shape, either (the second tab member 3 in the present embodiment) of the first tab member 2 and the second tab member 3 is disposed at the inner corner portion formed by the metal members 1, 1 (an angulated portion formed by the inner lateral sides of the metal members 1, 1).

In the welding process, the inner corner portions 2a, 2a formed by the metal members 1 and the first tab member 2 are welded to join the metal members 1 and the first tab member 2, and the inner corner portions 3a, 3a formed by the metal members 1 and the second tab member 3 are welded to join the metal members 1 and the second tab member 3.

When the preparation process is finished, the metal members 1, 1, the first tab member 2, and the second tab member 3 are placed on a platform of a friction stir welding machine not shown, and locked so as not to move by using a jig such as a clamp not shown.

(2) First Preparatory Process

The first preparatory process includes a first tab member joining process in which the butting portion J2 between the metal members 1, 1 and the first tab member 2 is joined, a preliminary joining process in which the butting portion J1 between the metal members 1, 1 is preliminary joined, a second tab member joining process in which the butting portion J3 between the metal members 1, 1 and the second tab member 3 is joined, and a pilot bore forming process in which a pilot bore is formed at a start position of friction stir welding of the first primary welding process.

In the first preparatory joining process of the present embodiment, as shown in FIG. 16(a) and FIG. 16(b), the butting portions J1, J2, and J3 are also successively friction stir welded by moving one preliminary joining rotating tool A so as to form a one-stroke movement locus (bead).

Friction stir welding steps in the first preparatory joining process of the present embodiment will be described in detail.

First, the stirring pin A2 of the preliminary joining rotating tool A is inserted into the start position $S_P$ provided at an appropriate location on the first tab member 2 while rotating the stirring pin A2 counterclockwise and friction stir welding is started, and the preliminary joining rotating tool A is relatively moved toward the start point s2 of the first tab member joining process.

When friction stir welding is performed continuously to the start point s2 of the first tab member joining process by relatively moving the preliminary joining rotating tool A, the preliminary joining rotating tool A is not withdrawn at the start point s2 but directly shifted to the first tab member joining process.

In the first tab member joining process, the butting portion J2 between the first tab member 2 and the metal members 1, 1 is friction stir welded. In detail, a friction stir welding route is set on the seam between the metal members 1, 1 and the second tab member 2, and by relatively moving the preliminary joining rotating tool A along this route, the butting portion J2 is friction stir welded. In the present embodiment, friction stir welding is performed continuously from the start point s2 to the end point e2 of the first tab member joining process without withdrawing the preliminary joining rotating tool A midway.

When the preliminary joining rotating tool A is rotated counterclockwise, fine joining defects may occur on the right in the traveling direction, therefore, preferably, the positions of the start point s2 and the end point e2 of the first tab member joining process are set so that the metal members 1, 1 are positioned on the left in the traveling direction of the preliminary joining rotating tool A. Accordingly, joining defects hardly occur on the metal member 1 side, so that a high-quality joined body can be obtained.

When the preliminary joining rotating tool A reaches the endpoint e2 of the first tab member joining process, the friction stir welding is not finished at the endpoint e2 but continued to the start point s1 of the preliminary joining process, and is directly shifted to the preliminary joining process. In the present embodiment, the friction stir welding route from the end point e2 of the first tab member joining process to the start point s1 of the preliminary joining process is set on the first tab member 2.

In the preliminary joining process, the butting portion J1 between the metal members 1, 1 is friction stir welded. In detail, a friction stir welding route is set on the seam between the metal members 1, 1, and by relatively moving the preliminary joining rotating tool A along this route, the butting portion J1 is friction stir welded. In the present embodiment, friction stir welding is performed continuously from the start point s1 to the endpoint e1 of the preliminary joining process without withdrawing the preliminary joining rotating tool A midway.

When the preliminary joining rotating tool A reaches the endpoint e1 of the preliminary joining process, it is directly shifted to the second tab member joining process. In other words, the process is shifted to the second tab member joining process without withdrawing the preliminary joining rotating tool A at the end point e1 of the preliminary joining process which is the start point s3 of the second tab member joining process.

In the second tab member joining process, the butting portions J3, J3 between the metal members 1, 1 and the second tab member 3 are friction stir welded. In the present embodiment, the start point s3 of the second tab member joining process is positioned between the butting portions J3, J3, so that a turning point m3 is provided in the friction stir welding route from the start point s3 to the end point e3 of the second tab member joining process, and after the preliminary joining rotating tool A is moved from the start point s3 to the turning point m3 (see FIG. 16(a)), the preliminary joining rotating tool A is moved from the turning point m3 to the end point e3 (see FIG. 16(b)), whereby friction stir welding is performed continuously from the start point s3 to the end point e3 of the second tab member joining process. In other words, after the preliminary joining rotating tool A is made to reciprocate between the start point s3 and the turning point m3, the preliminary joining rotating tool A is moved to the end point e3, whereby friction stir welding is performed continuously from the start point s3 to the end point e3 of the second tab member joining process. The friction stir welding route from the start point s3 to the turning point m3 and the friction stir welding route from the turning point m3 to the end point e3 are set on the seams between the metal members 1 and the second tab member 3, respectively.

The positional relation among the start point s3, the turning point m3, and the endpoint e3 is not specifically limited, however, when the preliminary joining rotating tool A is rotated counterclockwise as in the present embodiment, preferably, the positions of the start point s3, the turning point m3, and the end point e3 of the second tab member joining process are set so that the metal members 1, 1 are positioned on the left in the traveling direction of the preliminary joining rotating tool A at least in the friction stir welding route from the turning point m3 to the end point e3. In this case, between the start point s3 and the turning point m3, the friction stir welding route is set on the seam between the metal members 1 and the second tab member 3 in both forward and return paths, and preferably, the preliminary joining rotating tool is moved along this route. Accordingly, in the path from the start point s3 to the turning point m3, even if the metal members 1 are positioned on the right in the traveling direction of the preliminary joining rotating tool A and joining defects occur on the metal member 1 side, in subsequent friction stir welding from the turning point m3 to the end point e3, the metal members 1 are positioned on the left in the traveling direction of the preliminary joining rotating tool A, so that the joining defects are corrected and a high-quality joined body can be obtained.

Incidentally, when the preliminary joining rotating tool A is rotated clockwise, preferably, the positions of the start point, the turning point, and the end point of the second tab member joining process are set so that the metal members 1, 1 are positioned on the right in the traveling direction of the preliminary joining rotating tool A in the friction stir welding route from the turning point to the endpoint. In detail, the turning point is provided at the position of the end point e3 set when the preliminary joining rotating tool A is rotated counterclockwise, and the end point is provided at the position of the turning point m3 set when the preliminary joining rotating tool A is rotated counterclockwise although these are not shown.

As shown in FIG. 16(b), when the preliminary joining rotating tool A reaches the end point e3 of the second tab member joining process, friction stir welding is not finished at the end point e3 but continued to the end position $E_P$ provided on the second tab member 3. When the preliminary joining rotating tool A reaches the end position $E_P$, the preliminary joining rotating tool A is moved up while being rotated to withdraw the stirring pin A2 from the end position E.

Subsequently, the pilot bore forming process is executed. The pilot bore forming process is for forming a pilot bore P1 at the start position of friction stir welding of the first primary welding process. In the pilot bore forming process of the present embodiment, a pilot bore is formed in the butting portion J3 between the metal members 1 and the second tab member 3.

The method for forming the pilot bore P1 is not limited, and for example, it can be formed by rotatively inserting a generally known drill not shown, and in addition, the pilot bore can also be formed by inserting and extracting a rotating tool with a stirring pin larger than the stirring pin A2 (see FIG. 2(a)) of the preliminary joining rotating tool A and smaller than the stirring pin B2 (see FIG. 2(b)) of the primary welding rotating tool B while rotating it.

The position of the pilot bore P1 (that is, the start position of friction stir welding of the first primary welding process) is not limited, either, and it can be formed in the first tab member 2 or the second tab member 3, or in the butting portion J2, however, preferably, it is formed on the extension of the seam (boundary) between the metal members 1, 1 appearing on the surface 12 side of the metal members 1 as described in the present embodiment or formed at the end portion of the seam between the metal members 1, 1 (that is, the end portion of the butting portion J1) although this is not shown.

Figure 17:
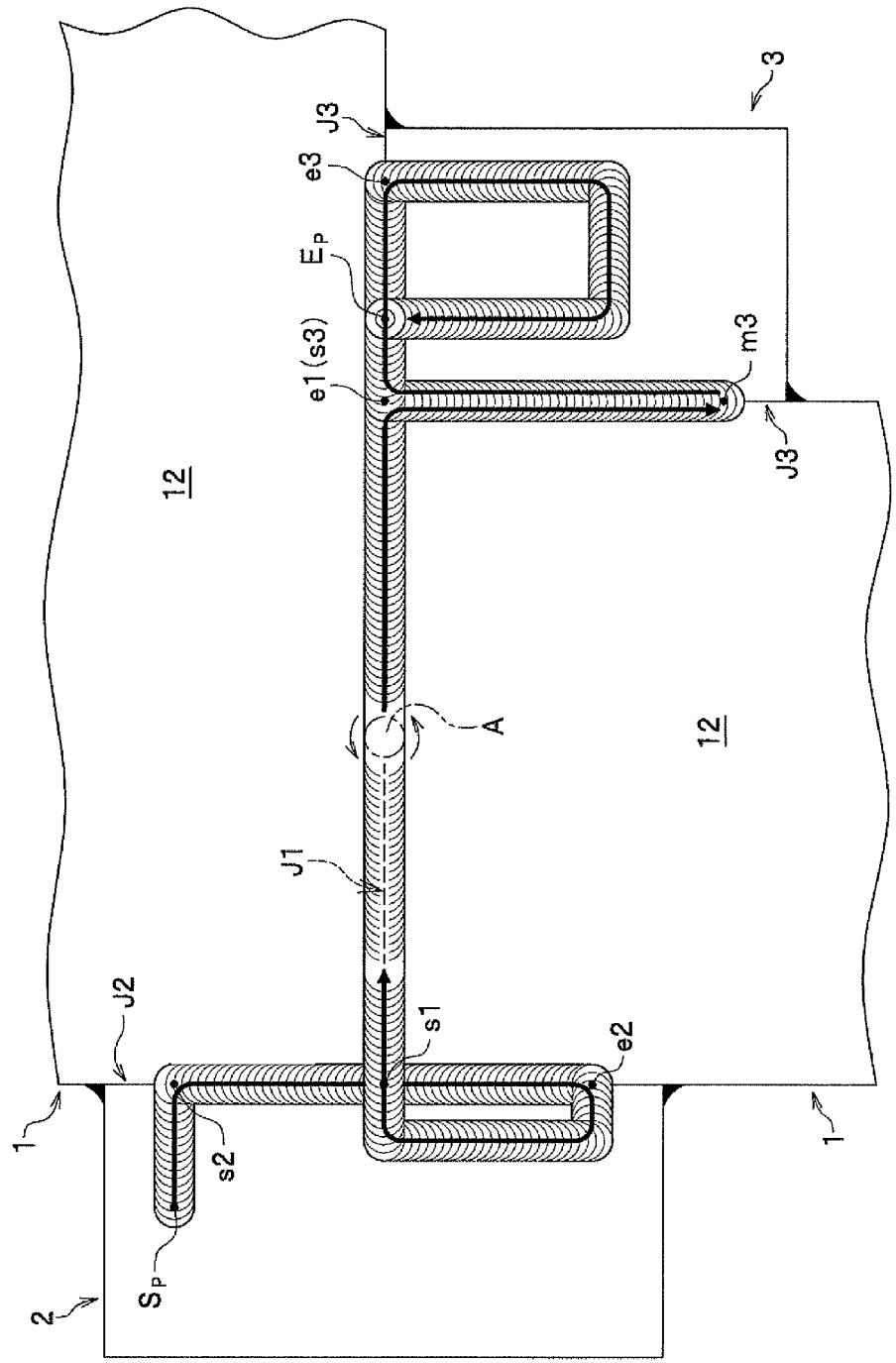
FIG. 17 is a plan view for describing a modified example of the first preparatory process of the second embodiment.

When the pilot bore P1 is formed on the extension of the seam between the metal members 1, 1, as shown in FIG. 17, the end position $E_P$ of friction stir welding of the first preparatory process is provided on the extension and a pull-out hole formed when withdrawing the stirring pin A2 of the preliminary joining rotating tool A is used as a pilot bore, or the pull-out hole is expanded in diameter by using a drill not shown to form a pilot bore. In this case, the pilot bore machining operation can be omitted or simplified, so that the operation time can be shortened.

(3) First Primary Welding Process

When the first preparatory process is finished, the first primary welding process in which the butting portion J1 between the metal members 1, 1 is primarily welded is executed. In the first primary welding process of the present embodiment, the preliminarily joined butting portion J1 is friction stir welded from the surface side of the metal members 1 by using the primary welding rotating tool B shown in FIG. 2(*a*).

Figure 18:
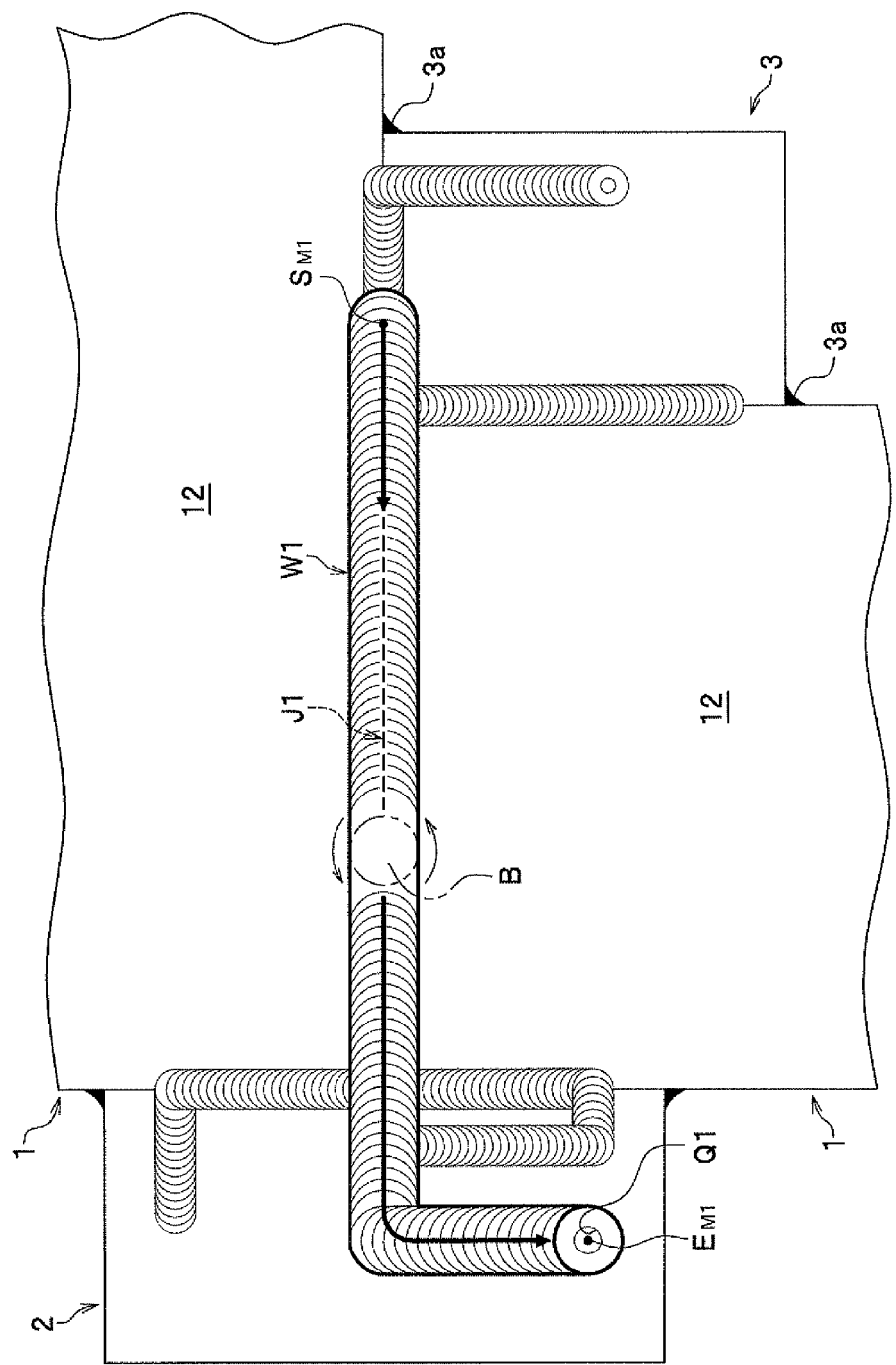
FIG. 18 is a plan view for describing a first primary welding process of the second embodiment.

In the first primary welding process, first, as shown in FIG. 18, the stirring pin B2 is inserted into the start position $S_{M1}$ (that is, the pilot bore P1 shown in FIG. 16(*b*)) while rotating the primary welding rotating tool B counterclockwise and friction stir welding is started. In the present embodiment, the start position $S_{M1}$ is provided on the butting portion J3 between the metal member 1 and the second tab member 3, when the stirring pin B2 of the primary welding rotating tool B is press-fitted, a part of the plasticized and fluidized metal flows into a fine gap between the metal member 1 and the second tab member 3, and thereafter, the escape of the plasticized and fluidized metal into the gap is reduced, so that joining defects due to insufficient thickness hardly occur.

When the stirring pin B2 of the primary welding rotating tool B is press-fitted into the pilot bore P1, a force to separate the metal member 1 and the second tab member 3 acts, however, the inner corner portions 3*a*, 3*a* formed by the metal members 1 and the second tab member 3 are preliminarily joined by welding, therefore, separation does not occur between the metal member 1 and the second tab member 3.

When friction stir welding is performed at one end of the butting portion J1 between the metal members 1, 1, the primary welding rotating tool B is made to directly enter the butting portion J1, and by relatively moving the primary welding rotating tool B along the friction stir welding route set on the seam between the metal members 1, 1, friction stir welding is performed continuously from the one end to the other end of the butting portion J1. When the primary welding rotating tool B is relatively moved to the other end of the butting portion J1, it is made to pass across the butting portion J2 while performing friction stir welding, and then directly and relatively moved toward the end position $E_{M1}$.

When the primary welding rotating tool B reaches the end position $E_{M1}$, the stirring pin B2 is withdrawn from the end position $E_{M1}$ by moving up the primary welding rotating tool B while rotating it. When the stirring pin B2 is withdrawn upward at the end position $E_{M1}$, a pull-out hole Q1 having substantially the same shape as the stirring pin B2 is inevitably formed, and this remains in the present embodiment.

In the present embodiment, the case where the start position of friction stir welding of the first primary welding process is provided on the butting portion J3 is illustrated, however, as shown in FIG. 19(*a*), it may be provided on the second tab member 3, or on the first tab member 2 as shown in FIG. 19(*b*).

(4) First Repairing Process

When the first primary welding process is finished, the surface plasticized region W1 formed on the metal members 1 through the first primary welding process is friction stir welded through the first repairing process. In the first repairing process of the present embodiment, as shown in FIG. 20(*a*) and FIG. 20(*b*), at least the first repairing region R1 and the second repairing region R2 in the surface plasticized region W1 are friction stir welded by using a repairing rotating tool C smaller than the primary welding rotating tool B.

The friction stir welding on the first repairing region R1 is performed for dividing a tunnel-like defect which may be formed along the traveling direction of the primary welding rotating tool B (see FIG. 2(*b*)). In the present embodiment in which the primary welding rotating tool B is rotated counterclockwise, a tunnel-like defect may occur on the right in the traveling direction, so that the first repairing region R1 is preferably set so as to include at least the upper portion of the surface plasticized region W1 positioned on the right in the traveling direction in a plan view.

Friction stir welding on the second repairing region R2 is performed for dividing an oxide film (oxide film formed on the contact surface 21 between the lateral sides 14 of the metal members 1 and the first tab member 2) involved in the surface plasticized region W1 when the primary welding rotating tool B passes across the butting portion J2. As in the present embodiment, when the end position $E_{M1}$ of friction stir welding of the primary welding process is provided on the first tab member 2 and the primary welding rotating tool B (see FIG. 2(*b*)) is rotated counterclockwise, there is every possibility that an oxide film is involved in the upper portion of the surface plasticized region W1 on the left in the traveling direction, so that the second repairing region R2 is preferably set so as to include at least the upper portion of the surface plasticized region W1 positioned on the left in the traveling direction in a plan view in the surface plasticized region W1 adjacent to the first tab member 2.

In the first repairing process, as shown in FIG. 20(*b*), by moving one repairing rotating tool to form a one-stroke movement locus (bead), the first repairing region R1, the second repairing region R2, and the third repairing region R3 are successively friction stir welded. In the present embodiment, the case where the first repairing region R1 and the second repairing region R2 are friction stir welded in this order is illustrated, however, this is not intended to limit the friction stir welding order.

Friction stir welding steps of the first repairing process will be described in detail with reference to FIG. 20(*b*).

First, the stirring pin of the repairing rotating tool C is inserted (press-fitted) to the start position $S_R$ provided on an appropriate location on the metal member 1 and friction stir welding is started, and the first repairing region R1 (see FIG. 20(*a*)) is friction stir welded. In the present embodiment, the start position $S_R$ is provided near the start position $S_{M1}$ (see FIG. 18) of friction stir welding of the primary welding process, and a turning point $M_R$ is provided on the opposite side of the end position $E_R$ across the start position $S_R$, and the repairing rotating tool C is relatively moved toward the turning point $M_R$ and then turned around at the turning point $M_R$, and relatively moved along the butting portion J1 (see FIG. 18), whereby the first repairing region R1 (see FIG. 20(*a*)) is friction stir welded. By performing friction stir welding from the start position $S_R$ to the turning point $M_R$, an oxide film involved when the stirring pin B2 of the primary welding rotating tool B is inserted into the start position $S_{M1}$ (see FIG. 18) can be divided.

When friction stir welding on the first repairing region R1 is finished, the repairing rotating tool C is directly moved to the second repairing region R2 without being withdrawn to friction stir weld the second repairing region R2. When the second repairing region R2 is larger than the region which can be friction stir welded by the repairing rotating tool C, the repairing rotating tool C is turned around several times while shifting the friction stir welding route.

When the friction stir welding on the second repairing region R2 is finished, the repairing rotating tool C is moved to the end position $E_R$, and the stirring pin C2 is withdrawn from the end position $E_R$ by moving up the repairing rotating tool C while rotating it.

(5) First Traverse Repairing Process

Figure 21:
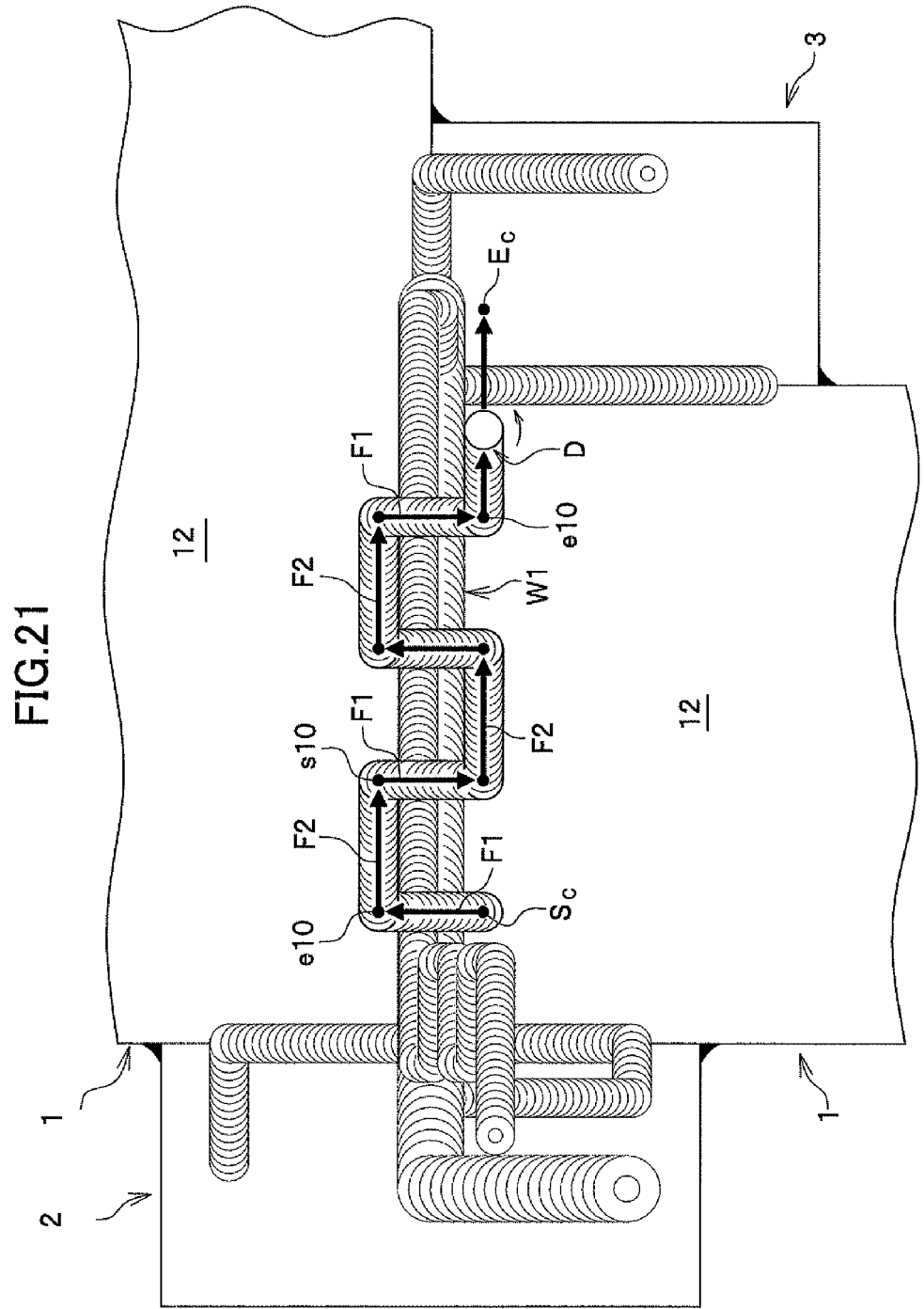
FIG. 21 is a plan view for describing a first traverse repairing process of the second embodiment.

When the first repairing process is finished, as shown in FIG. 21, by moving the traversing rotating tool D so as to traverse the surface plasticized region W1 a plurality of times, the first traverse repairing process in which the surface plasticized region W1 is friction stir welded is executed.

The friction stir welding route of the first traverse repairing process is set so that a plurality of re-plasticized regions W3, W3 . . . are spaced from each other on the friction stir welding route (center line of the surface plasticized region W1) of the first primary welding process, and in the present embodiment, includes a plurality of traverse routes F1, F1 . . . traversing the surface plasticized region W1 and transfer routes F2, F2 . . . connecting end portions on the same side of the traverse routes F1, F1 adjacent to each other.

The traverse routes F1 cross the friction stir welding route of the first primary welding process at right angles. The transfer routes F2 are provided on the right or left of the surface plasticized region W1 and parallel to the friction stir welding route of the first primary welding process.

Friction stir welding steps of the first traverse repairing process will be described in detail.

In the present embodiment, by moving one traversing rotating tool D zigzag to form a one-stroke movement locus (bead), friction stir welding is also performed continuously from the start position $S_C$ to the end position $E_C$ of friction stir welding.

In the first traverse repairing process, first, the stirring pin D2 (see FIG. 9) of the traversing rotating tool D is inserted (press-fitted) to the start position $S_C$ provided at an appropriate location on the metal members 1 and friction stir welding is started, and friction stir welding is performed continuously along the first traverse route F1. When it reaches the endpoint e10 of the first traverse route F1, the traveling direction of the traversing rotating tool D is changed and the traversing rotating tool D is moved along the transfer route F2 to continuously friction stir weld the metal lateral to the surface plasticized region W1. When the traversing rotating tool D reaches the start point S10 of the second traverse route F1, the traveling direction of the traversing rotating tool D is changed and the traversing rotating tool D is moved along the second traverse route F1 to friction stir weld the surface plasticized region W1 continuously. By repeating the above-described steps, when the traversing rotating tool D reaches the end point e10 of the last traverse route F1, the traversing rotating tool D is moved to the end position $E_C$, and the stirring pin D2 (see FIG. 9) is withdrawn from the end position $E_C$ by moving up the traversing rotating tool D while rotating it.

When the first traverse repairing process is finished, burrs formed during friction stir welding in the first preparatory joining process, the first primary welding process, the first repairing process, and the first traverse repairing process are removed, and the metal members 1, 1 are turned over so that the back surfaces thereof turn up.

(6) Second Preparatory Process

After the metal members 1, 1 are turned over, the second preparatory process is executed. The second preparatory process of the present embodiment includes a pilot bore forming process in which a pilot bore (not shown) is formed at a start position of friction stir welding of the second primary welding process.

(7) Second Primary Welding Process

Figure 22:
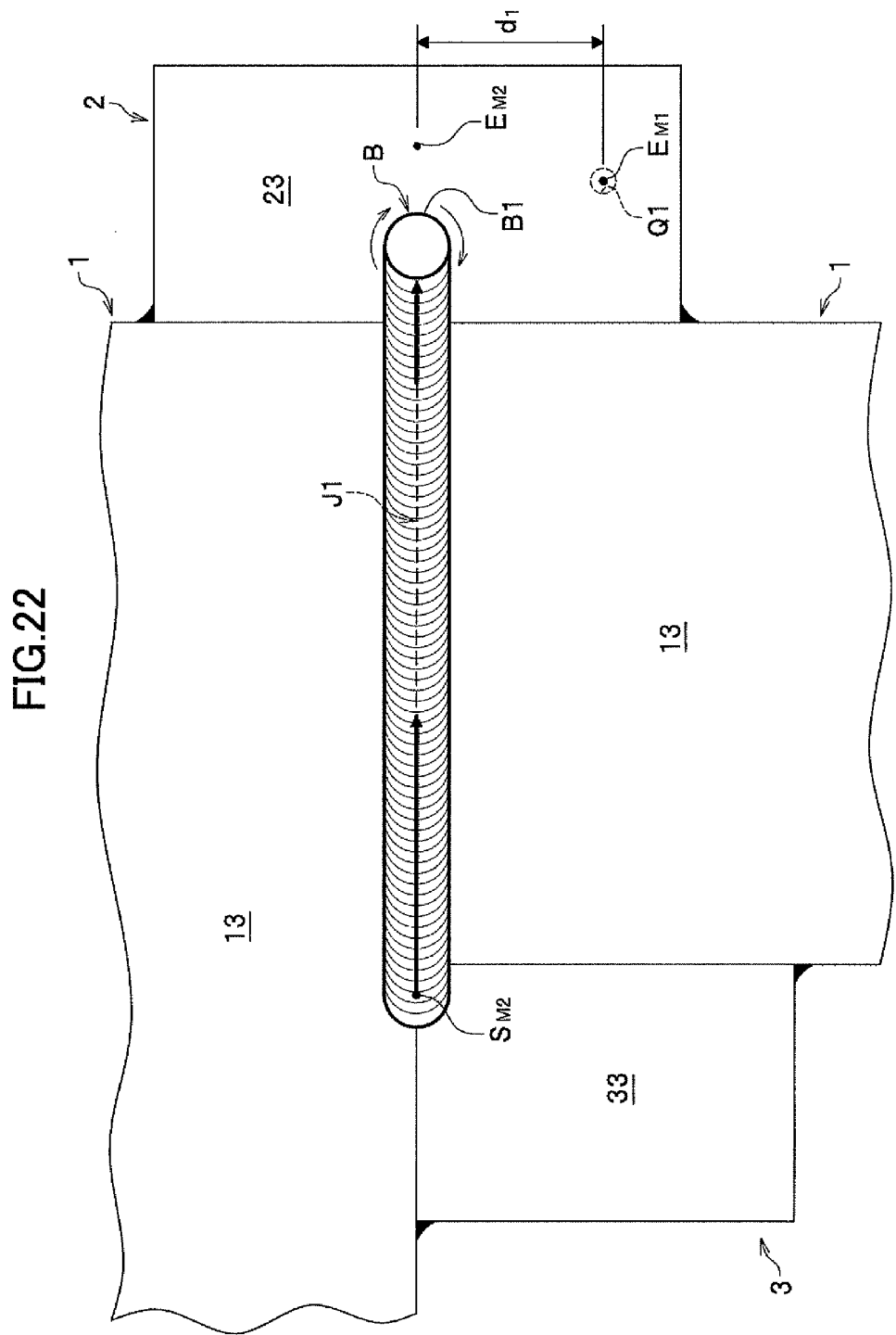
FIG. 22 is a sectional view for describing a second primary welding process of the second embodiment.

When the second preparatory process is finished, as shown in FIG. 22, the second primary welding process is executed to friction stir weld the butting portion J1 from the back surface 13 side of the metal members 1 by using the primary welding rotating tool B used in the first primary welding process. When friction stir welding the butting portion J1, friction stir welding is performed while the stirring pin B2 of the primary welding rotating tool B is made to get into the surface plasticized region formed through the first primary welding process (see FIG. 10(b)).

In the second primary welding process of the present embodiment, the friction stir welding route is set so as to avoid the pull-out hole Q1 remaining in the first primary welding process, and by moving the stirring pin inserted into the pilot bore (start position $S_{M2}$) not shown to the end position $E_{M2}$ without withdrawing it midway, friction stir welding is performed continuously from the start position $S_{M2}$ to the end position $E_{M2}$. The shortest distance $d_1$ in a plan view between the end position $E_{M1}$ (center of the pull-out hole Q1) of friction stir welding of the first primary welding process and the movement locus of the primary welding rotating tool B in the second primary welding process is secured not less than the outer diameter of the shoulder B1 of the primary welding rotating tool B.

In addition, steps, etc., of the second primary welding process of the present embodiment are the same as those of the second primary welding process of the first embodiment described above, so that detailed description thereof is omitted.

(8) Second Repairing Process

When the second primary welding process is finished, the second repairing process is executed to friction stir weld the back plasticized region W2 formed on the metal members 1 through the second primary welding process. The second repairing process is the same as the first repairing process described above except that the friction stir welding is performed from the back surface 13 side of the metal members 1, so that detailed description of the second repairing process is omitted.

(9) Second Traverse Repairing Process

When the second repairing process is finished, the second traverse repairing process is executed to friction stir weld the back plasticized region W2 formed on the metal members 1 through the second primary welding process. The second traverse repairing process is the same as the first traverse repairing process except that the friction stir welding is performed from the back surface 13 side of the metal members 1, so that detailed description of the second traverse repairing process is omitted.

When the second traverse repairing process is finished, burrs formed during friction stir welding in the second preparatory process, the second primary welding process, the second repairing process, and the second traverse repairing process are removed, and further, the first tab member 2 and the second tab member 3 are cut off.

Through the above-described processes (1) to (9), even when extremely thick metal members 1, 1 whose thicknesses are more than 40 (mm) are joined, airtightness and watertightness at the joined portion can be improved.

Figure 23:
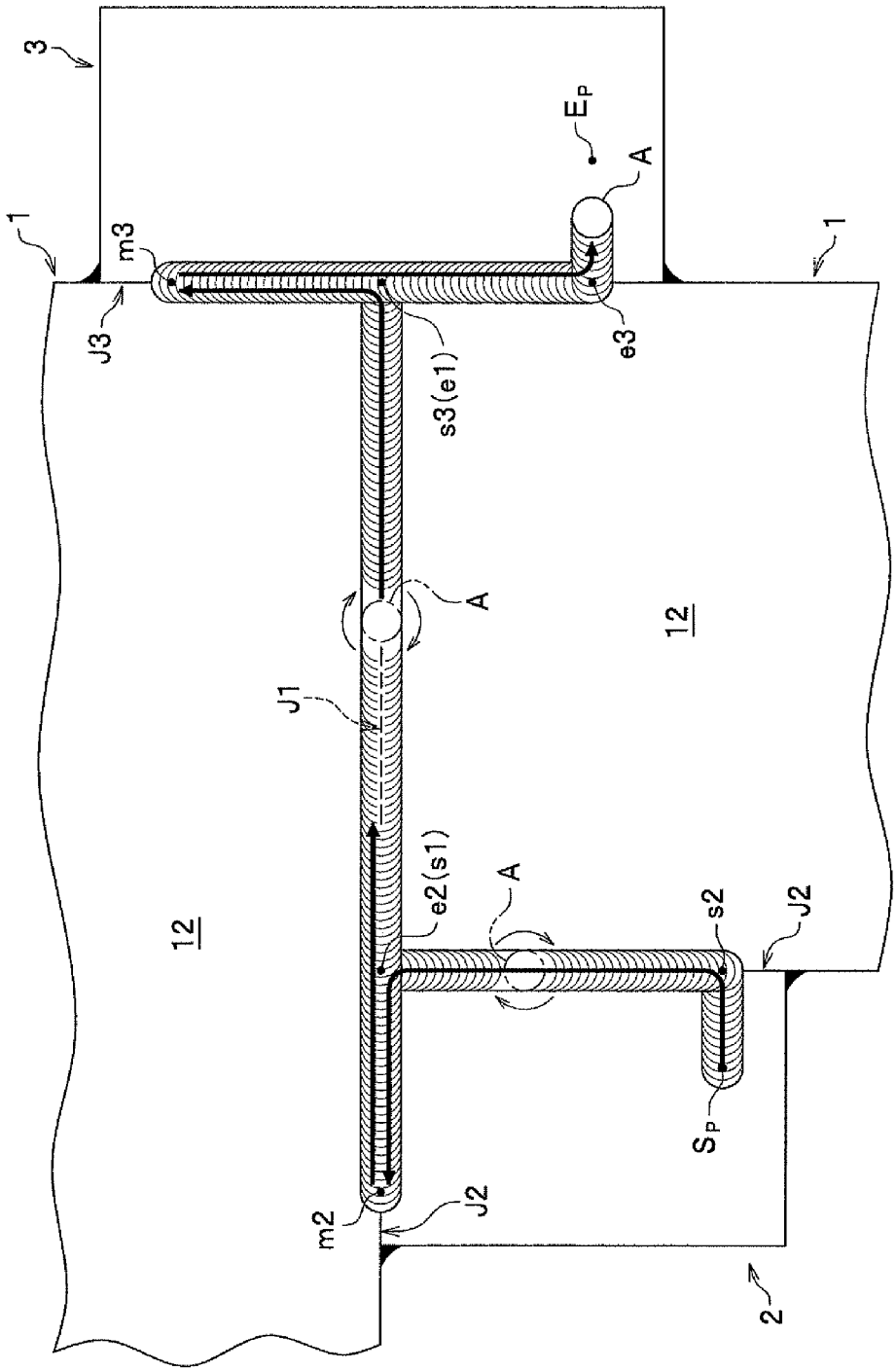
FIG. 23 is a plan view for describing a modified example of a first tab member joining process and a second tab member joining process of the second embodiment.

In the second embodiment, the case where the second tab member 3 is disposed at the inner corner portion of the metal members 1, 1 butted against each other in an L shape is illustrated, however, it is also allowed that, as shown in FIG. 23, the first tab member 2 is disposed at the inner corner portions of the metal members 1, 1 and the second tab member 3 is disposed on the opposite side across the butting portion J1.

In this case, it is allowed that the start point s2 and the turning point m2 of the first tab member joining process are provided on the seams between the metal members 1 and the first tab member 2, the start point s1 (inner corner portion of the metal members 1, 1) of the preliminary joining process between the start point s2 and the turning point m2 is set as the end point e2, and by moving the preliminary joining rotating tool A from the turning point m2 to the endpoint e2 after moving it from the start point s2 to the turning point m2, the butting portions J2, J2 may be friction stir welded.

When the preliminary joining rotating tool A is rotated clockwise, preferably, the positions of the start point s2, the turning point m2, and the end point e2 of the first tab member joining process are set so that the metal members 1, 1 are positioned on the right in the traveling direction of the preliminary joining rotating tool A at least in the friction stir welding route from the start point s2 to the turning point m2. Incidentally, when the preliminary joining rotating tool A is rotated counterclockwise, preferably, the positions of the start point, the turning point, and the end point of the first tab member joining process are set so that the metal members 1, 1 are positioned on the left in the traveling direction of the preliminary joining rotating tool A at least in the friction stir welding route from the start point to the turning point although these are not shown.

Similarly, in the second tab member joining process, it is also allowed that the turning point m3 and the end point e3 are provided on the seam between the metal members 1 and the second tab member 3, the end point e1 of the preliminary joining process between the turning point m3 and the endpoint e3 is set as the start point s3, and by moving the preliminary joining rotating tool A from the turning point m3 to the end point e3 after moving it from the start point s3 to the turning point m3, the butting portion J3 may be friction stir welded.

When the preliminary joining rotating tool A is rotated clockwise, preferably, the positions of the start point s3, the turning point m3, and the end point e3 of the second tab member joining process are set so that the metal members 1, 1 are positioned on the right in the traveling direction of the preliminary joining rotating tool A at least in the friction stir welding route from the turning point m3 to the end point e3. Incidentally, when the preliminary joining rotating tool A is rotated counterclockwise, preferably, the positions of the start point, the turning point, and the end point of the second tab member joining process are set so that the metal members 1, 1 are positioned on the left in the traveling direction of the preliminary joining rotating tool A at least in the friction stir welding route from the turning point to the end point although these are not shown.

EXAMPLES

Detailed joining conditions of the above-described joining method are illustrated in Table 1 to Table 2. Table 1 shows the kinds and thicknesses of alloys of the metal members 1, the first tab member 2, and the second tab member 3, dimensions of the rotating tools, and dimensions of the pilot bores, and Table 2 shows the rotating speeds, insertion speeds, and movement speeds of the rotating tools in the respective processes described above. In the present example, the joining conditions of the first primary welding process and the second primary welding process are the same, and the joining conditions of the first repairing process and the second repairing process are the same. In Table 1, "JIS 5052-0" is a sign showing a kind of an aluminum alloy defined in Japanese Industrial Standards, and means an annealed aluminum alloy (Al—Mg alloy) containing 2.2% to 2.8% of Mg obtained. "C1020" is a sign showing a kind of copper (copper alloy) defined in Japanese Industrial Standards, and means high-purity oxygen-free copper (not less than 99.96% of Cu).

TABLE 1

| Metal members 1 First tab member 2 Second tab member 3 | Kind of alloy | | No. 1 | No. 2 | No. 3 |
|---|---|---|---|---|---|
| | Kind of alloy | | Aluminum alloy (JIS 5052-O) | Aluminum alloy (JIS 5052-O) | Copper (C1020) |
| | Thickness t (mm) | | 40 | 105 | 40 |
| Preliminary joining rotating tool A | Shoulder A1 | Outer diameter $X_1$ (mm) | 20.0 | 20.0 | 20.0 |
| | Stirring pin A2 | Maximum outer diameter $X_2$ (mm) | 8.0 | 10.0 | 9.0 |
| | | Minimum outer diameter $X_3$ (mm) | 6.0 | 8.0 | 6.0 |
| | | Length $L_4$ (mm) | 4.0 | 10.0 | 5.0 |
| Primary welding rotating tool B | Shoulder B1 | Outer diameter $Y_1$ (mm) | 30.0 | 55.0 | 32.5 |
| | Stirring pin B2 | Maximum outer diameter $Y_2$ (mm) | 16.0 | 36.0 | 16.0 |
| | | Minimum outer diameter $Y_3$ (mm) | 8.0 | 18.0 | 8.0 |
| | | Length $L_1$ (mm) | 21.0 | 57.0 | 21.0 |
| | Pilot bore P1 | Maximum bore diameter $Z_1$ (mm) | 10.0 | 20.0 | 14.0 |
| | | Minimum bore diameter (mm) | 10.0 | 20.0 | 14.0 |
| | | Depth $Z_2$ (mm) | 12.0 | 54.0 | 12.0 |
| Repairing rotating tool C (same for traversing rotating tool D) | Shoulder C1 | Outer diameter (mm) | 20.0 | 30.0 | 20.0 |
| | Stirring pin C2 | Maximum outer diameter (mm) | 10.0 | 16.0 | 9.0 |
| | | Minimum outer diameter (mm) | 8.0 | 8.0 | 6.0 |
| | | Length (mm) | 8.0 | 21.0 | 7.0 |

TABLE 2

| | | | No. 1 | No. 2 | No. 3 |
|---|---|---|---|---|---|
| Preliminary joining rotating tool A | Rotating speed (rpm) | For insertion | 700 | 600 | 1000 |
| | | For movement | 700 | 600 | 1000 |
| | | For withdrawal | 700 | 600 | 1000 |
| | Insertion speed (moving-down speed) (mm/min) | | 40 | 40 | 50 |
| | Movement speed (feed rate) (mm/min) | | 200 | 150 | 100 |
| | Withdrawal speed (moving-up speed) (mm/min) | | 60 | 60 | 60 |
| Primary welding rotating tool B | Rotating speed (rpm) | For insertion | 400 | 150 | 500 |
| | | For movement | 400 | 90 | 500 |
| | | For withdrawal | 400 | 150 | 500 |
| | Insertion speed (moving-down speed) (mm/min) | | 40 | 10 | 30 |
| | Movement speed (feed rate) (mm/min) | | 100 | 50 | 80 |
| | Withdrawal speed (moving-up speed) (mm/min) | | 60 | 20 | 60 |
| Repairing rotating tool C (same for traversing rotating tool D) | Rotating speed (rpm) | For insertion | 600 | 400 | 1000 |
| | | For movement | 600 | 400 | 1000 |
| | | For withdrawal | 600 | 400 | 1000 |
| | Insertion speed (moving-down speed) (mm/min) | | 40 | 40 | 50 |
| | Movement speed (feed rate) (mm/min) | | 150 | 100 | 100 |
| | Withdrawal speed (moving-up speed) (mm/min) | | 60 | 60 | 60 |

What is claimed is:

1. A joining method comprising:
   a butting step in which metal members to be joined are butted against each other to form a butting portion between the metal members;

a tab member disposing step in which a first tab member and a second tab member are disposed on both sides of the butting portion between the metal members;

a first tab member joining step in which the butting portion between the metal members and the first tab member is friction stir welded from a first surface;

a preliminary joining step in which the butting portion between the metal members is preliminarily friction stir welded from the first surface;

a second tab member joining step in which the butting portion between the metal members and the second tab member is friction stir welded from the first surface;

a pilot bore forming step in which a pilot bore is formed at the first surface of either one of the first tab member or the second tab member;

a first primary welding step in which a first stirring pin of a first rotating tool is inserted into said pilot bore, and the butting portion preliminarily joined between the metal members is friction stir welded from the first surface of the metal members; and a second primary welding step in which the butting portion between the metal members is friction stir welded using a second rotating tool with a second stirring pin from a back surface of the metal members, opposite said first surface, wherein, in the second primary welding step, friction stir welding is performed while inserting the second stirring pin of the second rotating tool into a plasticized region formed through the first primary welding step.

2. The joining method according to claim 1, wherein a sum of a length of the first stirring pin of the first rotating tool used in the first primary welding step and a length of the second stirring pin of the second rotating tool used in the second primary welding step is at least equal to a thickness of the metal members at the butting portion.

3. The joining method according to claim 1, wherein a length of the first stirring pin of the first rotating tool to be used in the first primary welding step is set to not less than ½ of a thickness of the metal members at the butting portion, and a length of the second stirring pin of the second rotating tool to be used in the second primary welding step is set to not less than ½ of the thickness of the metal members at the butting portion.

4. The joining method according to claim 3, wherein the length of the second stirring pin of the second rotating tool to be used in the second primary welding step is set to be equal to the length of the first stirring pin of the first rotating tool to be used in the first primary welding step.

5. The joining method according to claim 1, satisfying a relation of $1.01 \leq (L_1+L_2)/t \leq 1.10$, where $L_1$ is a length of the first stirring pin of the first rotating tool to be used in the first primary welding step, $L_2$ is a length of the second stirring pin of the second rotating tool to be used in the second primary welding step, and t is a thickness of the metal members at the butting portion.

6. The joining method according to claim 1, wherein a length of the first stirring pin of the first rotating tool to be used in the first primary welding step is set to not more than ¾ of a thickness of the metal members at the butting portion, and a length of the second stirring pin of the second rotating tool to be used in the second primary welding step is set to not more than ¾ of the thickness of the metal members at the butting portion.

7. The joining method according to claim 1, wherein a friction stir welding route in the second primary welding step is set so as to avoid a pull-out hole formed by withdrawing the first stirring pin at an end position of friction stir welding of the first primary welding step.

8. The joining method according to claim 7, wherein a shortest distance between the end position of friction stir welding of the first primary welding step and a movement locus of the second stirring pin of the second rotating tool used in the second primary welding step is set to not less than an outer diameter of a shoulder of the second rotating tool to be used in the second primary welding step.

9. The joining method according to claim 1, wherein in the preliminary joining step, a preliminary joining rotating tool smaller than the first rotating tool to be used in the first primary welding step is used.

10. The joining method according to claim 1, further comprising a welding step in which the first tab member and the second tab member are preliminarily joined to the metal members by welding before the first primary welding step.

11. The joining method according to claim 10, wherein in the welding step, inner corner portions formed by the metal members and the first tab member are welded, and inner corner portions formed by the metal members and the second tab member are welded.

12. The joining method according to claim 1, wherein a maximum bore diameter of the pilot bore is set to be smaller than a maximum outer diameter of the first stirring pin.

13. The joining method according to claim 1, wherein before the first primary welding step, the metal members are fixedly locked on a platform of a friction stir welding machine, using a jig, whereby the first primary welding step is performed with the metal members held immovably on said platform.

14. The joining method according to claim 1, wherein after the first primary welding step, burrs formed during friction stir welding are removed, and the metal members are then turned over so that the back surfaces thereof turn up.

* * * * *